United States Patent
Liu et al.

(10) Patent No.: US 12,346,740 B2
(45) Date of Patent: Jul. 1, 2025

(54) DYNAMIC FOG SERVICE DEPLOYMENT AND MANAGEMENT

(71) Applicant: CONVIDA WIRELESS, LLC, Wilmington, DE (US)

(72) Inventors: Lu Liu, Conshohocken, PA (US); Chonggang Wang, Princeton, NJ (US); Xu Li, Plainsboro, NJ (US); Quang Ly, North Wales, PA (US); Dale N. Seed, Allentown, PA (US); Zhuo Chen, Claymont, DE (US)

(73) Assignee: CONVIDA WIRELESS, LLC, Wilmington, DE (US)

( * ) Notice: Subject to any disclaimer, the term of this patent is extended or adjusted under 35 U.S.C. 154(b) by 458 days.

(21) Appl. No.: 17/256,874

(22) PCT Filed: Jun. 26, 2019

(86) PCT No.: PCT/US2019/039265
§ 371 (c)(1),
(2) Date: Dec. 29, 2020

(87) PCT Pub. No.: WO2020/009875
PCT Pub. Date: Jan. 9, 2020

(65) Prior Publication Data
US 2021/0286655 A1    Sep. 16, 2021

Related U.S. Application Data

(60) Provisional application No. 62/692,906, filed on Jul. 2, 2018.

(51) Int. Cl.
G06F 9/50    (2006.01)
H04L 67/10   (2022.01)
H04L 67/30   (2022.01)

(52) U.S. Cl.
CPC .......... G06F 9/5072 (2013.01); G06F 9/5083 (2013.01); H04L 67/10 (2013.01); H04L 67/30 (2013.01)

(58) Field of Classification Search
CPC ..... G06F 9/5072; G06F 9/5083; H04L 67/10; H04L 67/30
(Continued)

(56) References Cited

U.S. PATENT DOCUMENTS 10,216,770 B1 *  2/2019  Kulesza ................. G06F 16/21
11,140,096 B2 * 10/2021  Hanes .................... H04L 47/76
(Continued)

FOREIGN PATENT DOCUMENTS

WO    2004/001598 A2    12/2003

OTHER PUBLICATIONS

Marin-Tordera et al., "Do we all really know what a fog node is? Current trends towards an open definition", Computer Communications, pp. 117-130, May 25, 2017.

*Primary Examiner* — David R Lazaro
*Assistant Examiner* — Mariegeorges A Henry
(74) *Attorney, Agent, or Firm* — BakerHostetler

(57) ABSTRACT

The provision of fog services may be coordinated by a fog leader adapted to track capabilities and resources available at other fog nodes, and to receive and process requests and policies from entities seeking fog services. For example, the fog leader may divide tasks among several fog nodes according to the capabilities and resources available at various nodes, and do so in a way that is transparent to the requestor and the fog nodes providing the service. The fog leader may request the reservation of capabilities and resources, and confirm and cancel such reservations. Fog services policies may include, for example, periods of time during which capabilities and resources should be reserved.

14 Claims, 33 Drawing Sheets

(58) Field of Classification Search
USPC .......................................................... 718/104
See application file for complete search history.

(56) References Cited

U.S. PATENT DOCUMENTS

| | | | |
|---|---|---|---|
| 2011/0029673 A1 | 2/2011 | Jaisinghani | |
| 2017/0366472 A1* | 12/2017 | Byers .................... | H04L 67/289 |
| 2018/0063020 A1* | 3/2018 | Bhagavatula ........... | H04L 47/80 |
| 2018/0109428 A1 | 4/2018 | Kattepur et al. | |
| 2018/0159745 A1* | 6/2018 | Byers .................. | H04L 41/0896 |
| 2019/0245806 A1* | 8/2019 | Hanes ................... | H04L 47/722 |
| 2019/0320040 A1* | 10/2019 | Kottapalli ............... | H04L 67/12 |

\* cited by examiner

DYNAMIC FOG SERVICE DEPLOYMENT AND MANAGEMENT

CROSS-REFERENCE TO RELATED APPLICATIONS

This application is the National Stage Application of International Patent Application No. PCT/US2019/039265 filed Jun. 26, 2019, which claims the benefit of U.S. Provisional Application No. 62/692,906, filed on Jul. 2, 2018, entitled "Dynamic fog service deployment and management," the content of which is hereby incorporated by reference in its entirety.

BACKGROUND

This disclosure pertains to for services in machine-to-machine (M2M), Internet-of-Things (IoT), web-of-things (WoT) systems, and the like, such as those described in OpenFog Reference Architecture for Fog Computing, February 2017 (see www.openfogconsortium.org/ra) and oneM2M Technical Specification, oneM2M-TS-0001-V3.11.0.

SUMMARY

Group based fog service architecture, fog node capability profile, enhanced fog node capability discovery based on potential group, fog service request pre-processing, fog service deployment based on service group, fog service group capability scaling, fog service group size scaling, hybrid fog service scaling, service group member replacement, sequential fog service request processing Fog computing is promising in compensating the inadequacy of traditional cloud-only architecture and is better suited for IoT systems. Fog architecture has some unique challenges due to the features of fog nodes, such as limited resources and highly dynamic capabilities. To overcome the challenges and benefit from fog computing, this disclosure proposes the following main ideas:

A group based fog service architecture where a fog node acts as the leader to manage and coordinate several fog nodes and their fog capabilities to provide fog services cooperatively. The architecture includes capability discovery, service reservation, providing service, service update and service completion.

Capability profile based fog capability description, which differentiates the information of the potential capability and the actual available capability of a fog node. The capability profile also includes predictable dynamics of fog nodes' capabilities such that the information may be exploited to improve the fog service.

Potential group and the corresponding procedures, which allows the fog leader to discover the capabilities of fog nodes that may potentially contribute to a request cooperatively. The potential group is lightweight in terms of communication overhead since it does not require frequent message exchanging between the leader and the potential members. A potential group will not require a member to reserve any capability, thus the fog nodes in potential group has the flexibility of utilizing their capabilities, such as joining other groups or work on non-grouping requests.

Fog service request pre-processing at the fog leader. The leader selects fog nodes from the potential group according to the discovered capabilities and splits the request into smaller sub-requests that the selected fog nodes may capable of completing. In addition to splitting the request based on fog nodes' capabilities, the request may also be split in time domain according to the predictable capability/availability change of member nodes. Based on the split request, the leader will set the requirement of capabilities for the fog nodes that are selected for the request.

Procedure of forming a service group. After request pre-processing, the leader may form a service group by distributing the sub-request, making reservations of fog capabilities at the members, and assigning workloads. The values for reserved capabilities and workloads (in terms of fog capability) may be set according to various considerations in service quality, reliability, flexibility. The grouping information may also be logged for re-using to reduce the response time and improve grouping efficiency.

Procedure for the formed service group to provide fog service to the user after service reservation. The fog leader may get involved in this process to select appropriate fog nodes for each instantaneous use of reserved fog services, and aggregate or forward responses from service group members to the requestor.

Dynamic scaling of the service group, including the scaling of reserved or occupied capabilities at the member nodes, the management of members (add, remove or replace), and the combinations of them. The related procedures enable the service group to adapt to dynamics during the service such as the update of requests, the capability/availability change of service group member(s), and sequential requests.

Fog service policies are proposed for enabling/triggering autonomous fog service group management dynamics at the fog leader or fog nodes. A third-party management application may create/update/delete fog service policies at the fog leader or fog nodes; alternatively, the fog leader may also create/update/delete fog service policies at fog nodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

A more detailed understanding may be had from the following description, given by way of example in conjunction with the accompanying drawings.

DETAILED DESCRIPTION

TABLE 1

Abbreviations

Figure 1:
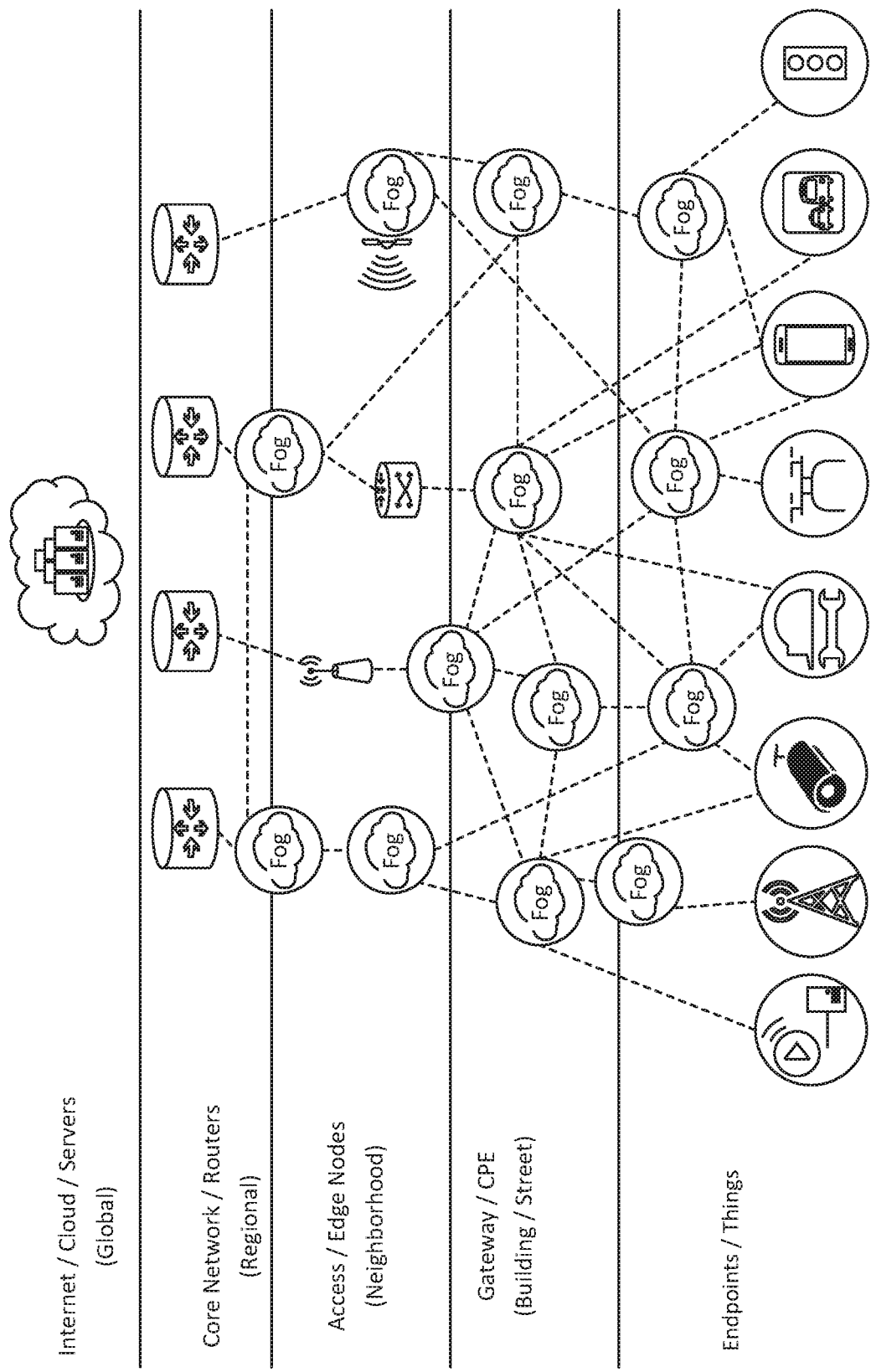
FIG. 1 is a block diagram of an example fog computing system architecture.

| | |
|---|---|
| IoT | Internet of Things |
| M2M | Machine-to-Machine |
| AFC | Available Fog Capability |
| ARC | Auxiliary Request for Connection |
| OFC | Occupied Fog Capability |
| PFC | Potential Fog Capability |
| QFC | Requested Fog Capability |
| RFC | Reserved Fog Capability |

Herein the term "fog computing" generally refers to a system-level architecture that moves resources and services including computing, storage, control and networking closer to the end users along the continuum from cloud to things.

Herein the term "fog capability" generally refers to various types of capabilities or resources such as computing, storage, control, networking, services, etc. A fog capability may be measured as an amount, quantity, quality, or coverage depending on the type.

Herein the term "fog node" generally refers to a node with certain types of fog capabilities or resources that may be shared with and leveraged by users and even other fog nodes. A fog node may have one or multiple types of capabilities, may also have other software or services that are running on the node. A fog node may be located at the edge of network or higher layers. Fog nodes, especially the ones close to the edge, generally have limited capabilities compared to the cloud, and the capabilities may not be available all the time.

Herein the term "fog service request" generally refers to a request is received by the leader from a requestor. It could be generated by the requestor, or generated by a user and forwarded by the requestor. The requirements of the service described in the request may not be directly expressed as fog capabilities, in which case the leader may need to interpret the request and translate it into fog capabilities. The fog service request may ask for completing a task, reserving capabilities for a period of time or consistently providing service. Correspondingly, the completion of service may be indicated by completion of the task, termination of reservation or the cancelation from the user.

Herein the term "fog leader" generally refers to a fog node that will coordinate and combine other fog nodes together to serve a fog service request which demands large fog capabilities and cannot be completed at a single fog node. A fog leader will form both potential group(s) for fog capability discovery, and service group(s) for serving fog service requests. The fog leader could be located at any layer of the fog hierarchy, as long as it is capable of forming potential groups, creating service groups, and adjusting service groups.

Herein the term "potential group" generally refers to a group that may be identified by a fog leader, consisting of fog nodes that have fog capabilities and may potentially contribute their fog capabilities to a fog service request as coordinated by the fog leader.

Herein the term "service group" generally refers to a group of fog nodes selected by a fog leader to service a particular fog service request. When the fog leader receives a fog service request from a fog service user, the fog leader will create a service group, where each member is a fog node determined by the fog leader.

The term "procedure" generally refers to methods of performing operations to achieve particular ends. The term "procedure" is used in place of "method" to avoid confusion with special meanings of the term "method" in the context of M2M and IT applications. The steps described for procedures are often optional, and potentially be performed in a variety of ways and a variety of sequences. Hence, herein the term "procedure" should not be interpreted as referring to a rigid set and sequence of steps, but rather to a general methodology for achieving results that may be adapted in a variety of ways.

Fog Computing

Fog computing, or briefly, fog, is a system-level architecture that moves resources and services including computing, storage, control, and networking closer to the end users along the continuum from Cloud to Things. As the name suggests, fog is a cloud close to the edge of the network, and is similar to a cloud from the functionality point of view, which may have one or multiple capabilities or resources such as computation, storage, communication, and other capabilities that enable the deployment of services and applications in the networks. However, instead of gathering all these functions in a centralized manner like the cloud, fog capabilities are usually distributed at a large number of ubiquitous and decentralized devices, which are usually close to the end users, network edge and access devices, such as smartphones, smart home appliances, edge routers, roadside units, vehicles, smart controllers, etc. A fog node may not be as powerful or rich in resources as a cloud, but may potentially cooperate to perform larger tasks or provide services.

Fog computing provides many promising features and opportunities that could improve the cloud-only architectural approaches. Being closer to the devices or the edge, fog nodes may better support applications with stringent end-to-end latency constraints or real-time requirements. For example, many IoT applications may have much lower latency tolerance than what may be achieved by the cloud. With fog computing, data analytics, control and other time-sensitive tasks may be performed closer to the end users to reduce the response time and access delay.

Besides latency reduction, fog also reduces the amount of data that needs to be sent to the cloud, saving the network bandwidth. The rapidly increasing number of connected things and the corresponding exponentially growing data generation rate bring great challenges to the network bandwidth and drive network congestion challenges. While with fog computing, data may be processed at the edge without being transmitted to the cloud, or the amount transmitted can be significantly reduced after data processing.

Moreover, uninterrupted services with intermittent connectivity to the cloud may benefit from fog. In some scenarios with intermittent network connectivity to the cloud, it may be difficult or impossible for the cloud to provide services, such as the systems with vehicles, drones, and oil rigs. In these cases, a local fog system can operate autonomously to provide the service even without connectivity to the cloud.

Despite the above mentioned advantages over cloud, fog is not designed to replace cloud, but to build a service continuum from the cloud to the things, where fog and cloud could complement each other to provide mutually beneficial and interdependent services. FIG. 1 is a block diagram of an example fog computing system architecture.

OpenFog

The OpenFog consortium was formed with the goal to create an open reference architecture for fog computing. The OpenFog consortium's OpenFog Reference Architecture for Fog Computing, February 2017 (OpenFog RA) defines a universal technical framework designed to enable the data-intensive requirements of IoT, 5G, and AI applications. See www.openfogconsortium.org/ra. OpenFog RA is a structural and functional prescription of an open, interoperable, horizontal system architecture for distributing computing, storage, control, and networking functions closer to the users along a cloud-to-thing continuum.

Various use cases are introduced in the OpenFog RA, including transportation with smart cars and traffic control, visual security and surveillance, smart cities, smart buildings, etc. The use cases focus on the concerns in performance control, latency, and efficiency, and present the advantages of OpenFog approaches such as additional security, awareness of client-centric objectives, agility of rapid innovation and scaling, real-time processing and control, and dynamic pooling of local unused resources.

The OpenFog RA defines the core driving principles as pillars, which act as the belief, approach, intent, and guidance of the reference architecture, and represent the key attributes for a system to embody the OpenFog definition. The pillars include security, scalability, openness, autonomy, programmability, reliability-availability-serviceability, agility, and hierarchy.

Security Pillar

The security pillar includes OpenFog node security, network security, management and orchestration security. The security pillar defines base building blocks starting from mandatory hardware root of trust on each fog node, and extending to chain of trust on other components, other fog nodes, and to the cloud, which ensures a secure end-to-end OpenFog deployment.

Scalability Pillar

The scalability pillar is defined to address dynamic technical and business needs of fog deployments, including all fog computing applications and verticals. The scaling opportunities could be found in individual fog node's internal hardware or software, addition of fog nodes on the same or adjacent levels of the fog hierarchy, demand-driven environment, and services of storage, connectivity, and analytics. The scalability may involve different dimensions in the fog networks, including performance, capacity, reliability, security, hardware, and software. With the scalability pillar, fog nodes may be enabled to adapt to different workload, system cost, performance and other changing needs.

Openness Pillar

Openness is required as a foundational principle to achieve fully interoperable systems and a ubiquitous fog computing ecosystem for IoT platform and applications. The openness pillar in OpenFog RA defines several major characteristics including composability of apps and services, interoperability between different suppliers, open communication near the edge to enable resource pooling, and location transparency to allow nodes be deployed anywhere in the hierarchy.

Autonomy Pillar

The autonomy pillar requires fog nodes to be able to continue to deliver functionality in the case of external service failures. A wide range of autonomy functions are supported, such as discovery, orchestration and management, security, operation and cost savings, which do not rely on a centralized operation entity.

Programmability Pillar

Programmability pillar defines the re-tasking of a fog node or a cluster of fog nodes to accommodate operational dynamics and thus enables highly adaptive deployments. With the programmability of fog nodes, adaptive infrastructure, resource efficient deployments, multi-tenancy, economical operations and enhanced security could be achieved.

Reliability, Availability, and Serviceability (RAS) Pillar

Reliability, availability, and serviceability (RAS) pillar involves hardware, software and operation areas, and plays an important role in OpenFog especially in harsh environmental conditions and remote locations. The reliable aspect requires the deployment to continue to deliver functionality under both normal and adverse operation conditions. Availability, usually measured in uptime, ensures continuous management and orchestration. Serviceability ensures correct operation of the fog deployment.

Agility Pillar

Agility pillar transforms huge volumes of data generated in the fog deployments into actionable insights by creating context close to the data generation, thus enabling quick response to the highly dynamic nature of fog deployments.

Hierarchy Pillar

The hierarchy pillar is the main reason that the OpenFog architecture could become complementary to the traditional cloud-only architecture. The resources in the OpenFog RA can be viewed as a logical hierarchy based on the functional requirements, including devices, monitoring and control, operational support, surrogacy, and business support, where each layer addresses a specific concern of the system. The hierarchical fog deployments can result in different models by combining and deploying fog and cloud into different layers depending on the scenarios.

Based on the eight pillars, the OpenFog RA further describes the architecture in functional and deployment viewpoints. How the OpenFog architectural elements and views may be applied to address various concerns in a given scenario may be shown in a functional viewpoint, while how the fog systems are deployed may be defined in a deployment viewpoint. A multi-tier deployment is often exploited, where the number of tiers may be determined depending on the scenario requirements, and the fog nodes that are required to communicate within the fog hierarchy to discover, trust and utilize services of other nodes.

The OpenFog RA also provides an abstract representation of an instance of a fog node, which consists of multiple structural aspects (views) and cross-cutting concerns (perspectives). Three views have been identified, including software view, system view, and node view. These views address multiple stakeholders such as a silicon manufacturer, system manufacturer, system integrator, software manufacturer and application developer. The node view includes protocol abstraction layer and sensors, actuators and control. The system view is composed of hardware platform infrastructure, hardware virtualization and other views coupled with node views. The software view includes application services, application support, node management and software backplane, while the last is coupled with other views in the architecture. The perspectives defined in the abstract architecture includes performance and scale, security, manageability, data analytics and control, IT business and cross fog applications, which are employed throughout the architecture layers.

Example Use Cases

A variety of use cases may be enabled by, or benefited from, fog computing. Two examples are drones and traffic controls.

Drone Use Case

Drones with fog capabilities can be operated in many environments and applications, such as supply chain delivery, environment surveillance, and video broadcasting, providing near real-time adjustments and collaboration in response to anomalies, operational changes or threats. As self-aware individual fog nodes, drones can interoperate and cooperate as a dynamic community to efficiently distribute services across compute, storage, networking, security, and other functions.

Figure 2:
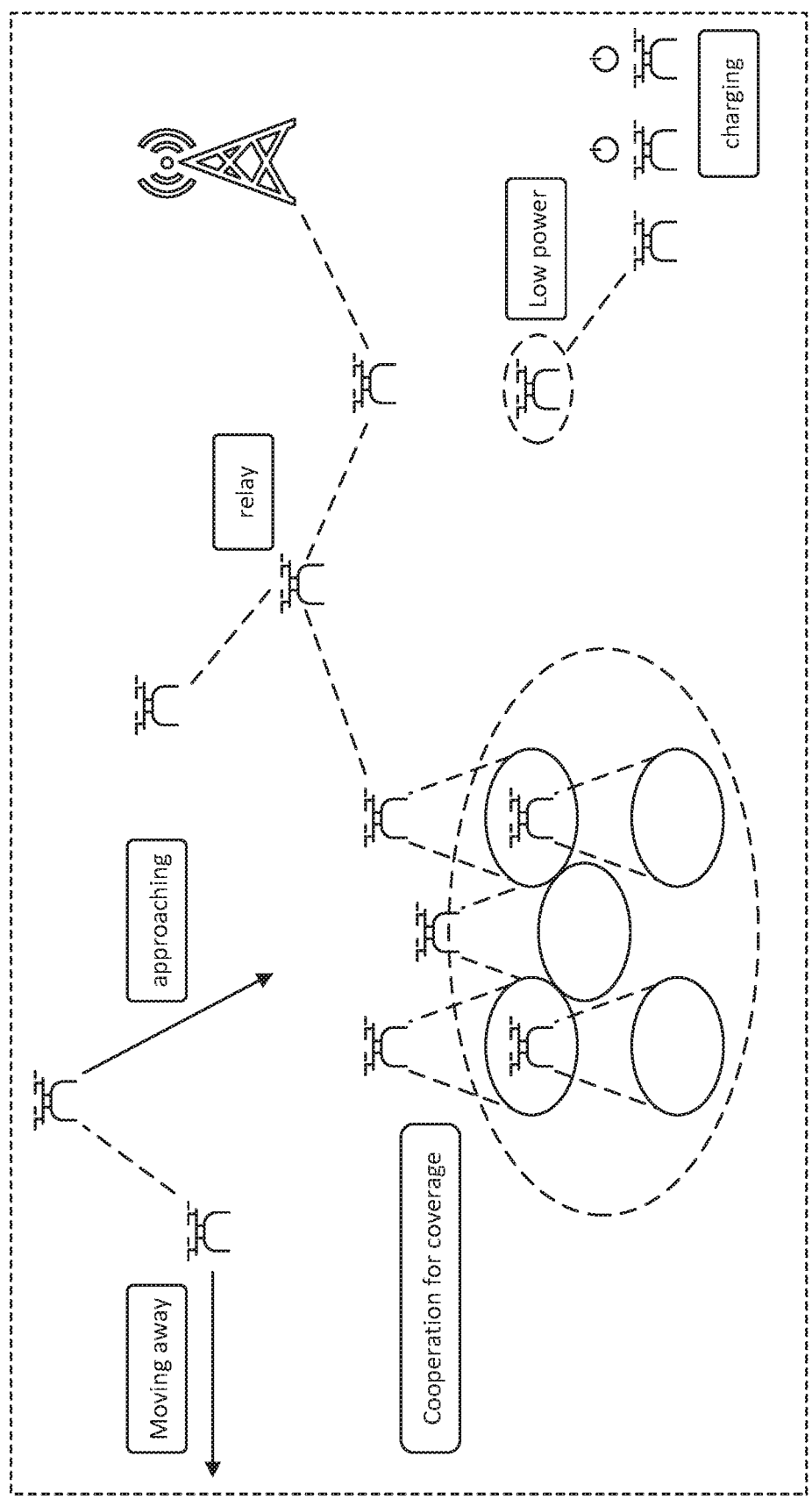
FIG. 2 is a block diagram of an example drone use case.

In many scenarios, a swarm of drones may need to be operated cooperatively to provide service, since each drone itself is limited by the capabilities and coverage. FIG. 2 is a block diagram of an example drone use case. In FIG. 2, each drone can only monitor a limited area, and surveillance over a large area may require the combination and synergy from multiple drones' monitoring. Moreover, a drone may need another's communication capability to help relay messages to a destination out of its reach. The cooperation is also necessary when considering the dynamic availability of drones due to mobility and limited power supply. A drone low in power might be turned off until it is recharged, during which time the associated fog capabilities are lost and may need to be accommodated by other drones. A drone flying away from some area may look for a replacement to continue the ongoing service in this area. These concerns require a coordination scheme not only to associate drones into a community but also to adapt to the dynamic nature of drones.

Traffic Control Use Case

Fog computing may contribute a new approach in dealing with traffic congestion. With the flexibility to leverage traffic-related big data, municipalities can take measures to alleviate congestion by connecting and analyzing fog nodes such as roadside units, roadside sensors, and on-board vehicle devices, which enables traffic redirection based on real-time data.

Figure 3:
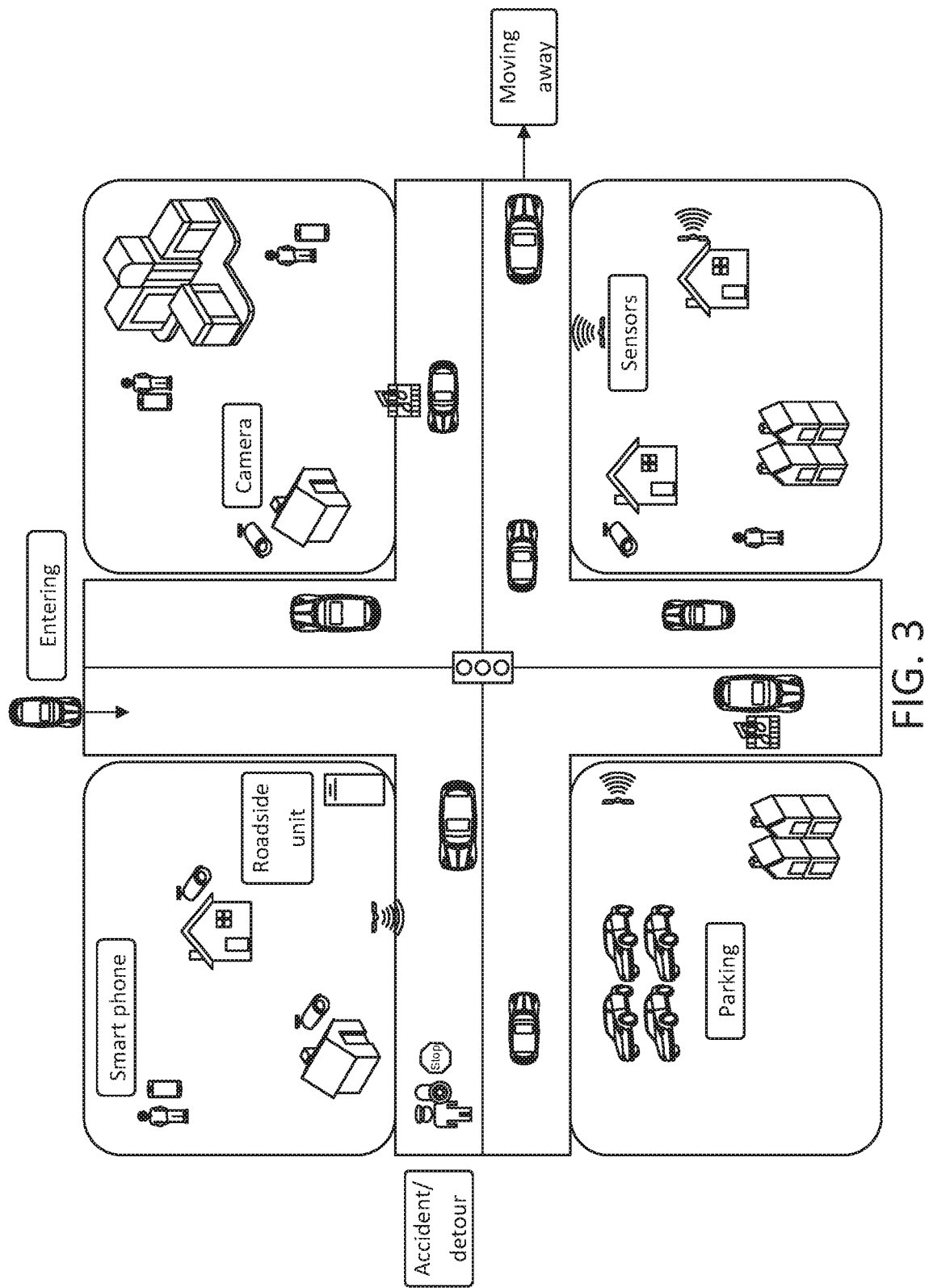
FIG. 3 is a block diagram of an example traffic control use case.

However, some of the fog nodes such as on-board vehicle devices may again bring dynamicity to the fog systems due to the mobility of vehicles. It is difficult to maintain fog node cooperation among several moving vehicles since they may be joining and leaving frequently. FIG. 3 is a block diagram of an example traffic control use case. In the example of FIG. 3, a traffic signal light controlled by fog service requires traffic information in neighboring blocks, which can be obtained from roadside units and vehicles in this area. However, such a task cannot rely on a fixed set of vehicles since their presence are temporary and may become unavailable once they leave the area. On the other hand, simply excluding these mobile resources will result in a waste of resources and low service efficiency. Moreover, on-board vehicle devices may also provide other services such as infotainment applications. When an accident or emergency happens, in order to make a quick response and provide necessary assistance, the ongoing infotainment services should give away the occupied fog capabilities to those higher priority tasks, and resume thereafter. Such dynamics of service requests are coupled with mobility, creating a more complicated fog scenario that requires efficient management and coordination methods.

Example Challenges

As can be seen from the use cases, a fog service request usually takes multiple fog nodes' cooperation to complete since the fog nodes have finite resources and capabilities. Therefore, fog nodes may need to work cooperatively in a group to provide services. However, there are currently no procedures defined for grouping fog nodes. Without a proper grouping scheme, fog nodes have to provide services individually, which greatly limits the efficiency, even feasibility of the fog service.

Correspondingly, how to select fog nodes to form a group, how to distribute the request to different fog nodes, and how to manage and coordinate fog nodes in a group have to be investigated. Procedures of group based service can be seen in some existing approaches such as service pooling, however, grouping fog nodes brings a unique challenge since the grouping in fog system has higher dynamicity in the sense that a fog node may have varying capabilities or availabilities. The existing procedures can still be applied if ignoring the dynamic nature, however, it may lead to performance degradation in terms of reliability or serviceability. For example, in the traffic control use case, the capability of a group formed with vehicles within an area may become invalid if the vehicle associated with the desired capability leaves the area. On the other hand, taking the dynamics into consideration may preserve service quality, but will also introduce additional cost and overhead in frequent status updates and information exchanges. Again, in the traffic control use case, a new group of fog nodes can be formed whenever a vehicle joins or leaves the area to ensure the capability information is up to date, but it will lead to high overhead for frequent constructing/re-constructing of groups. Therefore, the grouping procedures should be designed to balance the above trade-off and adapt to dynamic fog environments.

Although the dynamics of fog nodes bring difficulty in designing the grouping procedures, the information can be exploited to improve the efficiency of the designs. Not all the fog dynamics are random or unpredictable, and some of the dynamics can be learned or predicted through scheduling or context information. For example, if it can be predicted when a fog node may become available/unavailable at some future time according to its scheduling information, location or power level (e.g., the delivery schedule or recharging time of a drone, the presence time of a vehicle in a block), then the grouping can be adjusted in advance to utilize/accommodate the addition/loss of this node.

Moreover, the grouping procedures should be adaptive to changes of request, capability, or performance requirements. For example, a group of fog nodes is working on a long-term low-priority request when a short-term high-priority task is received, which has similar capability requirements as the previous task. Without a proper adjustment scheme, the group has to either abandon the current request or delay the second request for a long time. Taking such an issue into consideration, the grouping of fog nodes should be flexible in scenarios such as scaling up or down the workload, performance, group size, entering or leaving of group members, and time-sequential request.

Example Approaches

This paper proposes methods and mechanisms for efficient group management of fog nodes in order to provide services to users. Unlike cloud nodes, fog nodes have finite resources and capabilities and their resources and capabilities may be combined together in order to complete a large fog request. A fog leader initiates Capability Discovery of nearby fog nodes to form potential fog node groups that may be used to provide fog service to user requests. Then Service Reservation is determined based on the requirements of the user request and the available fog capability known to the leader, where a group of fog nodes are chosen to provide fog service for the request. When Providing Fog Service, the fog leader may coordinate the group members and aggregate the members' responses, during which Service Update may occur due to changes in a user's request or changes to the status or involvement of fog nodes in the group. Finally, Service Completion signifies the completion of the user's request.

Fog nodes provide their capabilities to the leader fog node in the form of Potential Fog Capability (PFC) and optionally, Available Fog Capability (AFC). Using knowledge of these capabilities, the fog leader may request fog capability(s) (QFC) from a fog node upon processing a user request. If a fog node accepts the QFC, it reserves the fog capability (RFC) and then becomes a member of the Service Group. Note that the leader may split the user request into multiple sub-requests, each serviced by a fog node of this Service Group in order to complete the user request. The Occupied Fog Capability (OFC) pertains to the capabilities used by each fog node member to process a sub-request.

Fog Capability

Fog capability corresponds to different types of capabilities or resources such as computing, storage, control, networking, services, etc. Fog capability could be measured in the amount, quantity, quality or coverage depending on the type.

Fog Node

A fog node is a node with certain types of fog capabilities or resources that can be shared with and leveraged by users and even other fog nodes. A fog node may have one or multiple types of capabilities, may also have other software or services that are running on the node. A fog node can be located at the edge of the network or higher layers. It is assumed that the fog nodes, especially the ones close to the edge, have limited capabilities compared to the cloud, and the capabilities may not be available all the time.

Fog Leader

Fog leader is the fog node that will coordinate and group other fog nodes together to service a fog request which demands large fog capabilities and cannot be completed at a single fog node. A fog leader will form both potential group(s) for fog capability discovery, and service group(s) for serving fog service requests. The fog leader could be located at any layer of the fog hierarchy, as long as it is capable of forming potential groups, creating service groups, and adjusting service groups.

Potential Group

A potential group is formed by a fog leader, consisting of fog nodes that have fog capabilities and can potentially contribute their fog capabilities to a fog service request as coordinated by the fog leader.

Fog Service Request

A Fog Service Request is a request is received by the leader from a requestor. It could be generated by the requestor, or generated by a user and forwarded by the requestor. The requirements of the service described in the request may not be directly expressed as fog capabilities, in which case the leader may need to interpret the request and translate it into fog capabilities. The fog service request may ask for completing a task, reserving capabilities for a period of time or consistently providing service. Correspondingly, the completion of service can be indicated by completion of the task, termination of reservation or the cancelation from the user.

Service Group: Service Group

A service group is a group of fog nodes that are selected by a fog leader to service a particular fog service request. When the fog leader receives a fog service request from a fog service user, the fog leader will create a service group, where each member is a fog node determined by the fog leader.

Request Splitting

Request Splitting refers to the process that the fog leader uses to interpret and divide a received fog service request into multiple sub-requests with each sub-request containing a relatively small portion of capability requirements, such that they can be handled by the fog nodes cooperatively in a service group. The splitting can also be done in time domain to adapt to the predictable availability of fog nodes.

Sub-Request

Sub-requests are generated by the leader by splitting the fog service request to distribute split requests to service group members. A sub-request may contain descriptions of the desired capability, and related information that might be needed by the service group member that receives it, such as who or how the member should contact during the service or after service completion.

Auxiliary Request for Connection (ARC)

Auxiliary Request for Connection (ARC) is an auxiliary request that is not required in the fog service request, but generated by the leader to assist intra-group communication or handover between service group members, which can be used when replacing service group members or performing sequential requests.

Potential Fog Capability

A Potential Fog Capability (PFC) PFC is the maximum capability that a fog node is willing to contribute to a certain potential group, which is announced to the leader by the fog node when joining the potential group. A fog node may set specific PFCs for different potential groups. PFC could be equal to the physical capability of a fog node if the node is willing to share all of its capabilities. Otherwise, if the node is not willing to contribute all of its capabilities, then PFC may set as the sharable amount. PFCs describe the capability that can be potentially contributed, but may not be available all the time.

Available Fog Capability

An Available Fog Capability (AFC) is the real-time available capability of a fog node, which will not exceed the corresponding PFC. AFC could be announced and updated to the leader by the potential group member, or retrieved by the leader with an inquiry. As mentioned in PFC, even if a node is willing to share its capability, the capability may not be available at certain times.

Requested Fog Capability (QFC)

Requested Fog Capability (QFC) is the capability required by a leader when forming a service group. QFC is set by the leader according to the requirement in the fog service request, and sent to potential group members that are selected to form a service group, which will not exceed the corresponding AFC of the potential group member known at the leader. However, since the AFC information at the leader may be inaccurate or outdated, QFC may exceed the actual AFC of a fog node.

Reserved Fog Capability (RFC)

Reserved Fog Capability (RFC) is the capability reserved at a fog node when it confirms to join a service group. The RFC is set by the fog node and will not exceed the AFC of the node. RFC is considered unavailable for requests outside of the corresponding service group, and can only be used for request(s) from the leader who forms the service group. RFC could be equal to QFC, smaller than QFC (after negotiation) or larger than QFC (for local back up).

Occupied Fog Capability

Occupied Fog Capability (OFC) is the actually used capability when working on a request in a service group. OFC could be set by the leader, or be a flexible value that changes during the service. When OFC is set by the leader, it could be equal to, or smaller than RFC. In the latter case, the extra part of reservation provides a surplus margin that could be used as back up.

Group Based Fog Service Architecture

Figure 4:
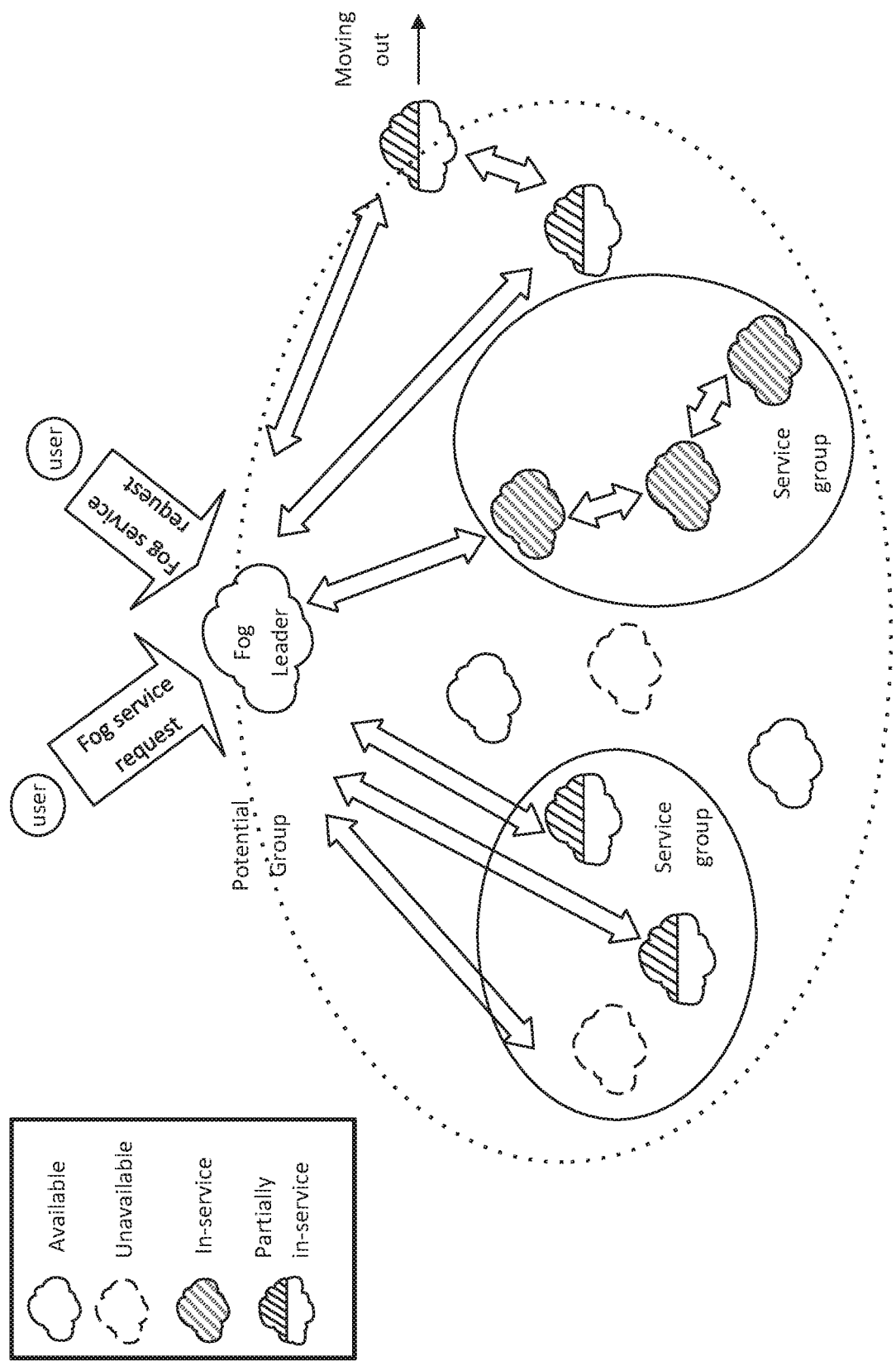
FIG. 4 is a block diagram of an example group-based fog service architecture.

FIG. 4 is a block diagram of an example group-based fog service architecture. A leader (fog node) may be responsible for managing and coordinating fog nodes to provide group based fog services. To balance the trade-off between serviceability and overhead and enhance the efficiency of grouping dynamic fog nodes, the concepts of potential group and service group are proposed, while the former provides lightweight capability discovery and the latter provides flexible service to fog service requests. The availability of fog nodes and fog service requests may change dynamically, which requires the fog leader to have responsive methods to efficiently manage groups of fog nodes.

Figure 5:
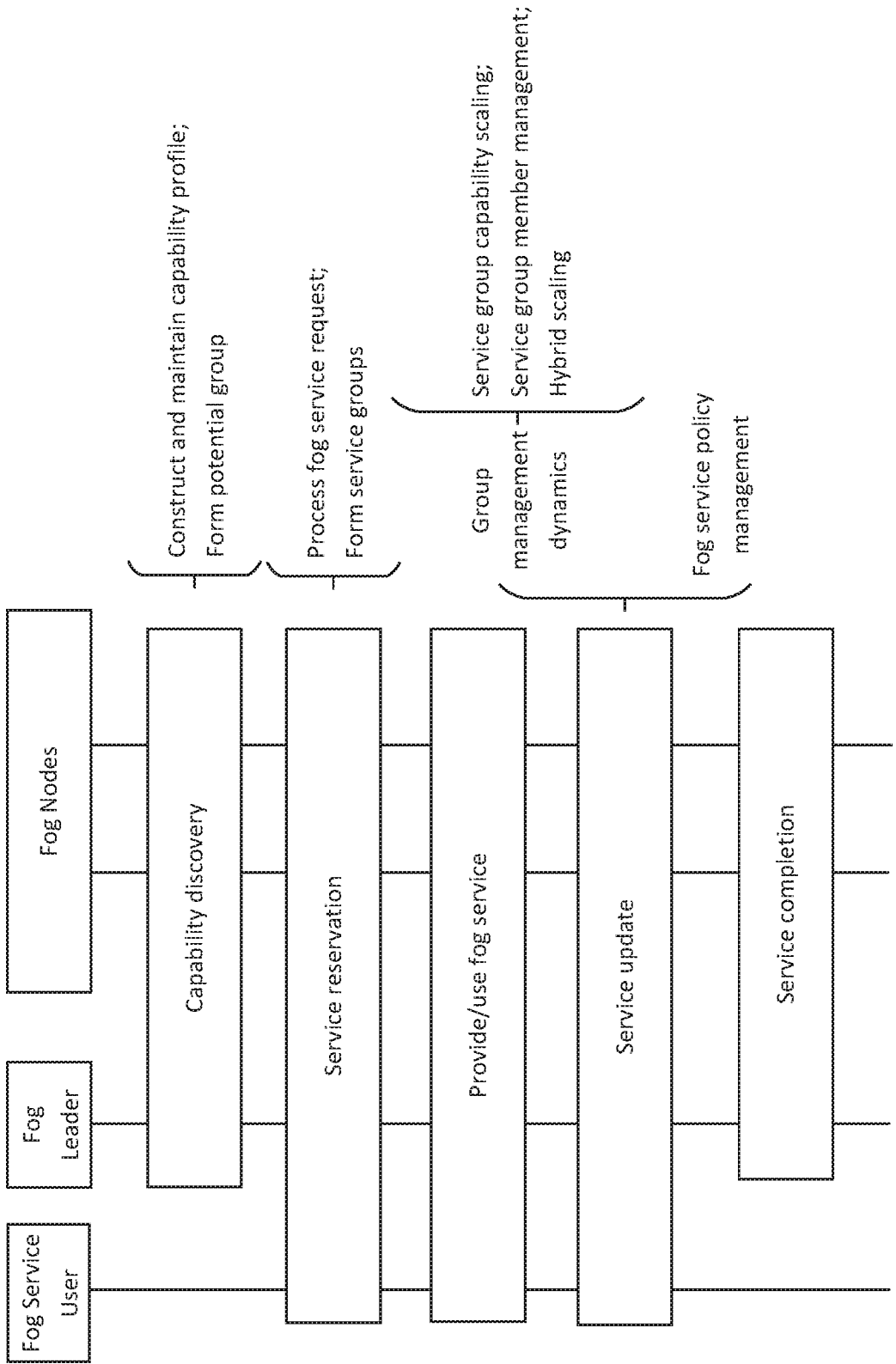
FIG. 5 is a flow diagram of an example group-based fog service process.

The group-based service architecture consists of the following major stages (as shown in FIG. 5).

Fog Capability Discovery

For fog capability discovery, it is assumed that the leader can discover fog node capabilities or fog nodes report their capabilities to the leader; the details of fog capability discovery may be described later in this disclosure. Before receiving any fog service request, a leader will form a potential group to track the fog nodes including their capabilities. The leader will construct and maintain a capability profile to record the PFCs (and AFCs) of each potential group member, based on results from fog capability discovery, which can be used as the reference or hints when selecting appropriate fog nodes from a potential group to form a service group to complete an incoming fog service request.

Service Reservation

Service reservation: After a fog service request arrives at the leader, the leader will interpret the request to get information of what and how much capabilities are required, and select fog nodes from potential group to satisfy the requirements. Based on that, the request may be split into subrequests and distributed to the selected fog nodes to form a service group. Then, the leader will determine and set QFC, RFC and OFC to specify the requirements, reserve fog capabilities and assign workloads for each service group member.

Providing Fog Service to User

Providing fog service to user: After the service group is formed and the required capabilities are reserved, the service group may begin to provide fog service to the requestor or user. This stage may trigger group dynamics that may be handled in the next stage.

Service Update

Service update: The capabilities of service group member (s) may be changing and result in group dynamics. The update of fog service request, receiving multiple requests competing for the same members, or a time sequential request may also trigger the group dynamics since the leader will need to make adjustments to the service group to adapt to the changes. As such, the leader needs to adjust or adapt the service group accordingly. The related adaptation procedures may include the capability scaling of the service group, add/remove/replace service group members, and combinations of them. Fog service policy management is involved to assist the group management procedures.

Service Completion

Service completion: After the fog request is completed or the subscription/lease of fog capabilities terminates, the corresponding service group may be disbanded and the reserved capabilities released.

Capability Discovery

Potential groups may be formed based on fog capabilities. Fog capability discovery may be achieved in a variety of ways. Herein, for simplicity, it is assumed that the leader knows, or is able to acquire, the capabilities of fog nodes. The leader may then assess groupings and dynamics of the capabilities.

Capability Profile

In order to adapt to the dynamics of fog nodes' capabilities and control the communication overhead, PFC and AFC are defined. The leader maintains a capability profile, which includes PFCs and AFCs of fog nodes in the potential group. The capability profile of the fog leader contains the following entries:

Potential Group Member

The potential group members is a list of fog nodes in the potential group.

Capability Information

Capability information contains the information for each type of capability at the member fog node, including capability type (e.g., storage, computation, sensor) and measurement (in terms of amount, size, power, coverage, etc.). The measurement could be either a fixed value (e.g., "1 GB storage", "1 Mbps network bandwidth", "video cameras on the second floor") or a range (e.g., "800 kbps to 1 Mbps bandwidth"). A temporary capability may be labeled as "temporary" in the capability information.

Long-Term Dynamics

Long-term dynamics contains predictable long-term dynamics of the corresponding capability, such as scheduling information. For example, if a fog node is scheduled to be switching between on and off states periodically, its capabilities will present the same dynamics and the information may be recorded as the long-term dynamics.

Potential Fog Capability

Potential Fog Capability (PFC) is the maximum capability that a fog node is willing to contribute to a potential group. PFC describes the "amount" of the capability, which can be expressed as a value or percentage. For example, a node with "1 GB storage" contributing half of its capability to the potential group may set its PFC as "500 MB" or "50%", with the former expressing the absolute amount and the latter expressing the percentage. With the complete descriptions recorded in capability information entry in the capability profile, the leader is able to match the expression of PFC ("50%") to the corresponding full description of capability information ("1 GB storage") and find the exact value ("500 MB storage").

Capability information, long-term dynamics and PFC of a fog node are added to the capability profile by the leader when the node joining the potential group, which is considered as stable information and will not be updated frequently due to the large communication overhead. However, PFC only shows the potential contribution a fog node can make, but is not able to reflect the real-time availability or short-term information about the fog node, which is the reason to introduce the following definition of AFC.

Available Fog Capability

Figure 6:
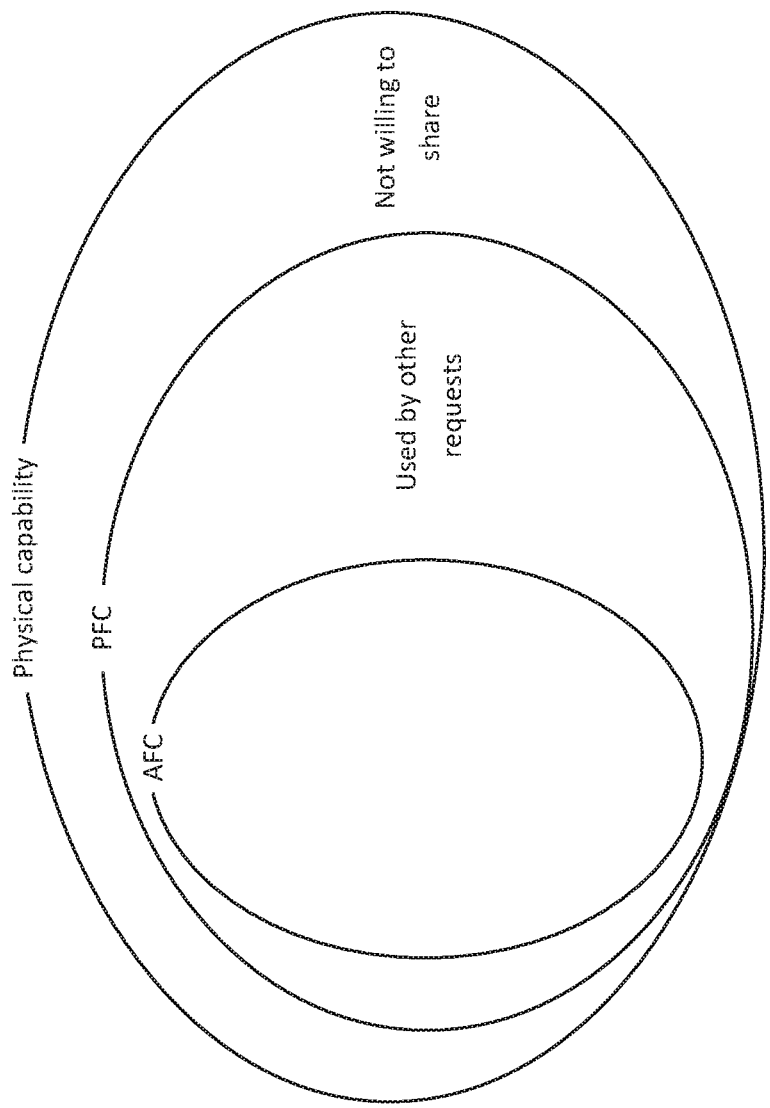
FIG. 6 is a Venn diagram of an example relationship between Potential Fog Capability (PFC) and Available Fog Capability (AFC).

Available Fog Capability (AFC) is the real-time available capability of a fog node. For example, a fog node low in battery may be turned off and become unavailable, where its AFC becomes 0 no matter what is the PFC; later the fog node may be turned on again after recharging, and its AFC will recover to be equal to PFC. In addition, if the capabilities of a fog node are reserved for a fog service request, the reserved amount may be subtracted from AFC, and the AFC will shrink to the remaining capabilities. FIG. 6 is a Venn diagram of an example relationship between Potential Fog Capability (PFC) and Available Fog Capability (AFC).

A fog node may also include a prediction of its AFC if it is predictable. For example, if a node may be shut down (AFC becomes 0) after 5 minutes, then its AFC may contain both the current available capability and a prediction saying "0% after 5 minutes". Different from the long-term dynamics, the prediction parameter can be used to express predictable short-term changes of the availability. The prediction parameter can also be used for temporary capabilities to indicate the available duration.

An example of the capability profile is shown in Table 2.

TABLE 2

Example of capability profile

| Fog node | Capability information | Long-term dynamics | PFC | AFC: current, prediction (optional) |
|---|---|---|---|---|
| Fog node 1 | Sensors on 2$^{nd}$ floor | from 8 a.m. to 5 p.m. everyday | 100% | 100% |
| | 1 GHz CPU | Switch between on/off every one hour | 80% | 50% |
| | 1 GB storage | | 100% | 0% |
| Fog node 2 | Capability A | | 100% | 50%, 100% after 1 hour |
| | Capability B | | 100% | 100% |
| | Capability C | | 100% | 100% |
| Temporary | Temporary Capability E | | 100% | 100%, 0% after 5 min |

In the capability profile at the leader node, PFC is considered stable (not changing with time), while AFC is not due to the changing availability of the fog node. Therefore, the AFC stored in the leader's capability profile may be outdated and inaccurate. To get the real AFC, the leader may need to communicate with the fog node. To avoid frequent updating of AFC, an "update-on-demand" approach is taken. In other words, a fog node does not have to update its AFC if it is not used in providing any fog services. To this end, AFC could be included in the response message sent from the fog node as a member to the leader after the leader contacts the fog node. Optionally, AFC can be announced and updated to the leader by the potential group member, or retrieved by the leader with an inquiry. The frequency of sending AFC inquiry can be determined by the leader to balance the trade-off between accuracy of AFC and communication cost. If the leader wants to know the accurate information, it may send inquiries frequently or periodically; if a fog node is not often used, the leader can send occasional inquiries or even no inquiry.

Potential Group

A potential group is formed by a leader and consists of fog nodes that can potentially contribute their capabilities to complete a fog service request cooperatively with the leader's coordination. The potential group is formed before receiving a fog service request, where capability discovery is done beforehand to reduce the response time (for forming a service group) after receiving the request. In other words, the potential group provides the leader some preliminary knowledge of the members' capabilities, which serves as a reference of which fog node(s) should be selected after receiving the request. Potential groups could be formed based on different criteria. For example, a potential group could include certain number of fog nodes that provide the same type of capabilities. In another example, a fog service may need to use multiple types of capabilities together; accordingly, fog nodes that together provide all those types of capabilities can form a potential group. A potential group can also be formed to only include the fog nodes with specific capabilities.

Figure 7:
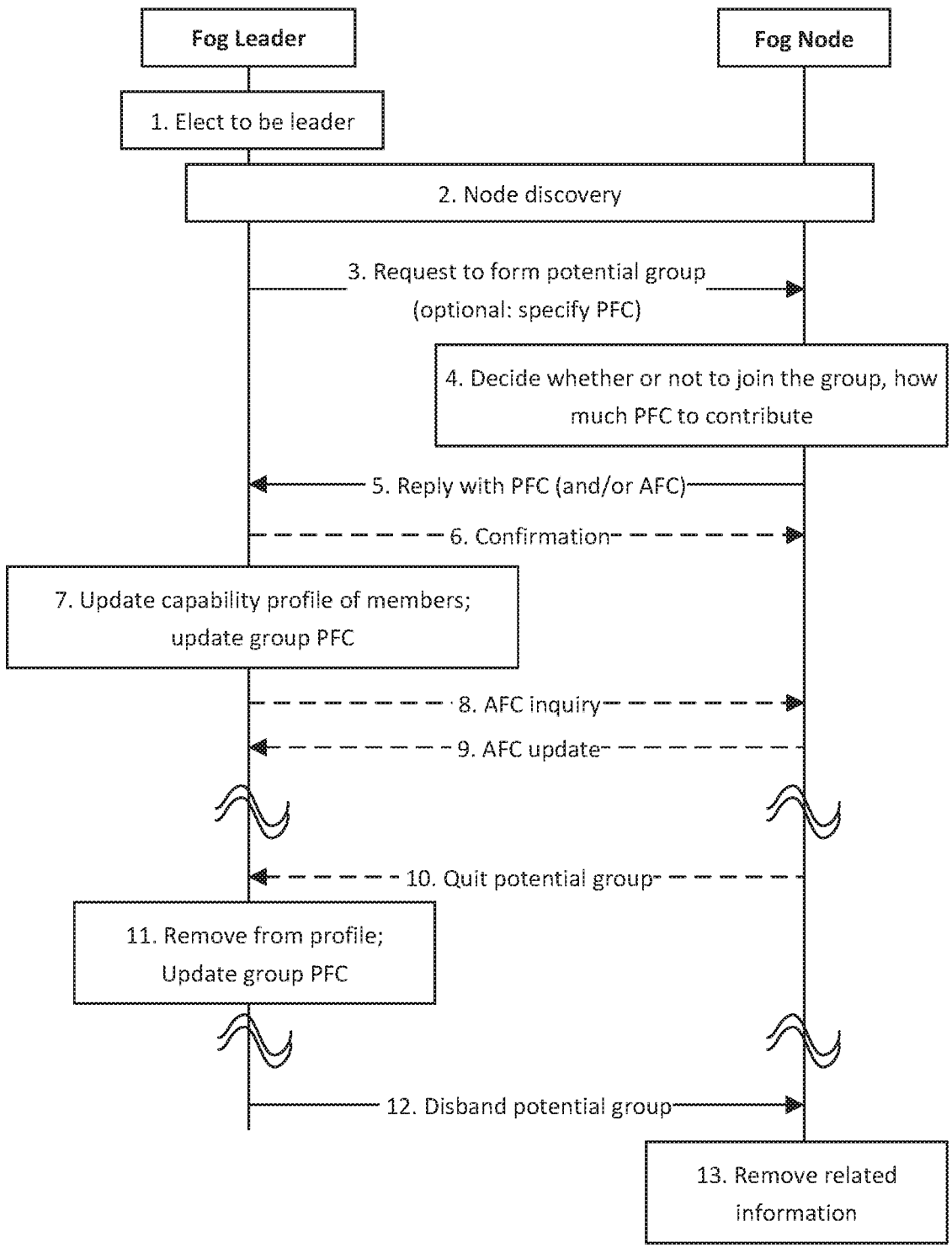
FIG. 7 is a flow diagram of an example fog capability discovery process.

The potential group only requires message exchange between the leader and members at the beginning when forming the potential group. In addition, a fog node does not have to dedicate its capabilities to a potential group, in the sense that a fog node can join multiple potential groups at the same time, and is free to contribute its capabilities to any leader of the joined potential groups. FIG. 7 is a flow diagram of an example fog capability discovery process which may be used, e.g., to form a potential group.

In Step 1 of FIG. 7, a fog node elects to be the leader if it is willing to and capable of coordinating or managing several fog nodes to complete a future request. The leader may indicate "leadership" as its capability so that other nodes may join its potential group proactively.

In Step 2, the leader discovers other fog nodes within its reach, or the nodes it is interested in (e.g., certain type of fog nodes). The leader may also discover the fog capabilities of the nodes, but will not add them into the capability profile. Similarly, non-leader fog nodes, if intend to join a potential group to share their capabilities, can also discover the leader and its capabilities.

In Step 3, the leader sends requests to the discovered fog nodes to form a potential group. The grouping request asks for the PFC (and other capability information, if not discovered in Step 2) of the contacted node. If the leader is targeting some particular fog capabilities in forming the potential group, it will indicate the desired capability in the request. If joining the potential group is initiated by the fog node, then this step may be skipped.

In Step 4, upon receiving the request, the fog node decides whether or not to join the potential group formed by this leader. For example, the node may join the potential group leading by a known leader with which it has cooperated before, while decline the grouping request from a leader that is too far away from it to avoid communication cost. If a node agrees to join the potential group, it will set the PFC that it would like to contribute. Joining a potential group does not require the fog node to stay available or reserve any capability for this group. A fog node is able to join multiple potential groups at the same time, and will set PFC for each potential group accordingly. If a fog node intends to join a potential group before receiving the grouping request from the leader, it may set the PFC as soon as it discovers the leader.

In Step 5, if the fog node agrees to join the potential group, it will reply to the leader with its PFC, and optionally AFC. The node will locally record this PFC and the associated potential group ID. If the fog node's capability is temporary and it is willing to share the capability with this leader, it will reply to the leader indicating the capability is temporary, and include the available period in AFC (with prediction parameter) if possible.

In Step 6, if joining the potential group is initiated by the fog node, the leader will send a confirmation to notify the node that it has been added to the potential group, along with necessary information of the potential group (e.g., potential group ID).

In Step 7, after receiving the reply from a fog node or accepting a fog node to join, the leader adds the fog node into the potential group by creating an entry in the capability profile for this node. The leader may summarize the PFCs of all the members in the potential group (e.g., calculate the total amount/coverage for each type of capability) to obtain the group's potential capability.

In Step 8, the leader may send an AFC inquiry if it wants to know the current AFC of a member node or update the member's AFC in the capability profile. The inquiry may be used to check whether a member node is still in the potential group. Moreover, the inquiry may be utilized to measure the communication capabilities of the member node, such as the transmission quality or bandwidth between the member node and the leader.

In Step 9, the member node sends an AFC update to the leader upon the inquiry. The AFC update may also be initiated by the member fog node by sending its AFC (update) to the leader.

In Steps 10 and 11, if a fog node wants to quit the potential group, it will send a notification to the leader. After receiving the notification, the leader will remove the corresponding capability profile entry of this node and update the group capability by subtracting the amount contributed by the leaving node. Alternatively, if the leader believes a member node is no longer available or needed (e.g., the member node has not replied to the leader's inquiries for a long time), the leader may directly remove the fog node from potential group without waiting for its notification.

In Steps 12 and 13, a potential group could be disbanded by the leader sending disband notifications to all the members. The members will remove related information of this potential group after disband.

Service Reservation

Following capability discovery, when a fog service request arrives, the fog leader will process the request and form a service group to reserve capabilities for the fog service request.

Request Pre-Processing at Leader

A leader may pre-process the received fog service request to be distributed to the fog nodes.

Member Selection and Capability Based Splitting

After receiving a request, the leader will first interpret the request to find out what and how many capabilities are required so that it may map the "need" in the request to the "supply" in the capability profile of the potential group. The request may ask for a certain amount of resources (e.g. 1 GB storage) to be reserved for a period of time, or to complete a task with or without a completion time constraint (e.g. perform data analysis on a set of data generated from video cameras (within 5 minutes)), or to provide consistent service (e.g. monitor the temperature of the building's rooms and calculate average value every hour). Accordingly, a fog service termination time may be defined in the fog service request to indicate whether the service is completed upon reaching specified time, or upon completion of request, or terminated by the user.

Due to the limited capabilities of fog nodes, usually a request cannot be completed by a single fog node rather it requires a group of fog nodes. In this case, the leader will select members from the potential group to form a service group. The selection may be based on the PFCs or AFCs in the capability profile kept at the leader. The fog service request is then split into sub-requests for each selected fog node. For example, the request may ask to monitor the sensor readings in a large area, while each member in the potential group may only cover the sensors in a small area. In this case the request may be divided into sub-requests with each one corresponding to a sub-area covered by one fog node, and the leader will then merge the results collected from the members to complete the request.

The leader itself may also contribute capabilities to the request. For example, the leader may view itself as one of the service group member, and keep the sub-request for itself. Besides, it is also the leader's responsibility to assemble and aggregate responses from service group members (as described in connection with FIG. 11 regarding providing fog service to a user). Moreover, since the leader has access to all the service group members, it is able to perform some high-level operations based on the aggregated responses. For example, in a data analysis request, the member nodes may provide preliminary analysis results based on small pieces of data as assigned in the sub-request, which are collected by the leader to perform a further analysis for the entire data set.

Besides the capabilities required from each member, the sub-requests may also contain necessary information indicated in the fog service request. For example, if the service requires the service group members to directly contact the requestor or user who generated the request, the address or ID of the requestor/user may be contained in the sub-requests.

Since the information in capability profile may be outdated or inaccurate, the request splitting may result in inappropriate sizes of sub-requests. For example, the sub-request might be requesting too large/small capabilities for a fog node whose AFC has been reduced/increased after the last update with the leader, or a member of the potential group is no longer available or reachable. In this case, a re-splitting might be necessary to change the sub-requests into appropriate sizes.

Time-Domain Splitting

Figure 8:
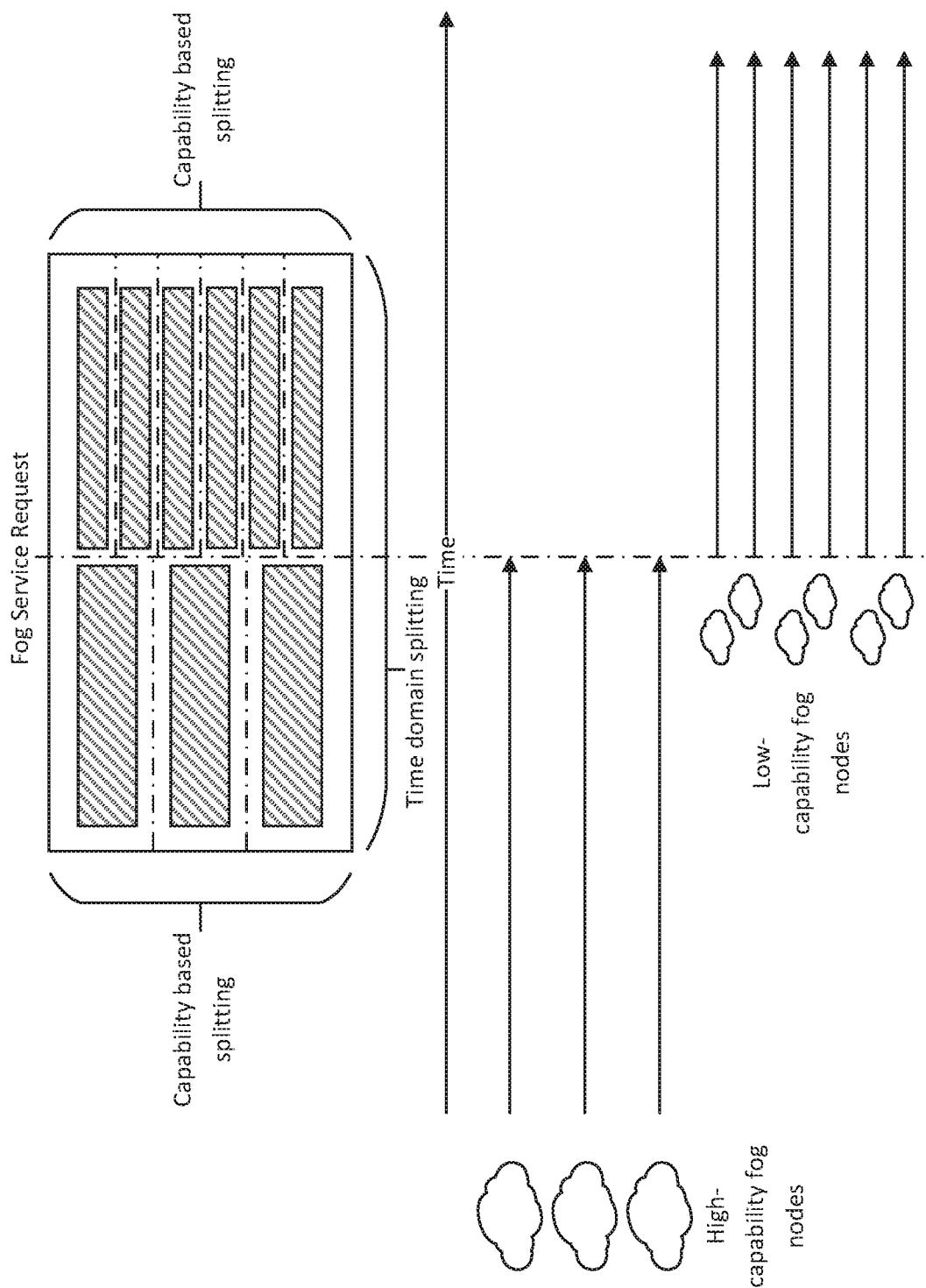
FIG. 8 is an illustration of example request splitting.

The fog service request may also be split in the time domain according to the predicted availability of service group members. FIG. 8 is an illustration of example request splitting. In the example of FIG. 8, a request is assigned to a set of high-capability fog nodes, however, these nodes are available for limited time, and may be replaced by a set of low-capability fog nodes when they become unavailable. In this case, in addition to the capability based splitting discussed above, the request will also be split into two segments in the time domain, with the length of the first segment equal to the available period of the high-capability nodes, and the rest for the low-performance nodes.

QFC Setting

QFC (required fog capability) is the capability required by a leader when forming a service group, which is set for each service member by the leader. The QFC set to a fog node will not exceed its corresponding AFC or PFC known at the leader. However, since the AFC information at the leader may be outdated and inaccurate, QFC may exceed the actual AFC of a fog node, which will trigger a RFC negotiation as in forming service groups, e.g., as described in reference to FIGS. 9, 10A, and 10B.

QFC is usually set as required in the sub-request. It may also be set to be larger than required, in case one of the service group member becomes unavailable during the service so that others may fill the gap and complete the request. An alternative approach to enhance reliability is to look for a back-up node when forming the service group. For example, if the sub-request distributed to the service group members are the same, a copy of the sub-request with the corresponding QFC may be sent to an additional node, who will join the service group as a back-up and act as the replacement if one of the normal members becomes unavailable.

If the requirement defined in the request is not a fixed value, QFC may be set accordingly. For example, if the request defines an acceptable range, then QFC may also be set as a range of capability (e.g., bandwidth range). If the request defines a constraint of performance, (e.g., an upper bound of the request completion time), the leader may also set a capability constraint in the QFC to guarantee the performance constraint may be satisfied. If the fog service request only specifies the required type of capability but does not specify the required amount, then the leader may set a QFC based on its own decision, and makes adjustment later during the service, as described in connection with FIG. 11 for providing fog services to a user.

Similar to AFC which may include a prediction value, QFC may also be set to indicate a future request or change of request. For example, the QFC may include a current value of zero and a future non-zero value and sent to the member node indicating a future incoming request, such that the fog node may be prepared for the future request.

Service Group Forming

A service group is the group of fog nodes that will work on a request received by the leader. A service group is formed after receiving the request, and the members are selected by the leader. Two more definitions of fog capabilities, RFC and OFC, are involved in service group forming for reserving capabilities and assigning workloads.

RFC (Reserved Fog Capability)

Reserved Fog Capability (RFC) is the capability reserved at a fog node when requested to join a service group. Each RFC has exactly one associated leader, but may have multiple associated requests, e.g., as discussed in connection with FIGS. 20 and 21 regarding intra-group multi-requests.

RFC could be set equal to QFC, if the node has enough available capabilities to satisfy the requirement (QFC≤AFC). If the current AFC is smaller than QFC, a negotiation may be triggered, where the fog node will propose a RFC by itself (smaller than QFC) and replies to the leader to see whether it may be accepted. RFC could also be larger than QFC, which may be viewed as a local back-up by the node, such that when the node loses part of the capability (resulting in a reduced RFC), the remaining RFC is still large enough to cover the requirement.

Similar to AFC and QFC, RFC may also be set to indicate a future value. For example, if the QFC asks the fog node to work on a request in a future time, the fog node may reserve capabilities for the future time period without affecting its current availability.

Occupied Fog Capability (OFC)

Occupied Fog Capability (OFC) is the actual used or occupied capability of a fog node when providing fog service in a service group. OFC could be set by the leader or left as a flexible value, depending on the fog service request. For example, if the fog service request asks to store a piece of data whose size is 1 GB, the OFC could be set to 1 GB; if the request asks to reserve 1 GB storage and will gradually add data into the storage, the leader will only set a RFC but no OFC, where the latter will start from 0 and increases as the reserved storage is occupied. If OFC is set by the leader, the value could be equal to, or smaller than that of RFC. In the latter case, the extra part of reservation provides a margin that could be used as back-up. In some scenarios, OFC could be scaled up or down within the RFC range to achieve performance scaling. For example, the computation capability of a smartphone fog node is reserved for data analysis, the OFC may be set to either use the full power to get the result as soon as possible, or only use half of the power to extend battery life.

If a leader chooses a fog node to work on multiple requests at the same time, it may maintain a separate RFC for each request, or combine them into one RFC but differentiate the capabilities allocated to different requests by separate OFCs. The latter approach has lower management cost at the member node, but is only applicable when the RFC is large enough to hold multiple OFCs for different requests and the OFC based back-up may be shared.

RFC and OFC are maintained as a part of the grouping information for each service group and kept at the leader, which may be created when the service group is formed, removed when the service group is disbanded, and optionally logged for possible reuse. Similar as AFC, they may be recorded as an amount or percentage, where the capability profile may be used as the reference to translate them into the full descriptions.

Figure 9:
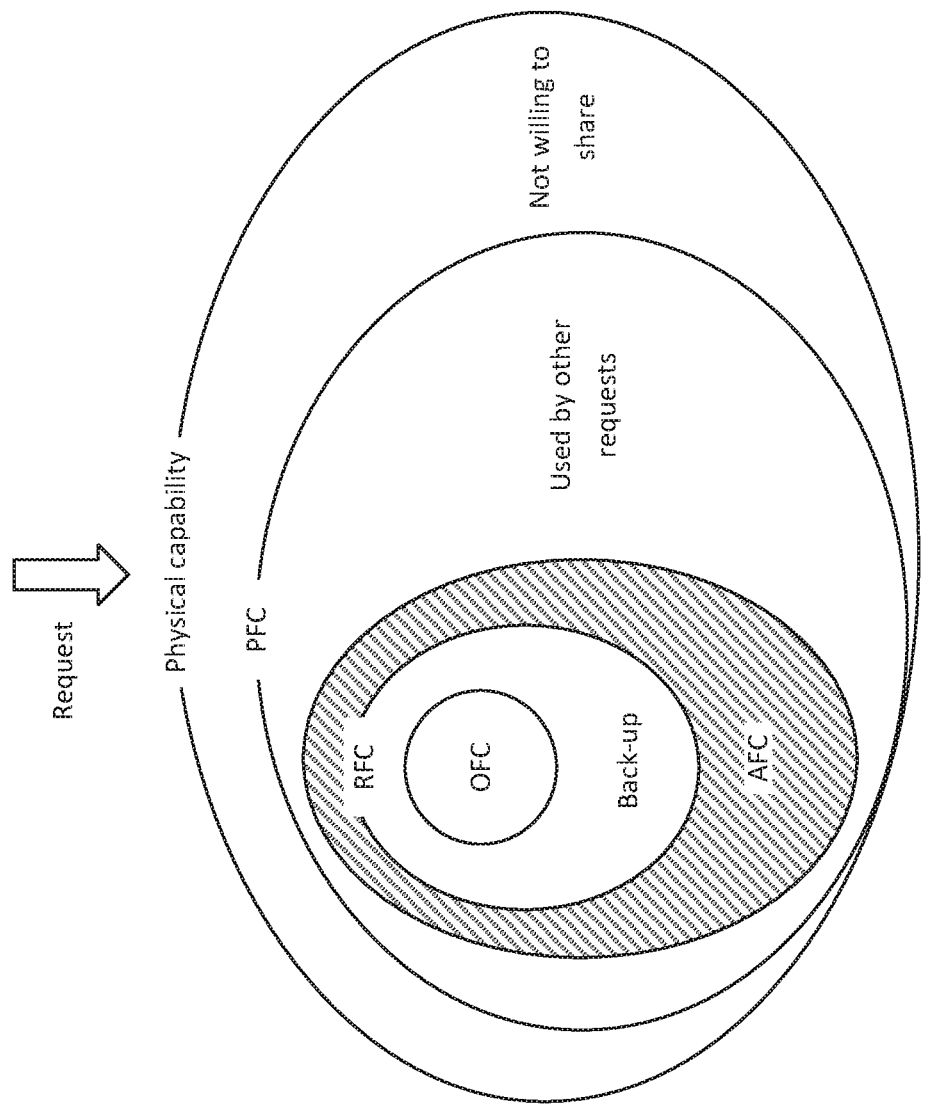
FIG. 9 is a Venn diagram of example relationships between of fog capabilities as variously defined.

FIG. 9 is a Venn diagram of example relationships between of fog capabilities as variously defined. FIG. 9 illustrates relationships between fog capabilities as defined for different purposes, where the fog node has received a request from the target leader (e.g., an update as shown in FIG. 6), where the RFC (the area within the oval labeled with RFC) includes the capabilities reserved for the request and the AFC is reduced to the remaining capabilities (shadowed area labeled with AFC). An OFC is set within the bound of RFC, and the gap between OFC and RFC may be viewed as the surplus capabilities for back-up.

Figure 10A:
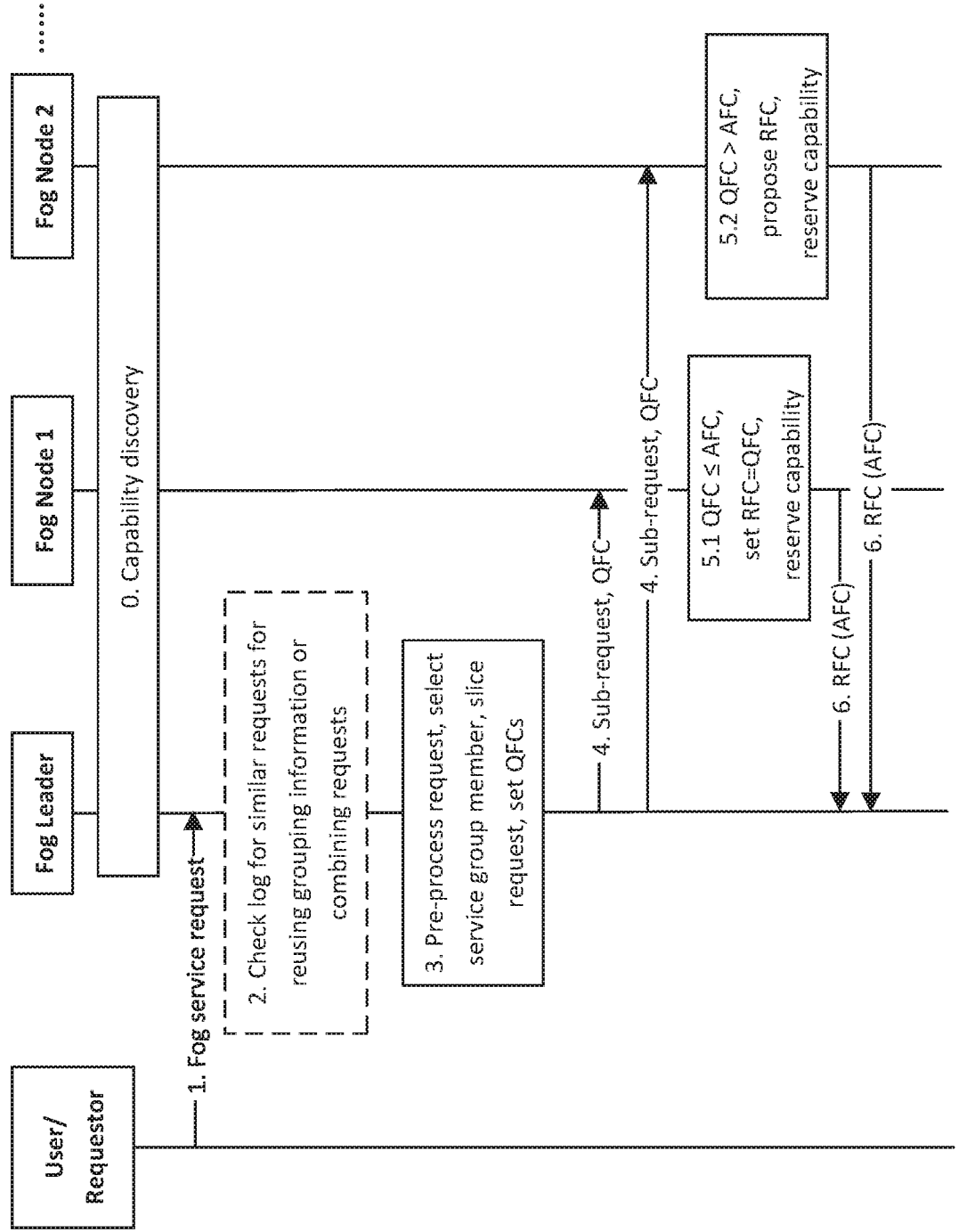
FIGS. 10A and 10B are a flow diagram of an example service group formation procedure.
Figure 10B:
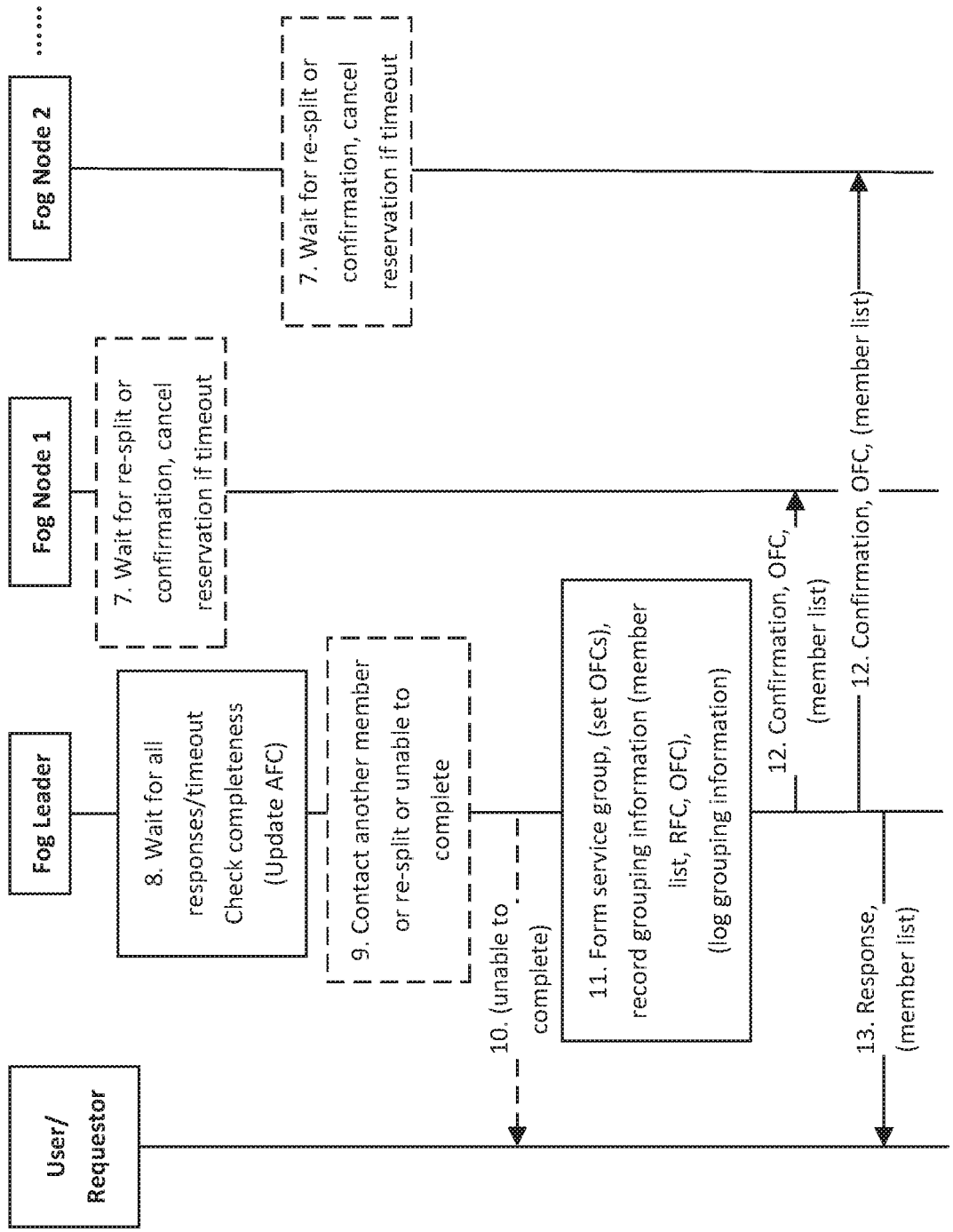

FIGS. 10A and 10B are a flow diagram of an example procedure for forming a service group.

In Step 0 of FIG. 10, the fog leader performs capability discovery by forming a potential group with several fog nodes. Since frequent update is not required in potential group, the capability information kept at the leader may be outdated or inaccurate.

In Step 1, the fog service request is sent to the leader from the requestor. The requestor could be an application or other entity in a service layer, could be either a fog node or non-fog node. The requestor may not be the generator of the request. For example, if a node receives a request that cannot be completed by itself, it may forward the request to a leader.

In Step 2, the leader may optionally keep a log of previously received requests and the corresponding grouping information. In this case, after receiving request, it will check the log to see if there is any similar one such that the grouping information could be reused. For example, if the requestor has sent a same request before, the leader may reuse the service group members who worked on that request. If the newly received request requires similar capabilities as an ongoing one, the leader may also check the possibility of combining these two requests for efficient grouping.

In Step 3, the leader will interpret the received request to map the demand into required capabilities, select fog nodes from potential group, split the request into sub-requests according to the capabilities of the selected nodes, and set QFC for each selected node accordingly.

In Step 4, after splitting, the sub-requests may be distributed to the selected fog nodes along with the required QFCs. This step may also be viewed as the request to join a service group. Optionally, the fog node may use this step to configure some fog service policies to the selected fog nodes instead of using separate procedures as described later in "Fog Service Policy Management".

In Step 5, the selected fog node, if agreeing to join the service group, will compare QFC with its current AFC.

In Step 5.1, if QFC is less than AFC, then the node is able to handle the sub-request, therefore the node will set RFC equal to QFC and reserve the capability.

In Step 5.2, if QFC exceeds the current AFC (since QFC is set according to an outdated AFC by the leader), the node may propose a RFC that does not exceed its AFC and reserve capability according to this RFC.

In Step 6, the contacted fog node sends a response to the leader with RFC. Optionally, the node may include an update of its AFC in the response to the leader, which is the remaining available capability after making the reservation. If a node refuses to join the service group, it will send a decline message or send no response.

In Step 7, after reserving capability, each fog node will wait for confirmation or updated grouping request from the leader. If the fog node does not receive any further contact from the leader, it will cancel the reservation and release the reserved capability.

In Step 8, after collecting the responses from all contacted fog nodes (or timeout), the leader will sum up the received RFCs to check whether the requirements of the request may be satisfied (since the received RFC might be smaller than QFC). If the response also includes the updated AFC of a fog node, the leader will update the corresponding AFC in the capability profile.

In Step 9, if the requirements of the request cannot be satisfied by the fog nodes that have been contacted in Step 4, the leader may look for other fog nodes in the potential group to fill the gap. If there is no more available node but the contacted fog nodes have remaining AFCs, the leader may attempt to re-split the request or set a larger QFC, and repeat steps 4 to 8. If neither of the above approaches applies, then the fog service request is unable to be completed by this potential group.

In Step 10, if the fog service request is unable to be completed, the leader will send a response to the requestor indicating the request cannot be completed. The leader may optionally indicate how much of the request may be completed so that the requestor may update the request by reducing the requirements of capability.

In Step 10, if the requirements of the request may be satisfied by the contacted fog nodes, a service group may be formed with these nodes. The leader will set the OFC for each service group member and record the grouping information (including the member list with the corresponding sub-request, RFC and OFC). Optionally, the leader may log the grouping information for possible reuse in the future.

In Step 11, a grouping confirmation is sent to each service group member with the assigned OFC. If the members need to communicate with each other during the service, the service group member list will also be sent to the member nodes so that they may reach each other directly or through the leader.

In Step 12, the leader sends a response to the requestor, notifying the latter whether the request may be completed. If the requestor needs to directly access service group members, the member list will also be sent to the requestor.

Providing Fog Service to User

After the service group is formed and the required capabilities are reserved, the service group may begin to provide fog service to the requestor or user.

If the sub-requests distributed to the service group members already contain the details of what should be done by the fog nodes (e.g., to perform data analysis on local data), then the nodes may start to work on the request right after the service group is formed or at the time specified in the sub-request (if any). After the sub-request is completed, the member fog node may notify the fog leader or the user the completion, along with any information as required in the request (e.g. data analysis results).

In the above case, the fog service request may be viewed as a "task" that may be completed within certain amount of time. In another case, the fog service request may ask to reserve certain type(s) of fog capabilities, where the fog service will last till the termination time defined in the request or cancelation sent by the user.

Figure 11:
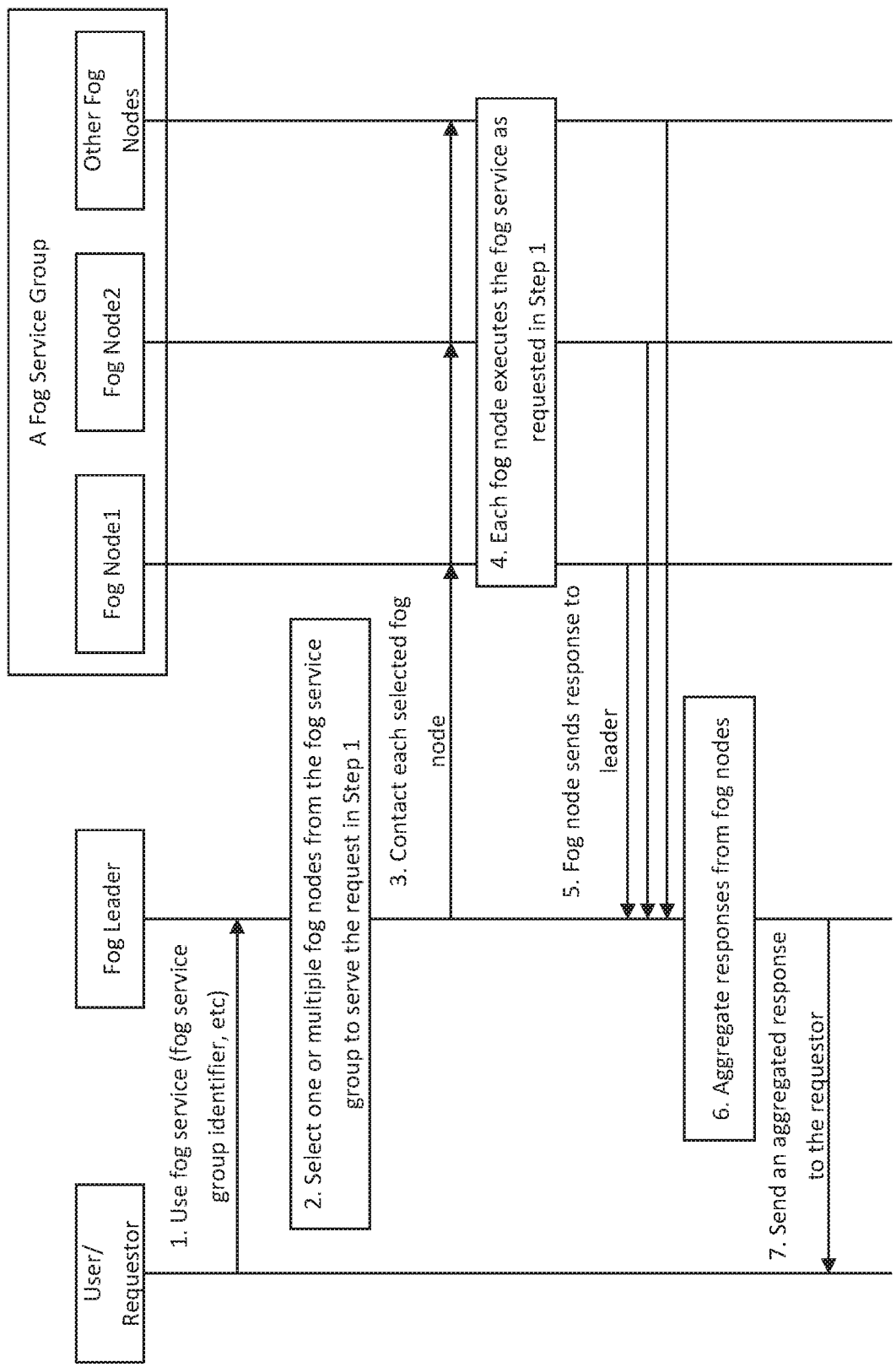
FIG. 11 is a flow diagram of an example procedures for providing fog services to a user.

FIG. 11 is a flow diagram of an example procedure for providing fog services to a user, which occurs after a fog service group has been formed.

In Step 1 of FIG. 11, a requestor sends a request to use fog services provided a fog service group. The identifier of this fog service group may be contained in the request, which allows the fog leader to find the corresponding fog service group. This message will also contain service-related data or information. For example, if the fog service group provides storage service, the requestor will contain data (e.g., pictures, video, etc.) in this message, which to be stored in some fog nodes.

In Step 2, based on the fog service group identifier contained in Step 1, the fog leader determines the right fog service group. Then, the fog leader will select one, multiple, or all fog nodes from the service group in order to serve the request received from Step 1.

In Step 3, the fog leader contacts each selected fog node. Some service-related data received in Step 1 may be split and forwarded to each selected fog node.

In Step 4, the fog node receives the forwarded request from Step 3 and executes the requested fog service (e.g., to store the data as contained in Step 1 and Step 3).

In Step 5, the fog nodes send responses (e.g., the execution result in Step 4) to the fog leader. Alternatively, fog nodes may send responses directly to the requestor, which could be determined and instructed by the fog leader in Step 3.

In Step 6, the fog leader may aggregate all responses together from each fog node in the service group.

In Step 7, the fog leader sends an aggregated response to the requestor. Alternatively, the fog leader may simply forward each response received in Step 5 to the requestor.

During the service, the user may update the fog service request by increasing/decreasing the required capabilities. If a flexible OFC is taken (where OFC is not a fixed value set by the fog leader but will vary as the service goes on, e.g., a fog service request asking for storage and the data is stored gradually into the servicing fog nodes), and the increasing OFC is about to exceed the RFC, the fog service group members may trigger a RFC update and notify the fog leader.

It is possible that another fog service request may arrive at the leader asking for capabilities that are already occupied by the current request, or requiring the same fog nodes that are currently working in a service group. In this case, the new request may be either combined with the ongoing request (which may be viewed as an update of request), or processed by the fog leader as an intra-group multi-request scenario.

Moreover, due to the dynamic feature of fog nodes, the availability of service group members may change during the service. Changes of capabilities, together with the above mentioned scenarios, will all trigger dynamics in the service group.

Group Management Dynamics

The operation of the service group may be impacted by changes of the fog service request, the arrival of a new request, or the availability of group members during operations. These impacts may require the leader to make adjustments to the service group and adapt to the changes. Corresponding procedures include the scaling of RFC, OFC, group size and replacement of group members, as may be introduced in the following. Note that all procedures proposed for Group Management Dynamics could be automatically triggered based on pre-configured fog service policies at the fog leader and/or fog nodes. The fog service policies may be managed as described in connection with FIG. 23.

Service Group Capability Scaling

In order to adapt to the change of request demand or capability of service group members, the RFCs or OFCs might need to be updated during the service. For example, if one of the service group member quits the group, the missing capability may be accommodated by other group members by scaling up their RFCs or OFCs. On the other hand, if the service group gains extra capability during the service (e.g., through fog nodes with temporary capability), the RFCs or OFCs of the existing members may be scaled down for power saving or using the spared capability for other requests. The capability scaling may be performed on a single member, or multiple members, or all the members of a service group.

RFC Update

Figure 12A:
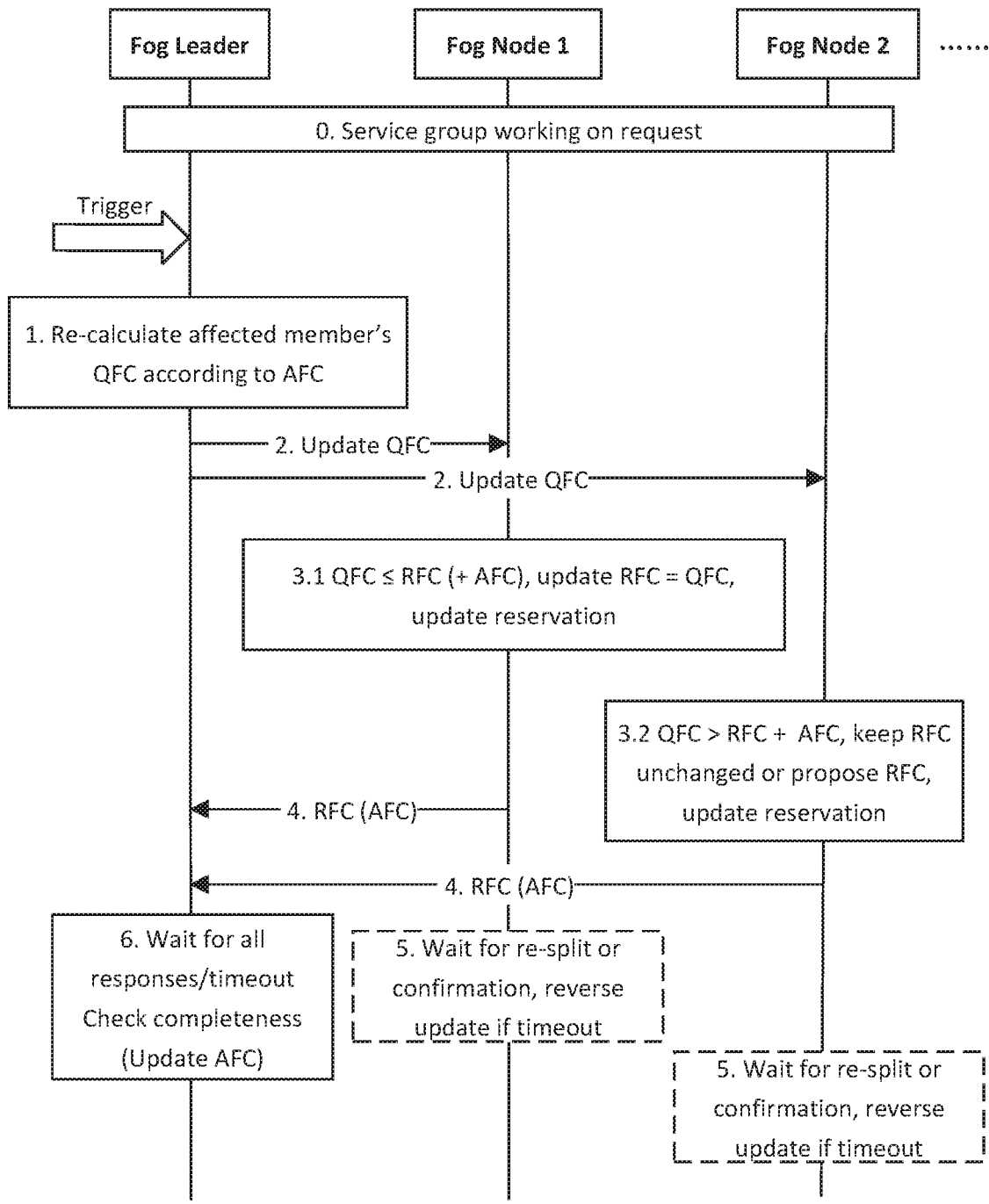
FIGS. 12A and 12B are a call flow of an example Reserved Fog Capability (RFC) update procedure.
Figure 12B:
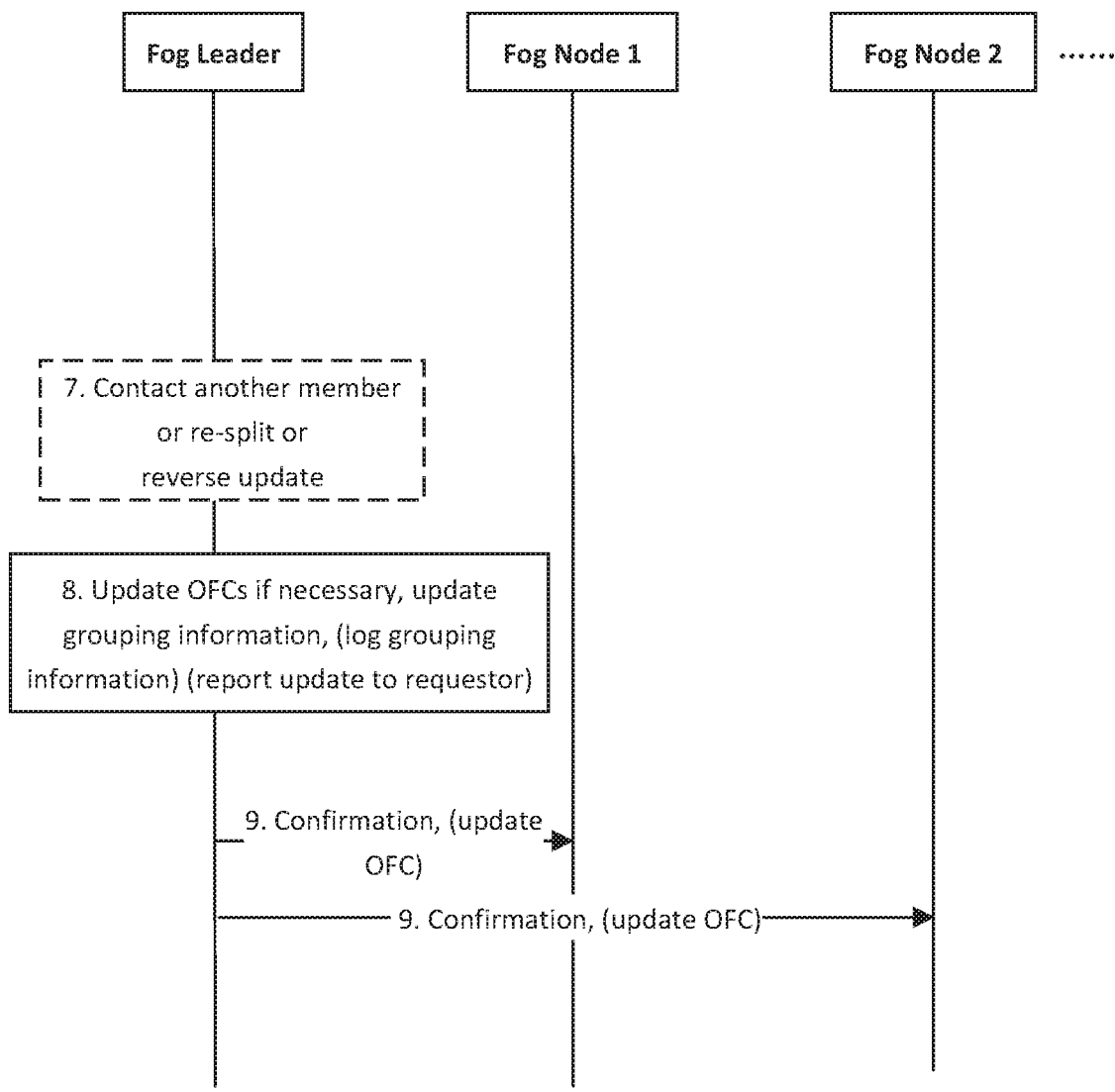

RFC update is the procedure to scale up/down the RFC(s) of service group member(s). Generally, RFC update is initiated by the leader when the reservation should be updated. In the scenarios when OFC is not set by the leader, a RFC increment may also be initiated by the member fog node if its OFC is approaching RFC and it would like to reserve more capabilities to cover the increasing OFC. Scaling up RFCs will ask the member fog node(s) to reserve more capability in order to satisfy an increased demand (in this case usually a scaling up of OFC follows), or provide higher performance or reliability. A scaling down of RFC may release the capability that is no longer necessary for power saving or better utilization of resources. FIGS. 12A and 12B are a call flow of an example Reserved Fog Capability (RFC) update procedure.

In Step 0 of FIG. 12A, a service group is working on a request.

In Step 1, the RFC update is triggered by certain pre-configured fog service policies such as a change in the request or service group capability, where the leader will re-calculate the QFCs for the affected members according to their AFCs. If the leader wants to increase the RFC of a member node, it will make sure the increment will not exceed the AFC of this node.

In Step 2, the updated QFCs are sent to the service group members. If other information in the sub-requests also need to be updated, the updated sub-requests may be sent to the member nodes along with the QFC update (to explain the change of request).

In Step 3, when a service group member receives the QFC update, it will check whether it is capable to make the update.

In Step 3.1, if the updated QFC is smaller than the node's current RFC, then it will reduce RFC to the desired value. Otherwise, if the updated QFC is larger than RFC, the node will check whether its AFC may cover the increment. Normally the update may be feasible since the update is made by the leader after considering the AFCs of member nodes.

In Step 3.2, if the member's AFC has changed after last update with leader and is not able to accommodate the increment of QFC, it will keep the old RFC or propose an acceptable RFC and update the reservation correspondingly. The contacted member nodes will update their reservations according to the updated RFCs.

In Step 4, the contacted nodes send the updated RFCs to the leader, and may optionally include their current AFCs. If the RFC update is initiated by the member node, then Step 1 to 3 are skipped and the node directly sends an RFC update to the leader.

In Step 5, after updating RFC, the fog node will wait for confirmation or any further update from the leader. If the fog node does not receive any contact from the leader, it will reverse the update and keep the previous RFC.

In Step 6, after collected the updated RFCs from all contacted fog nodes (or timeout), the leader will sum up the received RFCs to see whether the request may be completed with the updated RFCs. If the response also includes the updated AFC of a fog node, the leader will update the corresponding AFC in the profile.

The call flow of FIG. 12A continues in FIG. 12B. In Step 7 of FIG. 12B, if the request cannot be completed by the updated RFCs, the leader may look for other fog nodes in the potential group to fill the gap. If there is no more available node but the contacted fog nodes still have remaining AFCs after the RFC update, the leader may attempt to re-split the request or set a larger QFC, and repeat Step 2 to 6. Otherwise, the request is unable to be completed, the leader may reverse the update by not sending confirmation to the contacted nodes and sending a notification to the requestor.

In Step 8, if the request may be completed by the updated RFCs, the leader will continue to update the OFCs according to the updated RFCs. The leader will then update the grouping information (including the member list with the corresponding sub-request, RFC and OFC). Optionally, the leader may log the updated grouping information for possible reuse in the future. The leader may also report the update to the requestor if necessary.

In Step 9, a confirmation with the updated OFC is sent to each service group member who has updated RFC.

OFC Update

OFC update is a lightweight procedure to scale up/down the OFCs of service group members without changing their RFCs. Scaling up OFCs will ask the member fog node(s) to use more capability out of the RFC in order to serve an increased demand, satisfy an increased demand of the ongoing request, or work on another request with the same service group members. A scaling down of OFC may reduce the actual work load of a service group member, but will not affect its RFC.

Figure 13:
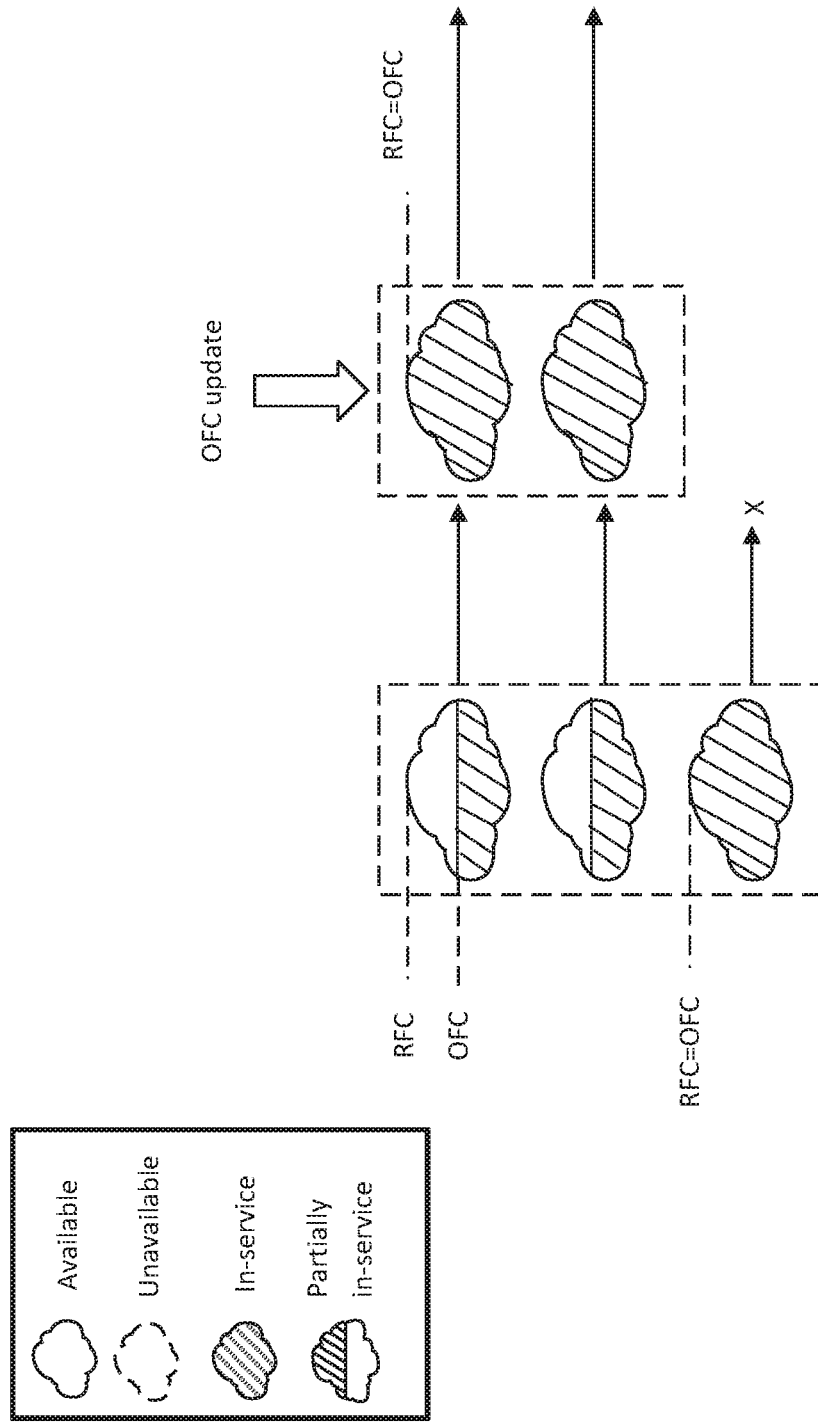
FIG. 13 is a block diagram of an example Occupied Fog Capability (OFC) update for back-up.

As a lightweight procedure, OFC update may be used in several scenarios for dynamic adjustment of service group capabilities. As previously mentioned, the leader could set the RFC larger than OFC for service group members so that the spared part of RFC may be used as back-up. When one group member becomes unavailable during the service, the leader could scale up the OFCs of the other members to maintain the same total capability for completing the request. FIG. 13 is a block diagram of an example Occupied Fog Capability (OFC) update for back-up.

Figure 14:
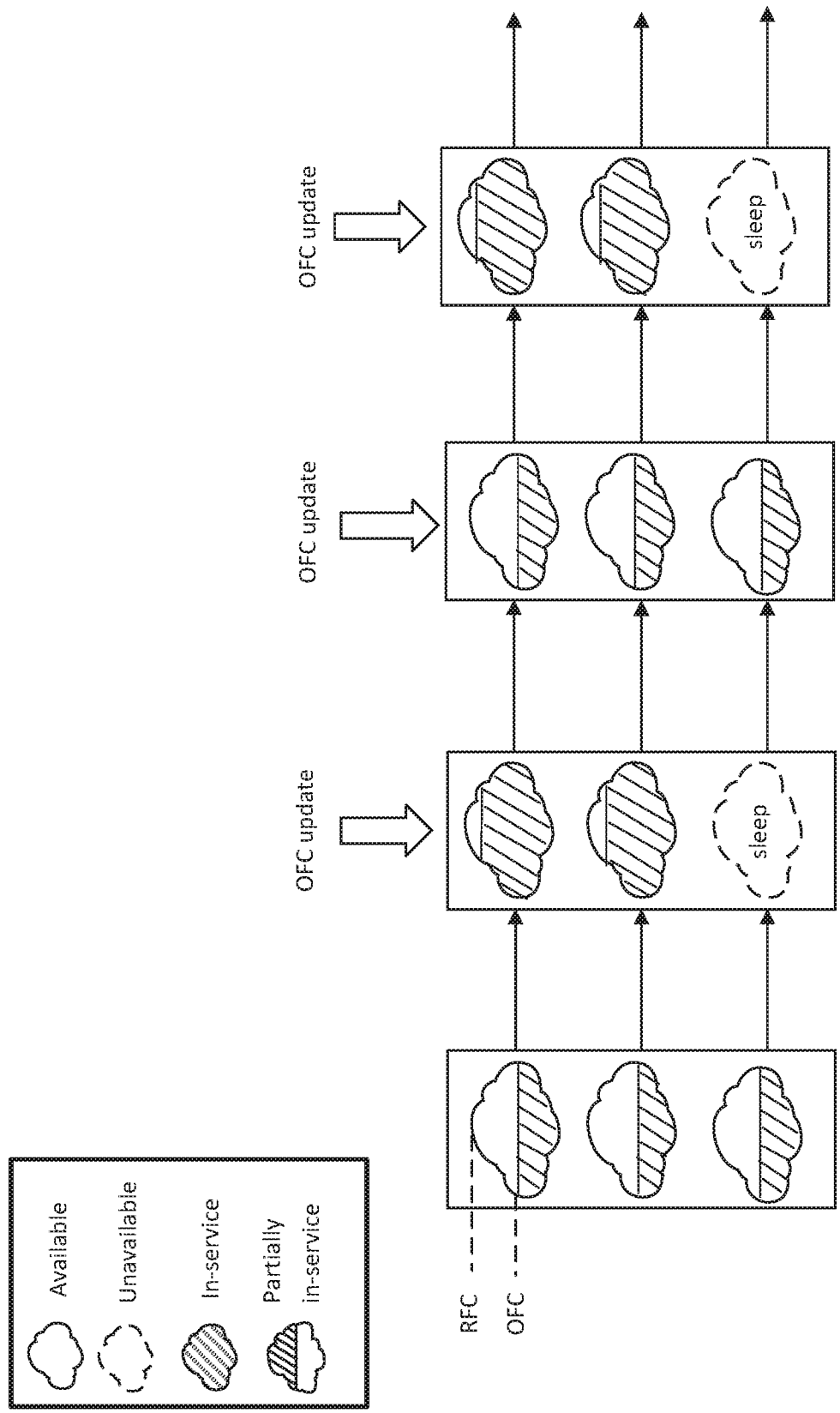
FIG. 14 is a block diagram of an example OFC update for periodical scheduling.

OFC update is also an efficient approach in the scenarios with frequent changing of capability. If one of the service group members has periodically changing capabilities, the leader could make a periodical update of OFC accordingly, such that the stable members may scale up/down OFCs when the periodical node becomes unavailable/available. FIG. 14 is a block diagram of an example OFC update for periodical scheduling. Such a capability update may also be done with RFC update, but may be required a higher communication overhead.

Figure 15:
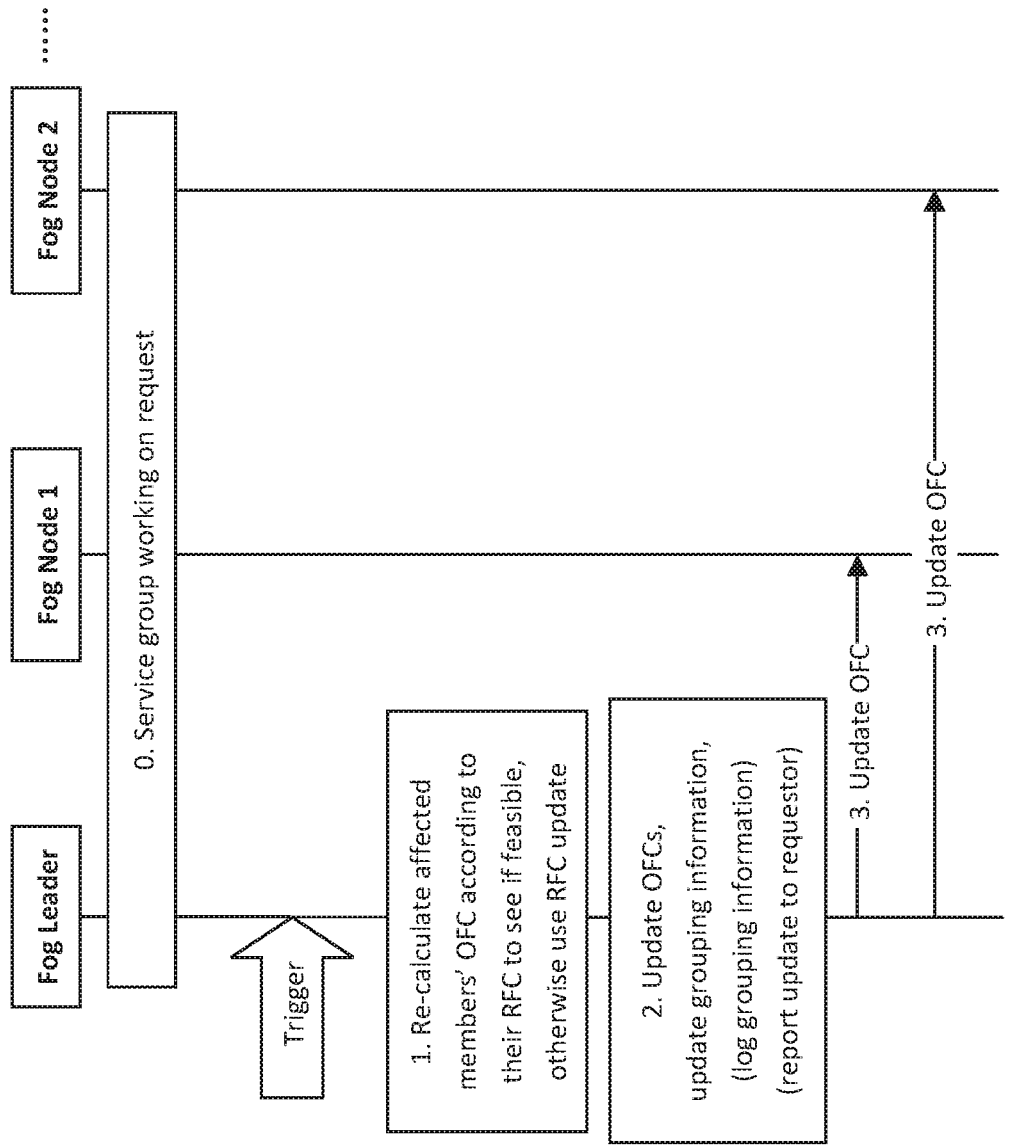
FIG. 15 is flow diagram of an example OFC update procedure.

Despite the lightweight advantage, OFC update may not be always feasible or preferred. If a scaling up of capability is needed and the affected member nodes does not have large enough RFCs to accommodate the increment, then RFC update has to be taken instead. If a scaling down of capability is needed, OFC update may be preferred for less overhead, but RFC may be preferred for better utilization of resources since the unused capabilities may be released from reservation. FIG. 15 is a flow diagram of an example OFC update procedure.

In Step 0 of FIG. 15, a service group is formed and is working on a request.

In Step 1, when an OFC update is triggered by certain pre-configured fog service policies, the leader will re-calculate the affected members' OFCs. If the leader wants to increase the OFC of a member node, it will make sure the updated OFC will not exceed the RFC of this node. The leader will check whether the OFC update may accommodate the change of request or capability. If not, a RFC update may be used instead.

In Step 2, the leader will update the grouping information with the updated OFCs. Optionally, the leader may log the updated grouping information for possible reuse in the future. The leader may also report the update to the requestor if necessary.

In Step 3, the updated OFCs are sent to the affected member nodes.

FIG. 14 is a block diagram of an example OFC update for periodical scheduling.

Service Group Member Management

Group size scaling contains the procedures to add/remove member to/from the service group. The procedures are initiated by the leader.

Add Members to a Service Group

Figure 16:
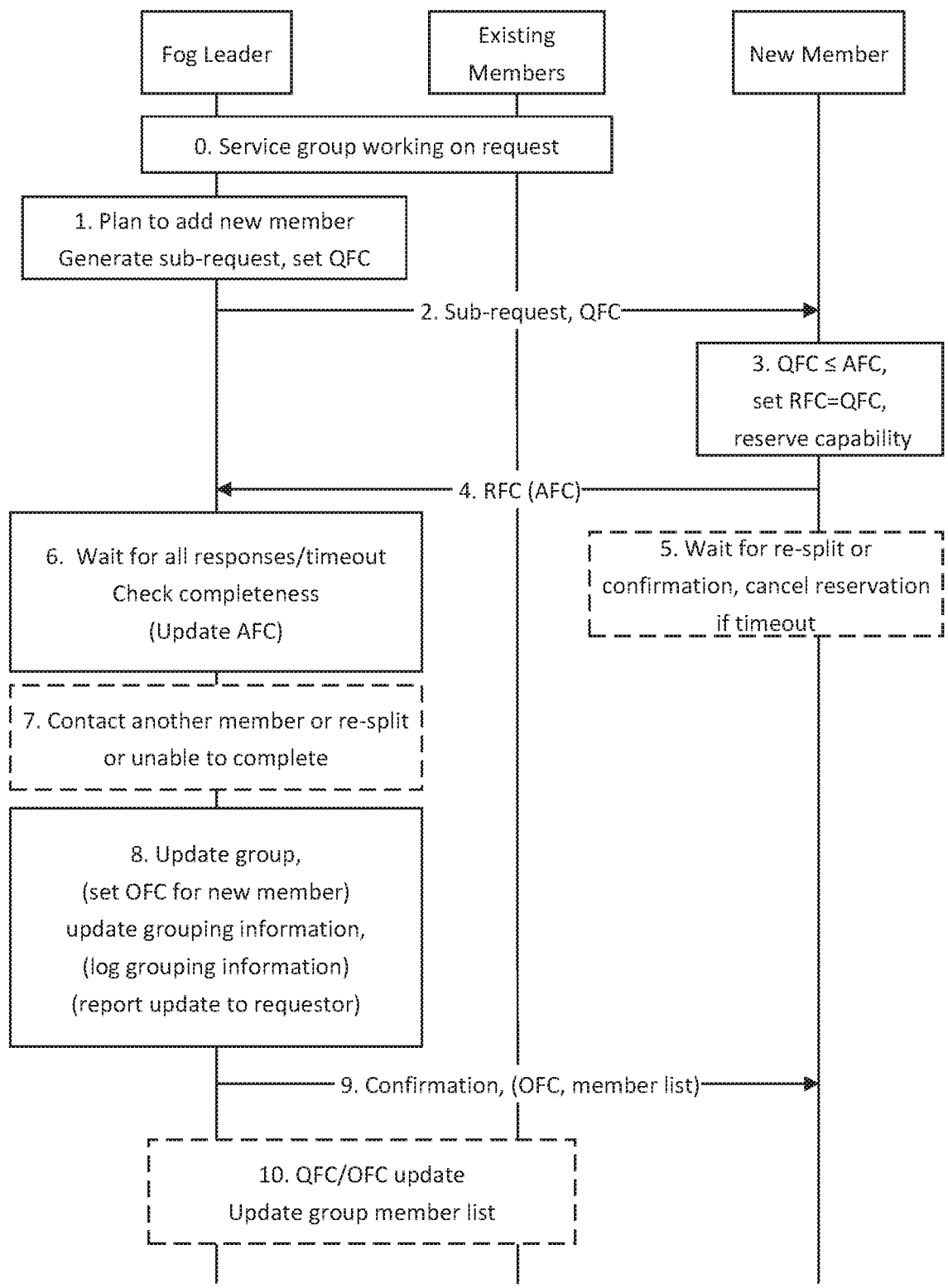
FIG. 16 is flow diagram of an example procedure to add a member to a service group.

The procedures of adding a member to the service group could be triggered when more capability is required due to an increasing demand or capability loss of an existing member (a member quits or becomes unavailable). The leader is responsible to find a new fog node in its potential group and add this node to the service group. The procedures of adding a member are similar to those in forming the service group. FIG. 16 is flow diagram of an example procedure to add a member to a service group.

In Step 0 of FIG. 16, a service group is working on a request.

In Step 1 if the leader plans to add a fog node to the service group according to certain pre-configured fog service policies, it will generate a sub-request for the new member and set QFC accordingly. For example, if a previous member left the service group, the sub-request it was working on may be passed to the new member.

In Step 2, the sub-requests may be distributed to the new member along with the required QFC. This step may also be viewed as the request to join the service group.

Step 3 is analogous to Step 5 of FIG. 10.
Step 4 is analogous to Step 6 of FIG. 10.
Step 5 is analogous to Step 7 of FIG. 10.

In Step 6, after receiving the response from the newly selected member, the leader will check whether the requirements of the fog service request may be satisfied by adding RFC of the new member. If the response also includes the updated AFC of the new member, the leader will update the corresponding AFC in the profile.

Step 7 is analogous to Step 9 of FIG. 10.

In Step 8, if the requirements of the request may be satisfied by adding the new member, the service group may be updated by including the new member. The leader will set the OFC for the new member and record the updated grouping information. Optionally, the leader may log the grouping information for possible reuse in the future. If necessary, the leader will report the update of service group to the requestor.

In Step 9, a grouping confirmation is sent to the new member with the OFC. If the group members need to communicate with each other during the service, the service group member list will also be sent.

In Step 10, updating a group size may be accompanied by a demand change for the existing members in the service group. In this case a RFC/OFC update may be triggered. If the group members need to communicate with each other during the service, the updated service group member list may be sent to all the existing members.

Remove Members from a Service Group

Figure 17:
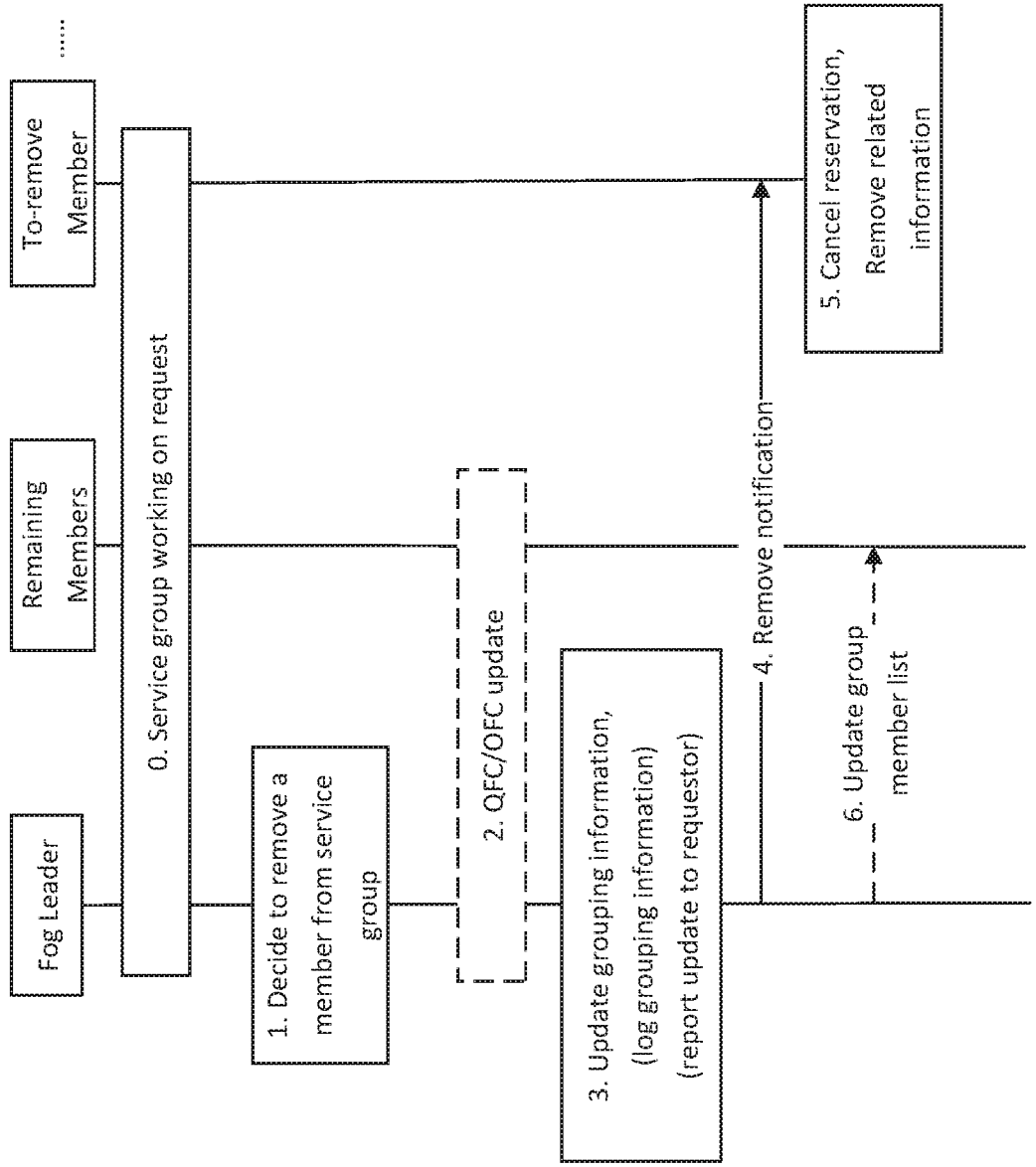
FIG. 17 is flow diagram of an example procedure to remove a member from a service group.

A member in the service group may be removed if it will/has become unavailable, or the leader no longer needs this member's capability. The removal operation is performed only when the removed member will not join the service group again. Otherwise, if the member is to be removed temporarily and will re-join the group later, a RFC/OFC update on this node might be preferred. FIG. 17 is flow diagram of an example procedure to remove a member from a service group.

In Step 0 of FIG. 17, a service group is working on a request.

In Step 1, the leader decides to remove a member from the service group based on certain pre-configured fog service policies. A member node may also ask the leader to be removed.

In Step 2, removing a service group member may lead to reduced service group capability. In this case, a RFC/OFC update could be performed in advance to maintain the group capability.

In Step 3, the leader will exclude the member to be removed from the service group member list and update grouping information accordingly. Optionally, the leader may log the grouping information for possible reuse in the future. If necessary, the leader will report the update of service group to the requestor.

In Step 4, the leader sends a notification to the member to be removed.

In Step 5, the removed member will cancel any reservation for this service group, and remove related information of this service group. The released capabilities may become available and added back to AFC.

In Step 6, if the group members need to communicate with each other during the service, the updated service group member list may be sent to all the remaining members.

Replace Members in a Service Group

If a service group member leaves during the service, a replacement may need to be found to continue the work of the leaving node. If the replacement node is found after the previous node left, then the replacement node is added to the service group with add member procedures (and the left node may be removed with remove member procedures). On the other hand, to maintain the consistency of service, the replacement node may be found beforehand such that the leaving and incoming nodes could coexist for some time to perform handover procedures. In this case, the replacement node may continue to provide the desired capability instead of the leaving node, or the ongoing work of the leaving node may be passed to the replacement node. This handover procedure may be performed with auxiliary request for connection (ARC), which is an auxiliary request generated by the leader to ask for internal coordination between service group members (as shown in Step 6 to 8 in FIG. 18B. Generally, the ARC is sent from the leader to a member node (in this case the leaving node), which includes the address of the target node (the incoming node), as well as necessary instructions to assist the handover. Then handover is performed between the two nodes, after that a notification from the target node may be sent to the leader indicating the handover is done and including other parameters that may have been requested by the leader (RFC, AFC).

Figure 18A:
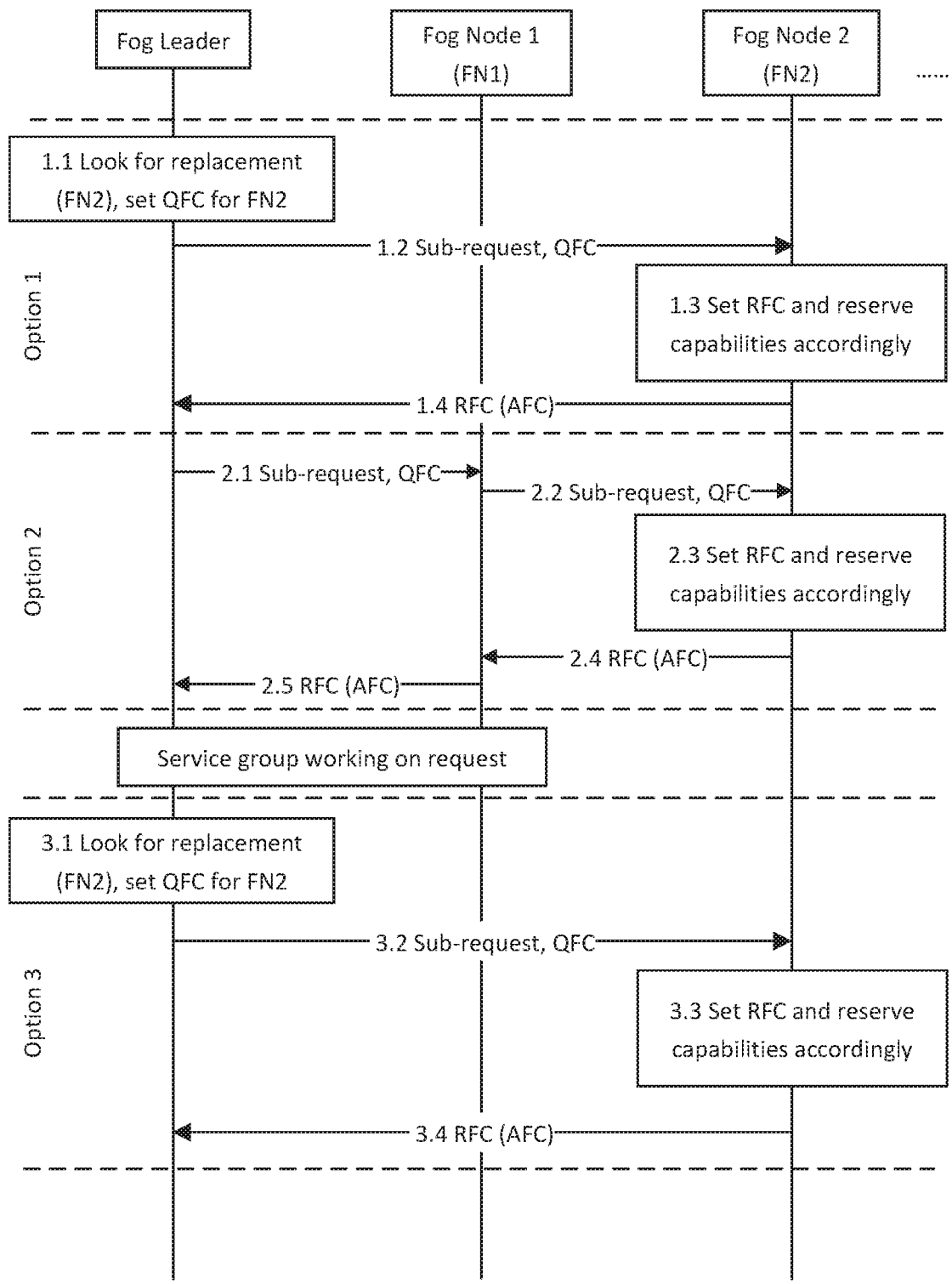
FIGS. 18A and 18B contain flow diagrams of example procedures for replacing a service group member.
Figure 18B:
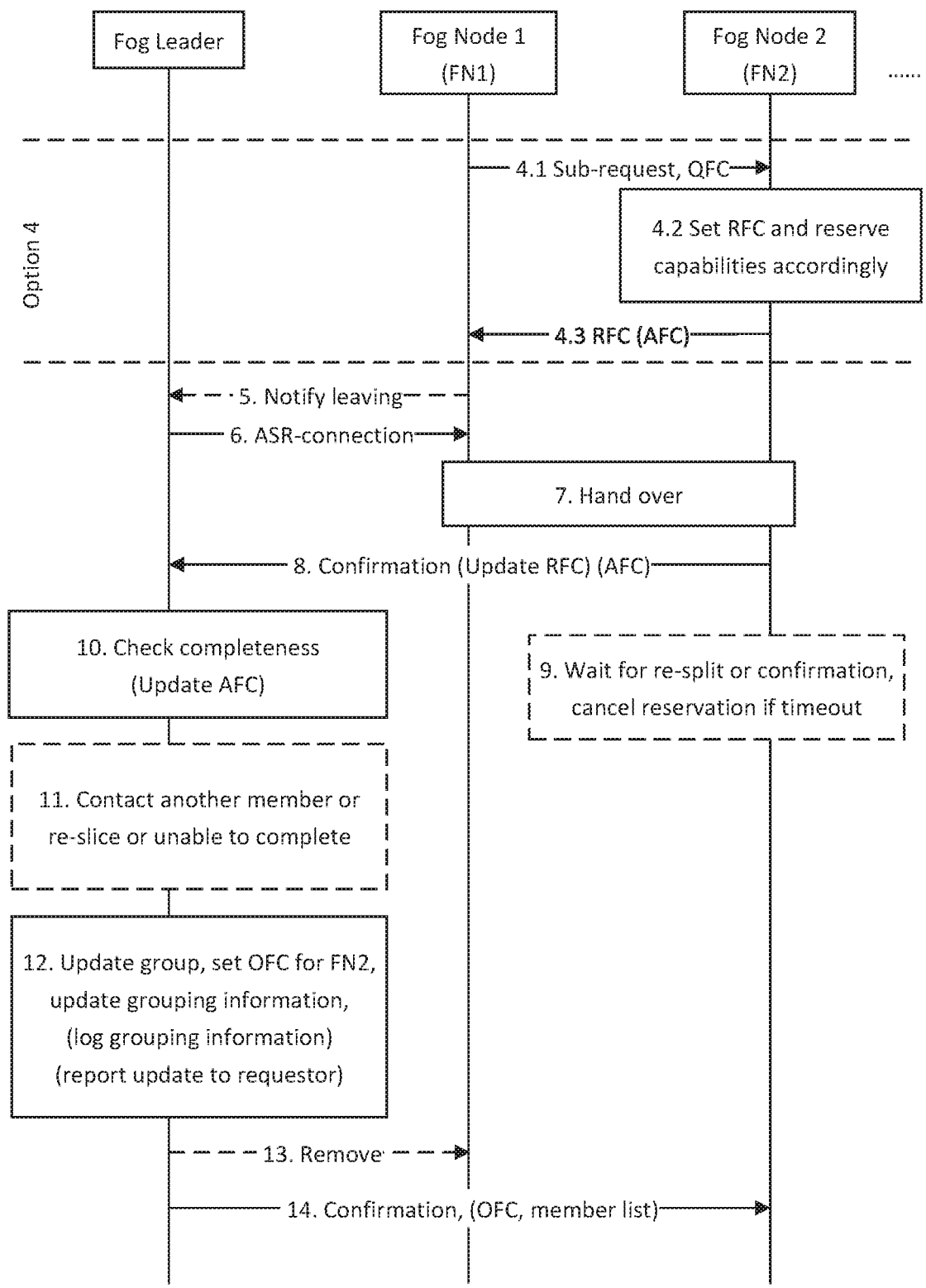

Depending on when (before or after forming the initial service group) or who (the leader or the leaving node) is responsible to find the replacement node, there could be different options in the procedure. Generally, the replacement node will receive the same sub-request and QFC as that of the leaving node. Since the QFC and RFC may be set before the replacement happens, the detailed setting may differ from the normal procedures. If when the replacement will happen is known beforehand, the time may be included in the QFC (by the leader or the leaving node, whoever is responsible of finding the replacement node), indicating that the replacement node does not have to make the reservation right now, and may wait till the replacement. If the replacement time is unknown, a QFC same as that of the leaving node may be sent to the replacement node, and the reservation may be made beforehand. It is possible that the leaving time is uncertain at first, but then become certain after the service group is formed (e.g., predicted by context information), in this case the QFC including the replacement time could be sent to the replacement node as soon as the leaving time is known. FIGS. 18A and 18B contain flow diagrams of example procedures for replacing a service group member, for four options.

In Option 1 of FIG. 18A, a leader finds the replacement node during forming the service group.

In Step 1.1, if the leader is aware that one of the member node in the service group will (probably) leave the group (become unavailable), it may look for a back-up node as replacement when forming the service group. The leader will set QFC to the replacement node as that of the leaving node. If the leader knows when the replacement will happen, it may indicate the time in the QFC.

In Step 1.2, the corresponding sub-request and QFC are sent to the replacement node.

In Step 1.3, the contacted replacement node checks its AFC and sets RFC accordingly. The RFC could be set as to be effective when the replacement takes place, by using the "prediction" parameter.

In Step 1.4, the replacement node replies to the leader with its RFC (and AFC, optionally).

In Option 2 of FIG. 18A, the leaving fog node finds the replacement node during formation of the service group.

In Step 2.1, when forming the service group, the leader sends sub-requests and QFCs to the selected fog nodes as normal.

In Step 2.2, as the leaving node receives grouping request (sub-request and QFC) from the leader when forming the service group, it will send a copy to the replacement node, where the latter is taken as a back-up of the leaving node. If the leaving node knows when it will leave, it will include the information in the QFC sent to the replacement node.

Step 2.3 is similar to Step 1.3, where the contacted replacement node sets RFC accordingly.

In Step 2.4, the replacement node replies to the leaving node with its RFC (and AFC, optionally).

In Step 2.5, the leaving node replies to the leader with the RFC (and AFC) of itself and the replacement node, where the latter is marked with back-up or replacement.

In Option 3 of FIG. 18A, the leader finds the replacement node before replacement.

Step 3.1-3.4 are similar to Steps 1.1-1.4 of Option 1. Here in Option 3, Steps 3.1 to 3.4 after the service group is formed.

In Option 4 of FIG. 18B, the leaving node finds the replacement node before leaving. Steps 4.1-4.3 of FIG. 18B are similar to Steps 2.2-2.4 in Option 2 of FIG. 18A. Here in Option 4 of FIG. 18B, these Steps 2.2-2.4 are performed after the service group is formed.

Steps 5-14 of FIG. 18B are common to Options 1-3 of FIG. 18A and Option 4 of FIG. 18B

In Step 5, the leaving node may send a notification to the leader before leaving In Step 6, after receiving the leaving notification or when the predicted leaving time comes, the leader initializes an ARC and send to the leaving node.

In Step 7, the leaving node will perform handover procedures with the replacement node, who has been notified earlier to be the replacement.

In Step 8, after handover, the replacement node is ready to replace the leaving node and sends a confirmation to the leader (optionally indicating its RFC and AFC).

Steps 9-12 of FIG. 18B are similar to Steps 5-8 of FIG. 16, where the replacement node may be viewed as the added node.

In Step 13, the leader removes the leaving node, or this could be done by the leaving node itself.

In Step 14, the leader sends a confirmation to the replacement node with the assigned OFC, and optionally the service group member list.

Sequential Requests

Figure 19:
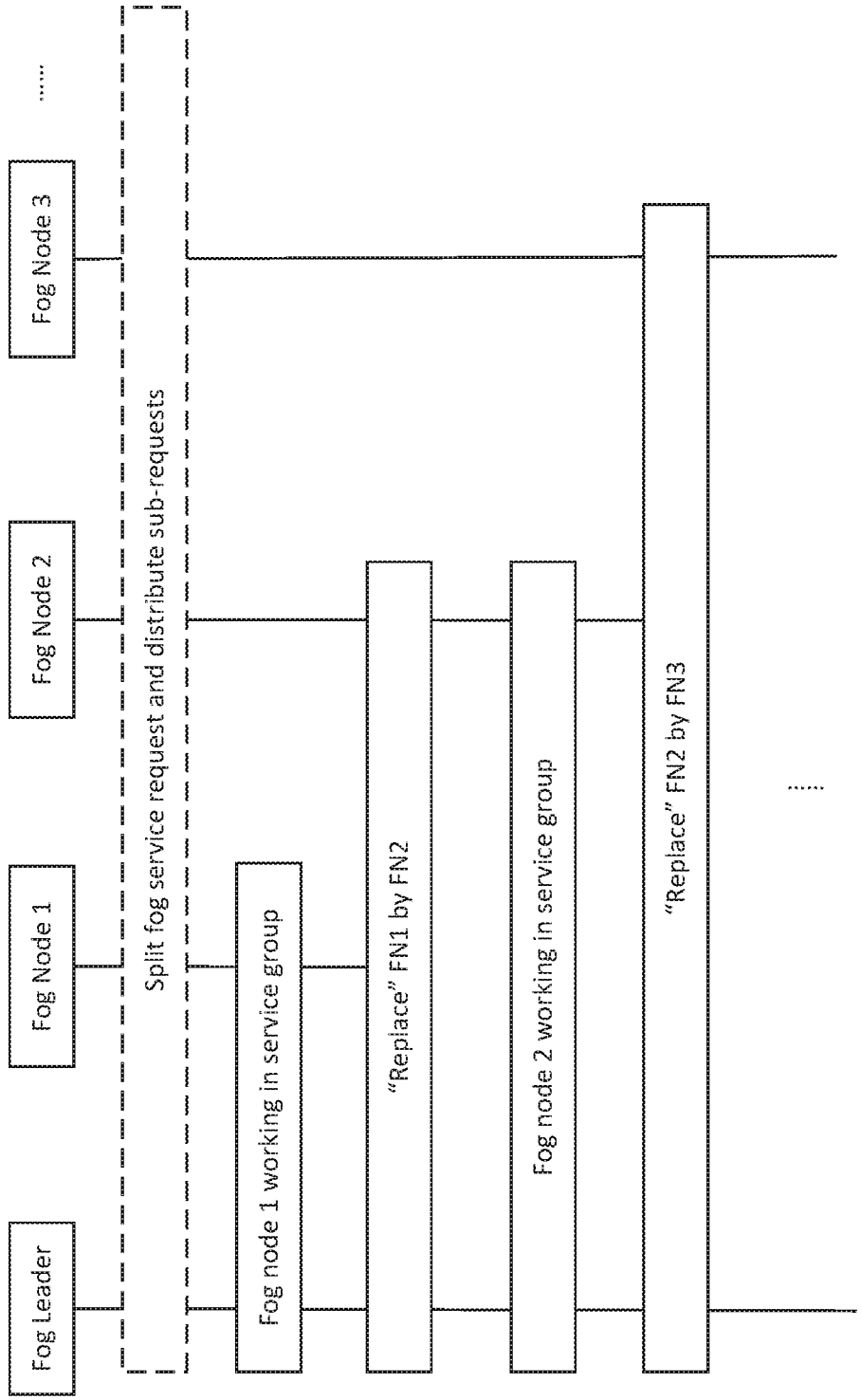
FIG. 19 is a call flow of example sequential requests.

In the previous cases, the sub-requests obtained from splitting the fog service request may be distributed to service group members where the service is done in parallel. For some request, the sub-requests have to be done in a sequence where the service group members work on the request one by one. For example, the first piece of sub-request may be done at one member, when finished, the ongoing work or intermediate result may be passed to the next member, which may be repeated until the entire request is serviced. The procedure may be viewed as a sequence of "replacing member" procedures, where the service group contains only one member at a time, and the member is repeatedly replaced by the next member in sequence. The members to complete the sequential request may be selected beforehand, or selected as the service is ongoing. The members may be selected by the leader, or the currently working member may help the leader to choose the next member as its "replacement". FIG. 19 is a call flow of an example including a sequence of repeated member replacement.

Hybrid Scaling

The scaling of RFC/OFC and group member management may be combined and repeated in dynamic scenarios. Two examples are presented in the following.

Access Temporary Capability

Figure 20:
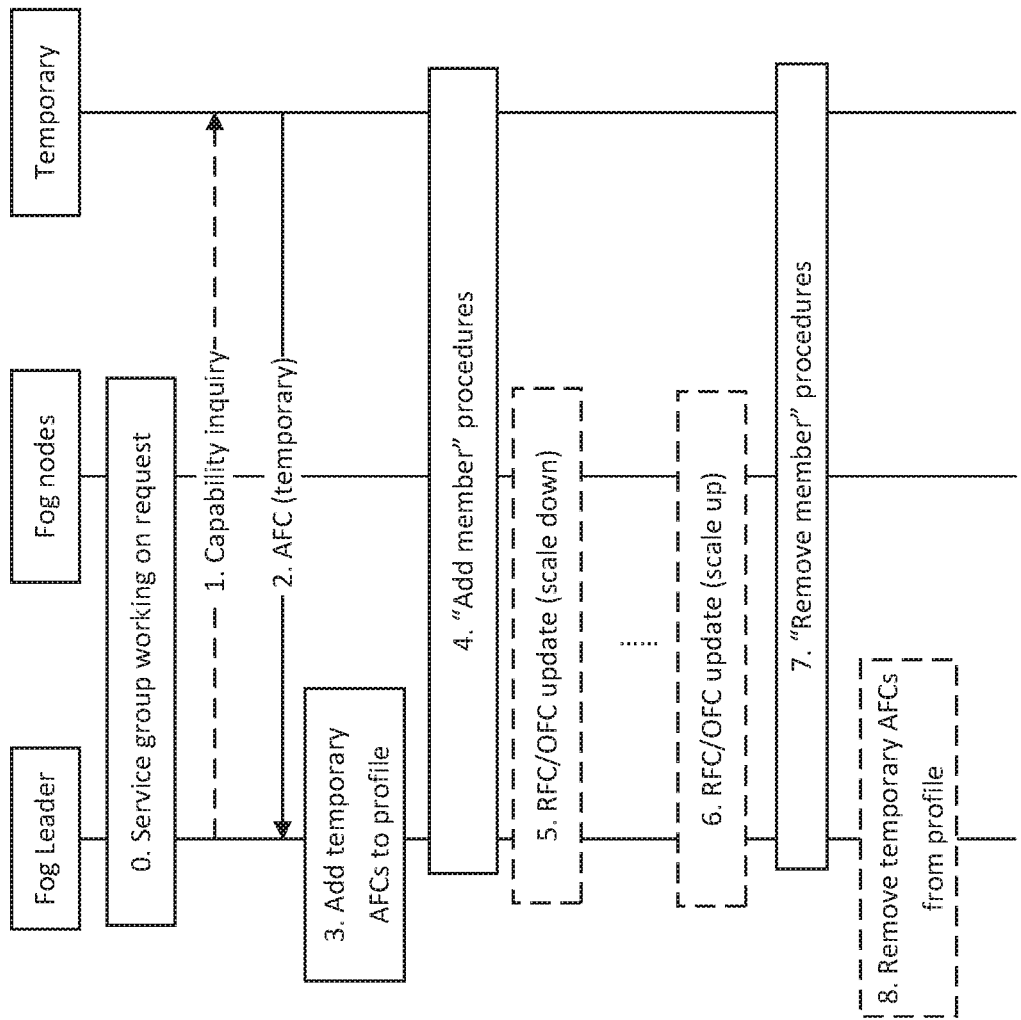
FIG. 20 is a flow diagram of an example procedure for dynamic grouping with accessing of temporary capabilities.

Fog nodes with temporary capabilities could be added to the service group when they are available, and removed from the group when (before) they become unavailable, resulting in a dynamic grouping procedure. FIG. 20 is a flow diagram of an example procedure for dynamic grouping with accessing of temporary capabilities.

In Step 0 of FIG. 20, a service group is working on a request.

In Step 1, when the fog nodes with temporary capabilities are discovered by the leader, the leader may send a capability inquiry to them.

In Step 2, the fog nodes with temporary capabilities report their AFCs to the leader, indicating the capabilities are temporary. The AFC could include the information of how long the capabilities may be available through the "prediction" parameter, e.g., as described in connection with FIG. 6.

In Step 3, upon receiving the response from the fog nodes with temporary capabilities, the leader updates the capability profile by adding the AFCs.

In Step 4, the leader adds the fog nodes with temporary capabilities to the service group with "add member" procedures, e.g., as shown in FIG. 16.

In Step 5, with more capabilities available in the service group, if the existing members keep the same OFC, then a performance improvement may be achieved. The leader could also scale down the RFC or OFC of existing members with RFC update procedures, e.g., as shown in FIGS. 12A and 12B, and OFC update procedures, e.g., as shown in FIG. 15.

In Step 6, if the leader knows or predicts when the temporary capabilities may become unavailable and has made a RFC/OFC scaling down, then before the temporary capabilities/nodes leave the service group, the RFC/OFC may be recovered back to the previous value with a RFC/OFC update.

In Step 7, the temporary capabilities/nodes may be removed from the service group with "remove member" procedure (as in FIG. 17).

In Step 8, the leader may optionally remove the temporary capabilities from the capability profile to reduce the size of the profile.

Intra-Group Multi-Request

Figure 21:
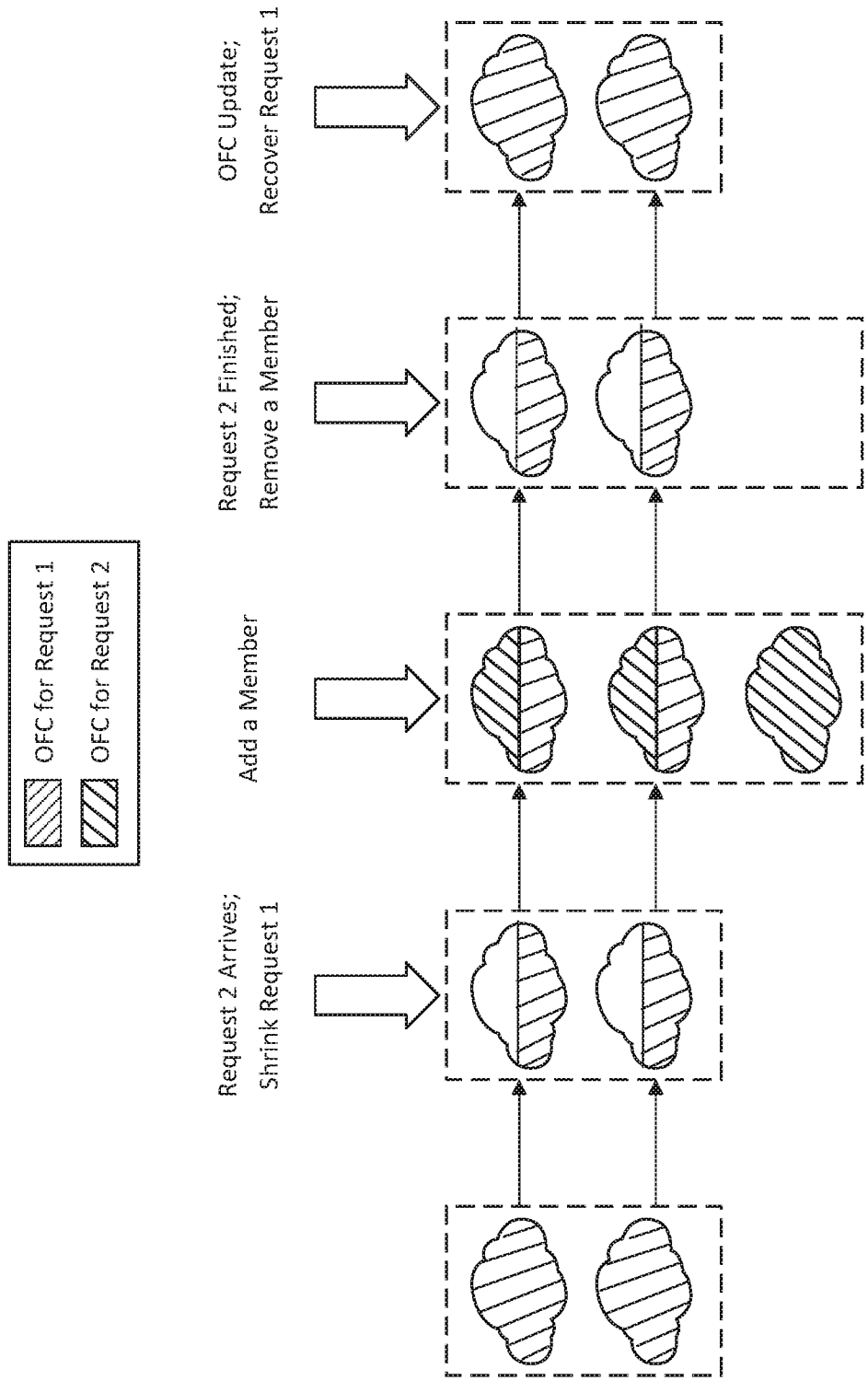
FIG. 21 is a block diagram of an example intra-group multi-request.
Figure 22:
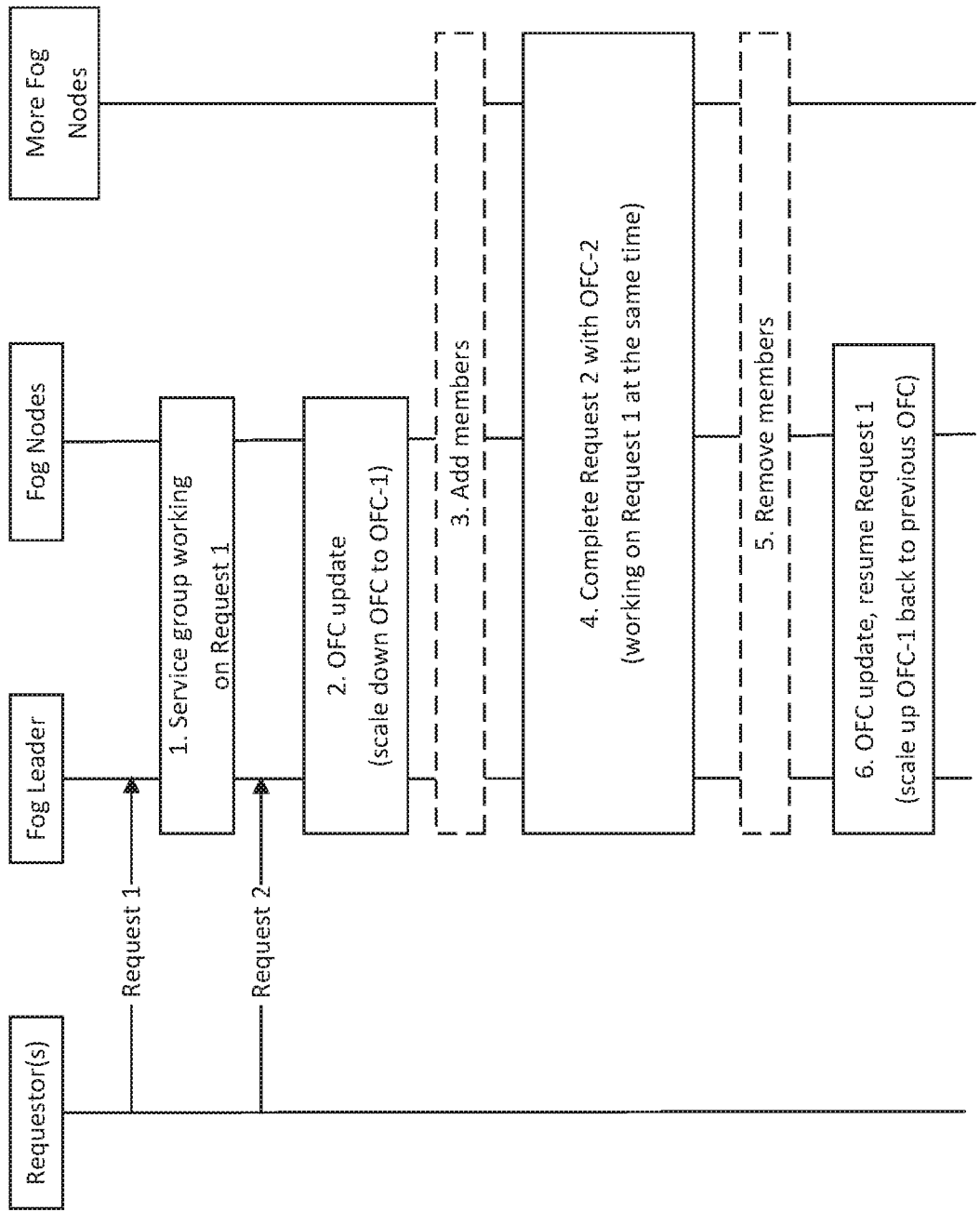
FIG. 22 is a flow diagram of an example intra-group multi-request service.

It is possible that when a service group is working on a request, a new request arrives at the leader. If the new request asks for capabilities different from that of the occupied/reserved one, the leader may form a whole, new service group for the new request. If the new request asks for similar or the same capabilities, the leader may need to check the corresponding member nodes to determine whether they have any remaining AFC to be allocated to the new request. If the AFCs of the member nodes have been exhausted by the existing request, one possible option is to scale down the OFCs of the existing request to "make room" for the new request, especially for the scenarios where the new request has high priority than the existing one, or the new request may be completed in much shorter time than the existing one. For example, a service group working on a video streaming request may shrink the OFC (bandwidth) to assist an emergency communication request. Another example could be, the service group is working on a fog service request that may take a long time to complete but without time limit, while a new request arrives which may be completed in much shorter time. In this case, it might be more efficient to "insert" the second request instead of waiting for the completion of the first one. FIG. 21 is a block diagram of an example intra-group multi-request. FIG. 22 is a flow diagram of an example intra-group multi-request service.

In Step 1 of FIG. 22, a service group is working on Request 1 with OFC=RFC and AFC=0.

In Step 2, after the leader receives Request 2, it makes an OFC update to scale down OFC to OFC-1 which may be the capability allocated to Request 1. OFC-1 could be set to zero if the leader wants to pause Request 1 and dedicate the service group to Request 2.

In Step 3, after OFC update, if the spared capabilities are still not enough for Request 2, the leader may look for other fog nodes in the potential group and add them as new members to the service group.

In Step 4, with the spared capabilities set as OFC-2 (and new member joined), the service group may work on Request 2 until it is finished. If OFC-1 is not set to zero, Request 1 is still in service during this period.

In Step 5, after Request 2 is finished, the extra members (if any) that joined the service group for Request 2 may be removed.

In Step 6, the leader may recover OFC-1 back to OFC (the previous value) and resume Request 1.

Fog Service Policy Management

Fog service policies are proposed for dynamically managing fog service groups and group management dynamics.

These Fog service policies may be pushed to a fog leader and/or a fog node by a management application. In addition, a fog leader may configure and update fog service policies at a fog node related to one or multiple fog service groups.

Figure 23:
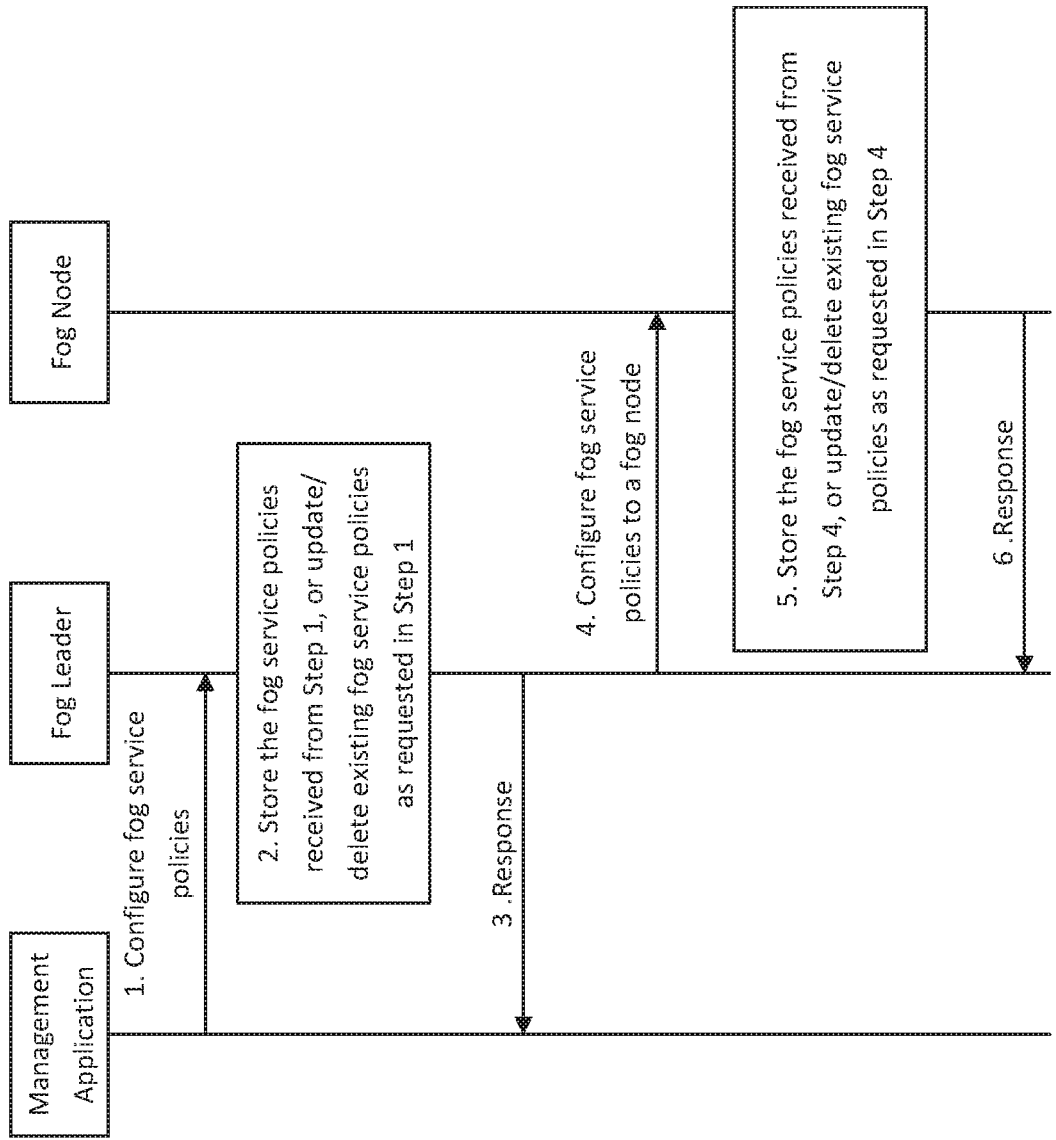
FIG. 23 is a call flow of example procedure to configure fog service policies.

FIG. 23 illustrates an example procedure for configuring fog service policies, where several alternative options are possible: (1) The management application uses Steps 1-3 to configure and manage fog service policies at the fog leader. (2) The fog leader uses Steps 4-6 to configure and manage fog service policies at a fog node that may or may not belong to a fog service group; (3) The management application uses Steps 1-6 to configure and manage fog service policies at a fog node; (4) Similar to Steps 1-3, the management application may directly configure and manage fog service policies at a fog node without relying on the fog leader; in this case, Step 1 is directly sent to fog node which will store the new policies and/or update existing policies; then, Fog Node sends a response directly to the management application.

In Step 1 of FIG. 23, the management application sends a request to fog leader to create new fog service policies and update/delete existing fog service policies.

In Step 2, the fog leader stores the fog service policies received from Step 1, and/or update/delete existing fog service policies as requested in Step 1

In Step 3, the fog leader sends a response to the management application.

In Step 4, the fog leader sends a request to a fog node to create new fog service policies and update/delete existing fog service policies.

In Step 5, the fog node stores the fog service policies received from Step 4, and/or update/delete existing fog service policies as requested in Step 4.

In Step 6, the fog node sends a response to the fog leader. If Step 4 is triggered or demanded by the management application, the fog leader may send another response to the management application to inform it that requested fog service policies management have been completed as the fog node.

Fog service policies may include, for example, capability update policies and group member management policies.

Regarding fog capability update policies, the RFC/OFC may be automatically updated if a prediction value is set in the RFC/OFC. Besides, the service group capability update may be triggered when the required capabilities from the fog service request(s) and the provided capabilities from the service group become unbalanced, due to the change of requirements of request, number of intra-group requests, or the capabilities of service group members. The capabilities provided by the service group become less/lower than required in the fog service request will trigger a scaling up of RFC/OFC. If lightweight operations are preferred and OFC update is feasible, OFC update may be triggered; otherwise, RFC update may be used. An increment of RFC may also be triggered by the member node in service group whose flexible OFC is approaching RFC. When the capabilities provided by the service group become more/higher than required in the fog service request, a RFC update may be triggered if optimal utilizations of capabilities are preferred; otherwise, an OFC update could be used to decrease the workloads (for power saving or other intra-group request), or no action is taken.

Group member management policies may be used, for example, for adding a member, removing a member, and/or replacing a member. For example, n "add member" procedure may be triggered when the service group needs additional fog nodes to provide capability and such nodes are available.

A "remove member" procedure may be triggered when the service group no longer needs a member. A member becomes unavailable during the service may not trigger this procedure unless the leader knows for sure that this member will not become available again before service completion. A disband service group procedure will trigger multiple remove procedures upon service completion, which includes the completion of fog service request, termination of reservation period, and cancelation from the requestor/user.

A "replace member" procedure may be triggered when a member of the service group is leaving and a replacement fog node has been found such that a handover may be performed between them. The procedure may also be triggered by a sequential request when the request is passing from a member to the next one.

Service Completion

Figure 24:
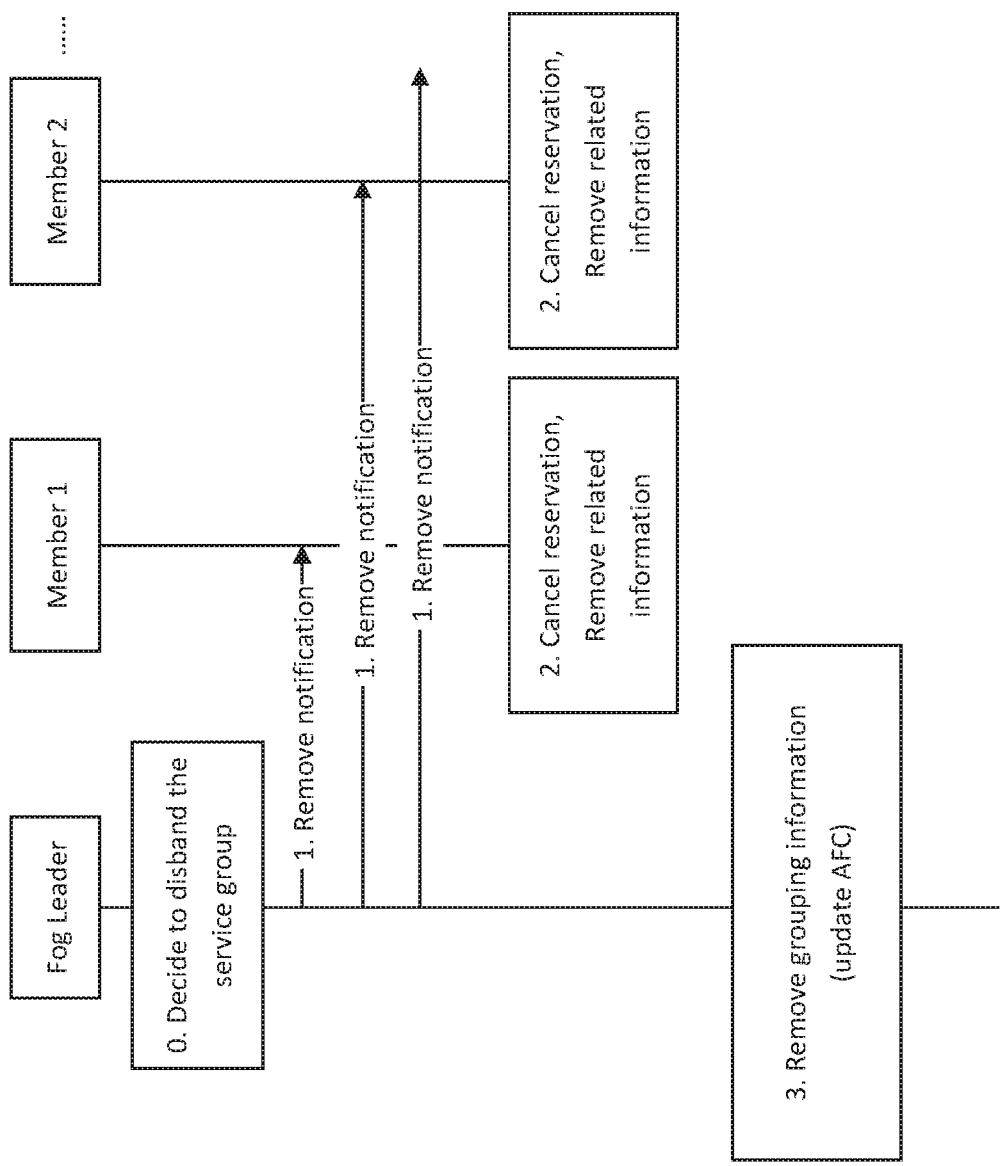
FIG. 24 is a call flow of example procedure to disband a service group.

When the fog service request is completed, (e.g., as indicated by the requestor or user notification, or by service group member responses) or the reservation period terminates, or the requestor/user cancels the request, or based on certain fog service policies, the service completion procedure is performed by disbanding the corresponding service group. The procedures may be viewed as repeating "remove member" operations for all the service group members. FIG. 24 is a call flow of example procedure to disband a service group.

In Step 0 of FIG. 24, the leader decides to disband the service group when the requested task has been completed, or reservation period required in the fog service request terminates, or the fog service is canceled by the requestor.

In Step 1, the leader sends "remove service group member" notifications to all the members in service group.

In Step 2, the removed member will cancel any reservation for this service group, and remove related information of this service group. The released capabilities may become available and added back to AFC.

In Step 3, the leader removes related information of the disbanded service group. Since disbanding the service group will release all the RFCs of the members to be available again, the leader may optionally perform an AFC update for these members since their capabilities have just been released.

The fog services solutions described herein may be implemented via adaptation of existing standards and protocols, such as oneM2M, for example.

The proposed fog service architecture and deployment may be implemented in oneM2M based on the following ideas.

A Fog leader may be implemented as an oneM2M CSE; similarly, fog nodes may be implemented as oneM2M CSEs as well. The requestor may be implemented as an oneM2M AE.

Fog capabilities may be implemented as new oneM2M resource type <fogCapability>.

A potential group may be implemented as a new oneM2M resource type <potentialGroup>.

A service group may be implemented as a new oneM2M resource type <serviceGroup>. A proposed fog service group forming may be implemented by creating a new <serviceGroup>. A proposed group management dynamics may be implemented by updating an existing <serviceGroup>. A proposed fog service group disbanding may be implemented by deleting an existing <serviceGroup>.

New oneM2M Resource Types

Three new resource types, for example, may be used to facilitate fog services in oneM2M: <fogCapability>, <potentialGroup>, and <serviceGroup>. Clause 9.6.1.3 in oneM2M Technical Specification, oneM2M-TS-0001-V3.11.0 describes universal and common attributes.

New Resource Type: <fogCapability>

The <fogCapability> resource represents a type of fog capability at the fog node (e.g., the storage capability), and may be a child resource of a <CSEBase> or a <remoteCSE>. The <fogCapability> resource contains all the related information of one fog capability, including the description of the capability in type and quantity, as well as portions corresponding to different utilizations.

Attributes of <fogCapability> Resource

Attributes of a <fogCapability> resource may include, for example: capabilityInfo capabilitySchedule; potentialFogCapability; availableFogCapability; reservedFogCapability; and occupiedFogCapability.

capabilityInfo This attribute contains information in order to understand the fog capability. It shall be composed of two mandatory components consisting of capability type (e.g. storage, computation, or sensor) and measurement (in terms of amount, size, power, coverage, etc.). This attribute should be used so that fog nodes (CSEs) may understand the corresponding fog capability. This attribute may have a multiplicity of 0 . . . 1 and be read/write (RW).

capabilitySchedule This attribute contains predictable long-term dynamics of the fog capability, such as the scheduling information. This attribute may have a multiplicity of 0 . . . 1 and be read/write (RW).

potentialFogCapability This attribute contains a list of information of the PFC(s) of the corresponding fog capability that the fog node contributes to potential group(s). Each item of the potentialFogCapability list shall be composed of three fields: 1) the absolute measurement of PFC, 2) PFC in percentage (comparing to the total measurement), and 3) the corresponding potential group ID. Different items in the list correspond to different potential groups which the fog node belongs to. This attribute may have a multiplicity of 0 . . . 1 (L) and be read/write (RW).

Either the absolute measurement or the percentage field could be empty, but at least one of them should contain a value. This rule also applies to the following attributes.

For example, a fog node with 1 GB storage capability is willing to contribute 500 MB to potential group A, the corresponding item describing the PFC could be "{500 MB, 50%, A's ID}", or "{500 MB, ( ), A's ID}", or "{( ), 50%, A's ID}".

availableFogCapability This attribute contains a list of information of the AFC of the corresponding fog capability at the fog node. Each item of this list may contain: 1) the absolute measurement of AFC, 2) absolute measurement of predicted AFC, 3) AFC in percentage (comparing to the total measurement), 4) predicted AFC in percentage, and the prediction effective time (when the AFC will become the predicted value) and 5) the corresponding potential group ID. Different items in the list correspond to different potential groups which the fog node belongs to. The fields related to predicted AFC are optional and may be left empty. This attribute may have a multiplicity of 0 . . . 1 (L) and be read/write (RW).

For example, if the AFC of a fog capability is 100% without prediction, the value could be "{( ), ( ), 100%, 0, 0)}"; if the AFC will become 0 after 5 minutes, the corresponding value could be "{( ), ( ), 100%, 0%, 5 minutes}".

reservedFogCapability This attribute contains a list of information of the RFC(s) of the corresponding fog capability that the fog node contributes to service group(s) and requests. This attribute may have a multiplicity of 0 . . . 1 (L) and be read/write (RW).

Each item of the reservedFogCapability list shall be composed of six fields consisting the absolute measurement of RFC, absolute measurement of predicted RFC, RFC in percentage (comparing to the total measurement), predicted RFC in percentage, the corresponding service group ID, and the request ID.

Different items in the list correspond to different requests or service groups that the fog node is working on. The fields related to predicted RFC are optional and may be left empty.

occupiedFogCapability contains a list of information of the OFC(s) of the corresponding fog capability that the fog node contributes to service group(s) and requests. This attribute may have a multiplicity of 0 . . . 1 (L) be read/write (RW).

Each item of the occupiedFogCapability list shall be composed of six fields consisting the absolute measurement of OFC, absolute measurement of predicted OFC, OFC in percentage (comparing to the total measurement), predicted OFC in percentage, the corresponding service group ID, and the request ID.

Different items in the list correspond to different requests or service groups that the fog node is working on. The fields related to predicted RFC are optional and may be left empty.

New Resource Type: <potentialGroup>

The <potentialGroup> resource represents the capability profile maintained at the fog leader, i.e. the potential group information. The <potentialGroup> resource may be a child resource of a <CSEBase> (at the fog leader) or a <remoteCSE>. The <potentialGroup> resource contains the list of potential group members (in common attribute memberIDs) and their PFCs and AFCs.

Attributes of <potentialGroup> Resource

Attributes of a <potentialGroup> resource may include, for example: groupCapabilityInfo; memberCapabilityInfo; potentialGroupCapability; potentialMemberCapability; availableGroupCapability; and availableMemberCapability.

groupCapabilityInfo List of fog capabilities in the potential group by summing up/adding capabilities of all members together. This attribute may have a multiplicity of 0 . . . 1 (L) and be read/write (RW).

Each item of the groupCapabilityInfo list corresponds to one type of fog capability, and shall be composed of two mandatory components consisting of capability type (e.g. storage, computation, or sensor) and measurement (in terms of amount, size, power, coverage, etc.).

This attribute should be used so that the fog leader may know what types of capabilities the potential group have.

memberCapabilityInfoList of members' capability information with each item corresponding to one member. If a member has multiple types of fog capabilities, the corresponding item contains a list of information of all the capabilities. This attribute may have a multiplicity of 0 . . . 1 (L) and be read/write (RW).

The information is collected from the members'<fogCapability> resource in <capabilityInfo> attribute, and may be used as references when calculating the absolute measurement of a fog capability when only the percentage is provided.

potentialGroupCapabilityList of potential fog capabilities in the potential group by summarizing members' PFCs. Each item of the potentialGroupCapability list corresponds to one type of fog capability, and shall be composed of two components consisting absolute measurement of potential group (total) PFC, and potential group PFC in percentage (comparing to the total measurement). This attribute may have a multiplicity of 0 . . . 1 (L) and be read/write (RW).

This attribute should be used so that the fog leader may know the total PFCs of different types of fog capabilities in the potential group.

potentialMemberCapabilityList of members' PFCs with each item corresponding to one member. If a member has multiple types of fog capabilities, the corresponding item contains a list of PFCs of all the types. This attribute may have a multiplicity of 0 . . . 1 (L) and be read/write (RW).

The attribute may be viewed as a collection of the members' <potentialFogCapability> attributes of this potential group.

availableGroupCapabilityList of available fog capabilities in the potential group by summarizing members' AFCs. Each item of the availableGroupCapability list corresponds to one type of fog capability, and shall be composed of two components consisting absolute measurement of potential group (total) PFC, and potential group PFC in percentage (comparing to the total measurement) . . . . This attribute may have a multiplicity of 0 . . . 1 (L) and be read/write (RW).

This attribute should be used so that the fog leader may know the total AFCs of different types of fog capabilities in the potential group.

availableMemberCapabilityList of members' AFCs with each item corresponding to one member. If a member has multiple types of fog capabilities, the corresponding item contains a list of AFCs of all the types. This attribute may have a multiplicity of 0 . . . 1 (L) and be read/write (RW).

The attribute may be viewed as a collection of the members' <availableFogCapability> attributes of this potential group.

New Resource Type: <serviceGroup>

The <serviceGroup> resource represents the service group information maintained at the fog leader. The <serviceGroup> resource may be a child resource of a <CSEBase> or a <remoteCSE> (at the fog leader). The <serviceGroup> resource contains the list of service group members (in common attribute memberIDs) and their RFCs and OFCs.

Attributes of <serviceGroup> Resource

Attributes of a <serviceGroup> may include, for example: requestList, requestedMemberCapability, reservedMemberCapability; and occupiedMemberCapability.

requestList is a list of currently serving or queued fog service requests' IDs. If the request has been pre-processed by the leader and split into sub-requests, the request ID may be followed by the sub-requests. This attribute may have a multiplicity of 0 . . . 1 (L) and be write only (WO).

requestedMemberCapability is a list of members' QFCs with each item corresponding to one member. If a member has been required for multiple types of fog capabilities, the corresponding item contains a list of QFCs of all the types. This attribute may have a multiplicity of 0 . . . 1 (L) and be read/write (RW)

reservedMemberCapability List of members' RFCs with each item corresponding to one member. If a member has multiple types of fog capabilities, the corresponding item contains a list of OFCs of all the types. This attribute may have a multiplicity of 0 . . . 1 (L) and be read/write (RW) The attribute may be viewed as a collection of the members' <reservedFogCapability> attributes in this service group.

occupiedMemberCapabilityList of members' OFCs with each item corresponding to one member. If a member has multiple types of fog capabilities, the corresponding item contains a list of AFCs of all the types. This attribute may have a multiplicity of 0 . . . 1 (L) and be read/write (RW).

The attribute may be viewed as a collection of the members'<occupiedFogCapability> attributes in this service group.

User Interface

Figure 25:
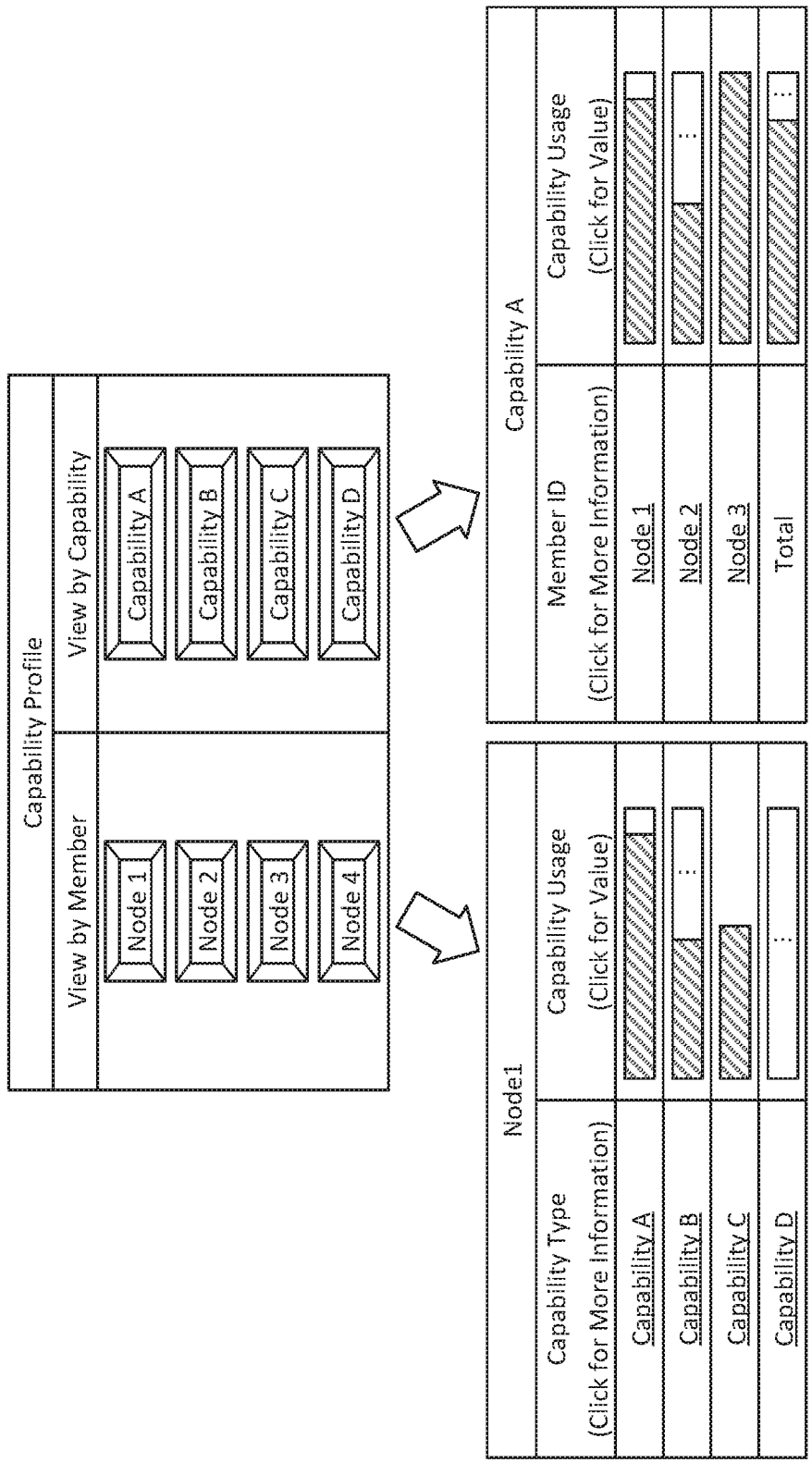
FIG. 25 is an example graphical user interface for potential group monitoring.

FIG. 25 is an example graphical user interface for displaying the capability of a potential group. The capability profile of FIG. 25 may be sorted by the member nodes or the types of capabilities. In the example of FIG. 25, the length of the capability usage bar shows the PFC and the progress bar indicates the AFC. A dashed indicator shows the prediction of AFC.

Figure 26:
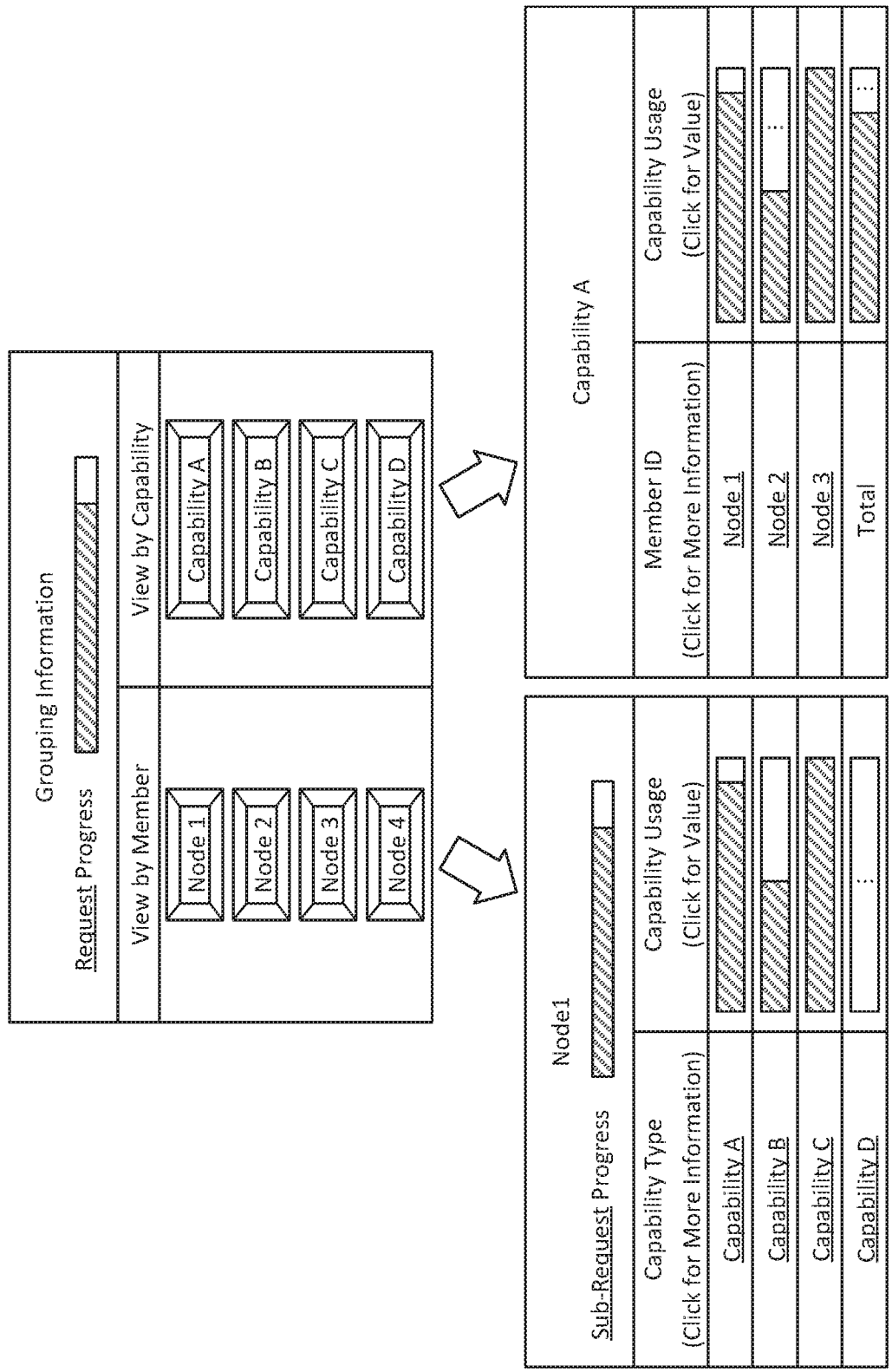
FIG. 26 is an example graphical user interface for service group monitoring.

FIG. 26 is an example graphical user interface for displaying service group information. In the example of FIG. 26, a progress bar shows RFCs and OFCs. The progress of the request, if measured, may also be shown in the interface.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 27A:
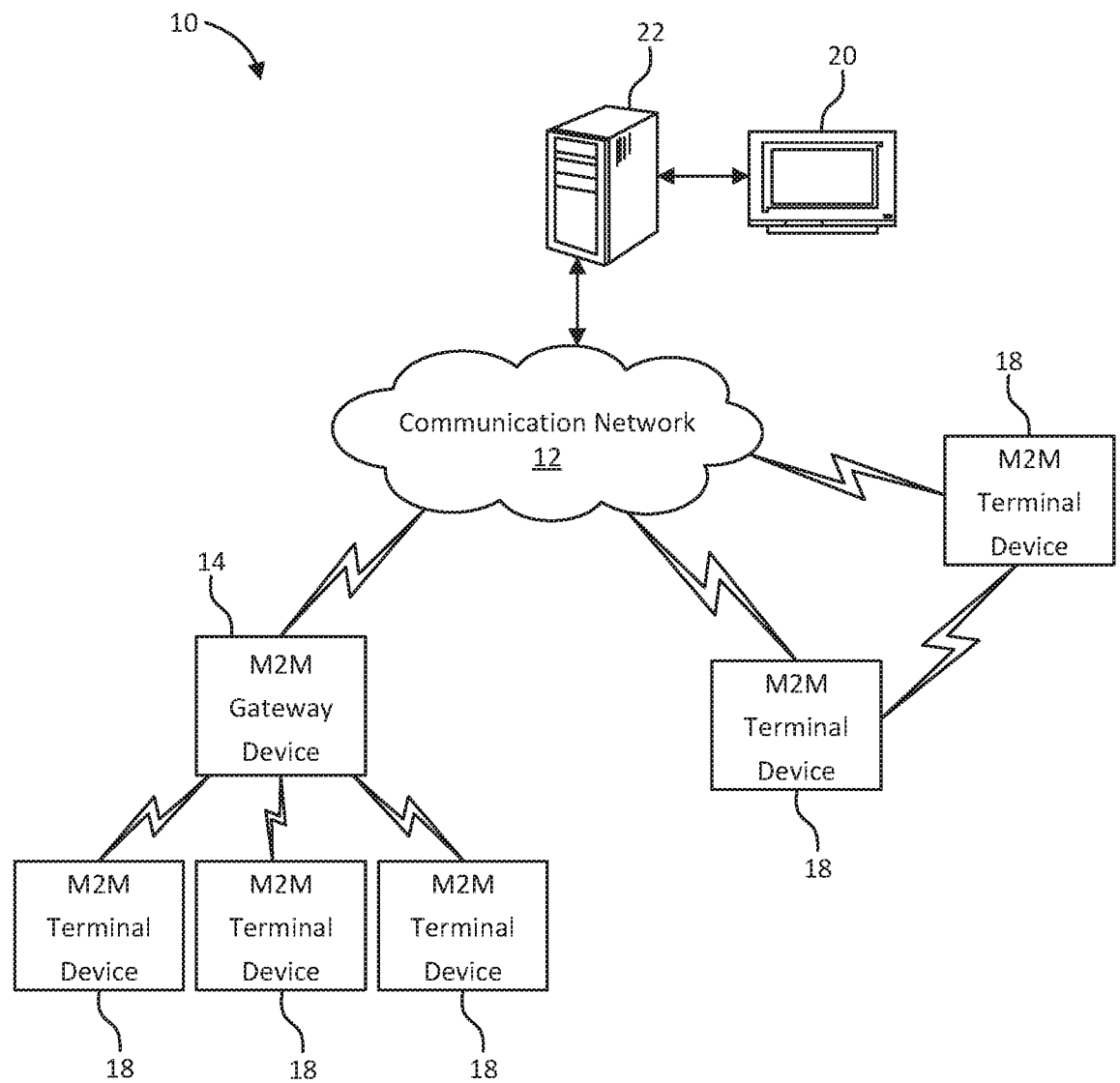
FIG. 27A is a system diagram of an example machine-to-machine (M2M), Internet of Things (IoT), or Web of Things (WoT) communication system in which one or more disclosed embodiments may be implemented.

FIG. 27A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 1, 4, 5, 7, 10A, 10B, 11, 12A, 12B, 15, 16, 17, 18A, 18B, 19, 20, 22, 23, and 24 may comprise a node of a communication system, such as the ones illustrated in FIGS. 1, 2, 4, 5, 7, 10A, 10B, 11, 12A, 12B, 15, 16, 17, 18A, 18B, 19, 20, 22, and 23.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 27A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 27A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 27B:
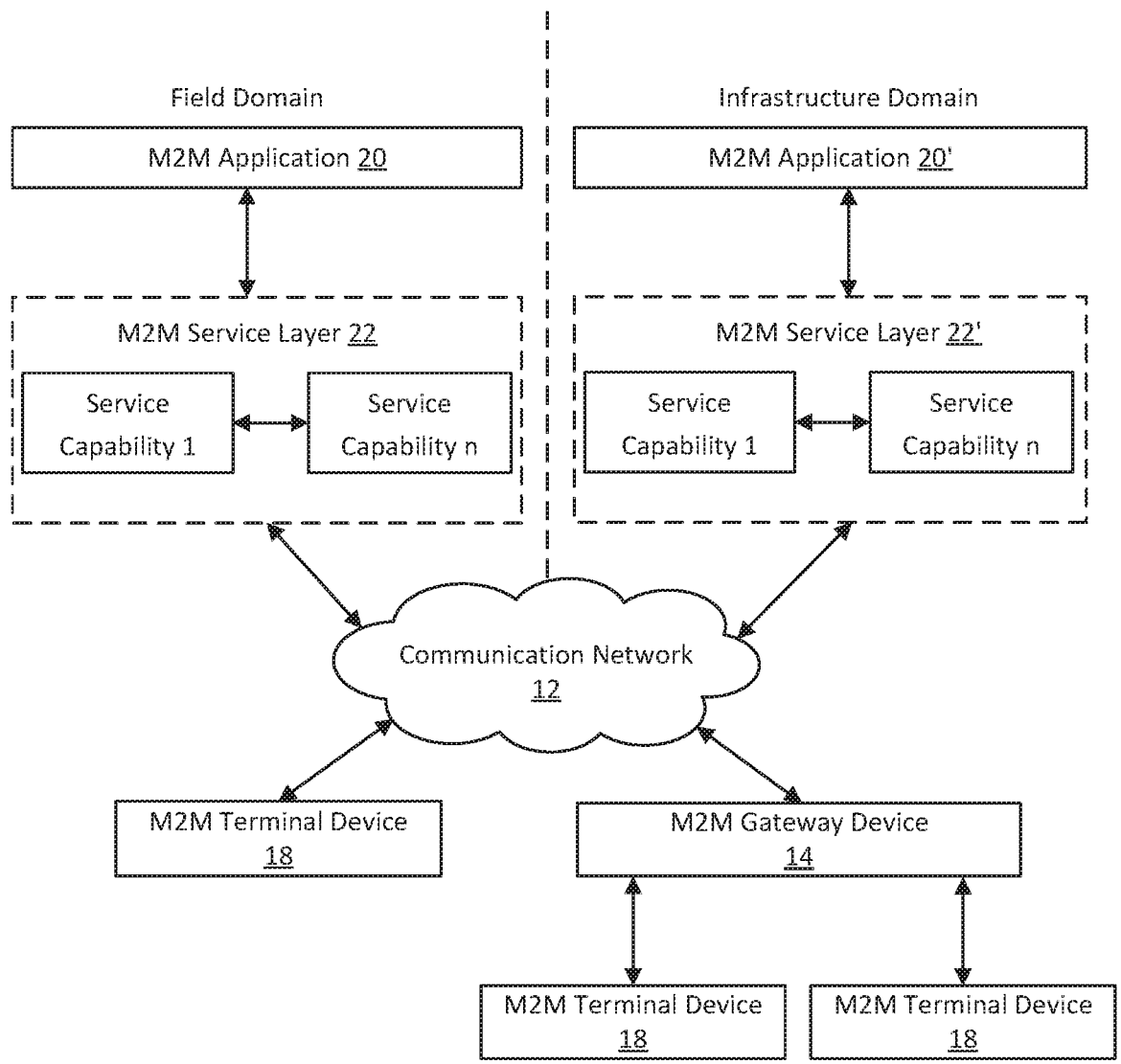
FIG. 27B is a system diagram of an example architecture that may be used within the M2M/IoT/WoT communications system illustrated in FIG. 27A.

Referring to FIG. 27B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 27B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 27B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 27C or FIG. 27D described below.

Further, the methods and functionalities described herein may be implemented as part of an M2M network that uses a Service Oriented Architecture (SOA) and/or a Resource-Oriented Architecture (ROA) to access services.

Figure 27C:
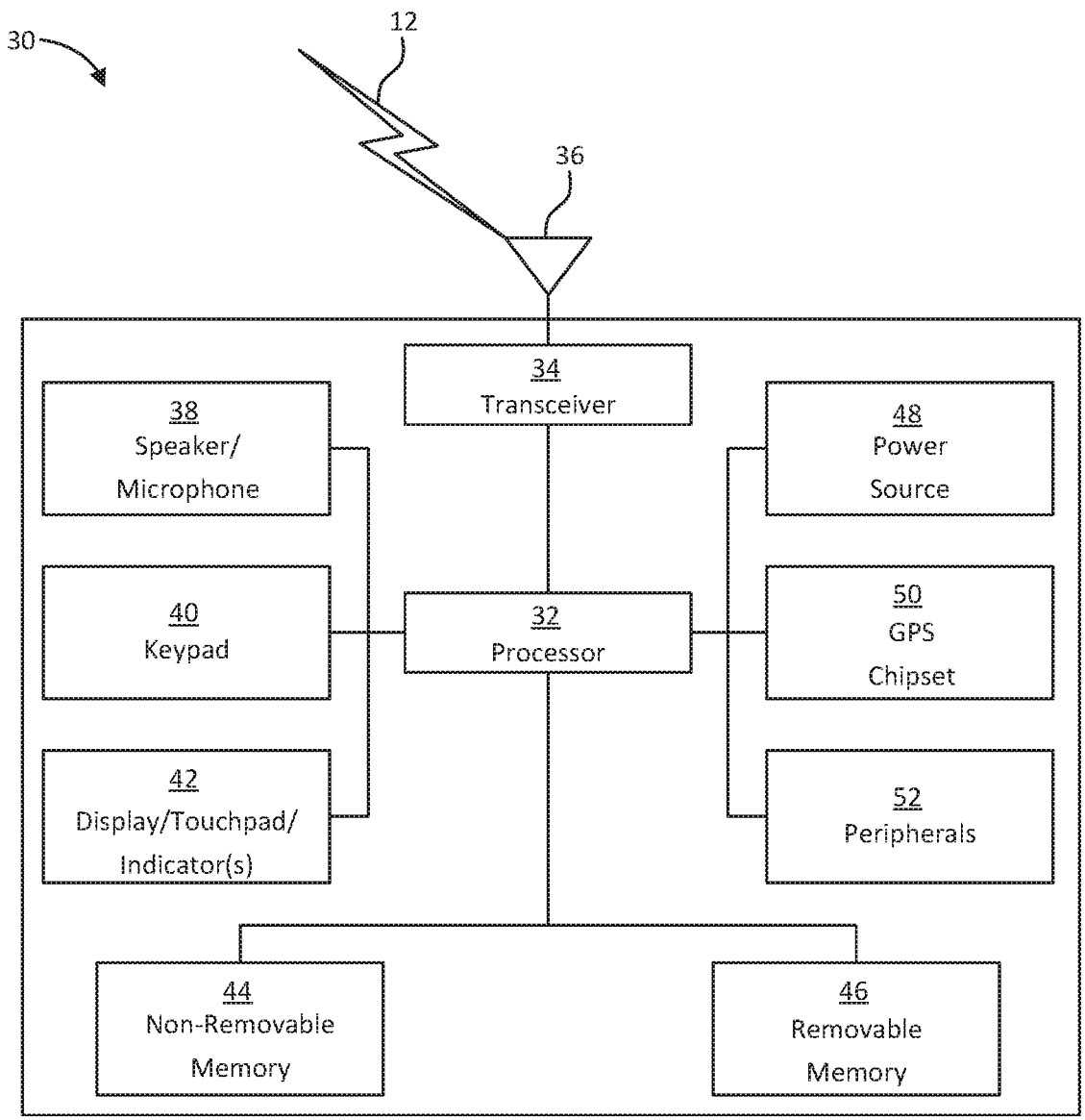
FIG. 27C is a system diagram of an example communication network node, such as an M2M/IoT/WoT device, gateway, or server that may be used within the communications system illustrated in FIGS. 27A and 27B.

FIG. 27C is a block diagram of an example hardware/software architecture of a node of a network, such as one of the clients, servers, or proxies illustrated in FIG. 1, 4, 5, 7, 10A, 10B, 11, 12A, 12B, 15, 16, 17, 18A, 18B, 19, 20, 22, 23, or 24, which may operate as an M2M server, gateway, device, or other node in an M2M network such as that illustrated in FIG. 1, 2, 4, 5, 7, 10A, 10B, 11, 12A, 12B, 15, 16, 17, 18A, 18B, 19, 20, 22, or 23. As shown in FIG. 27C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements fog service operations described herein, e.g., in relation to the methods described in reference to FIG. 5, 7, 8, 10A, 10B, 11, 12A, 13-17, 18A, 18B, or 19-26, Tables 2, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 27C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the fog service operations described herein, e.g., in relation to FIG. 5, 7, 8, 10A, 10B, 11, 12A, 13-17, 18A, 18B, or 19-26, Table 2, or in a claim. While FIG. 27C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 27C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M Service Layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 27D:
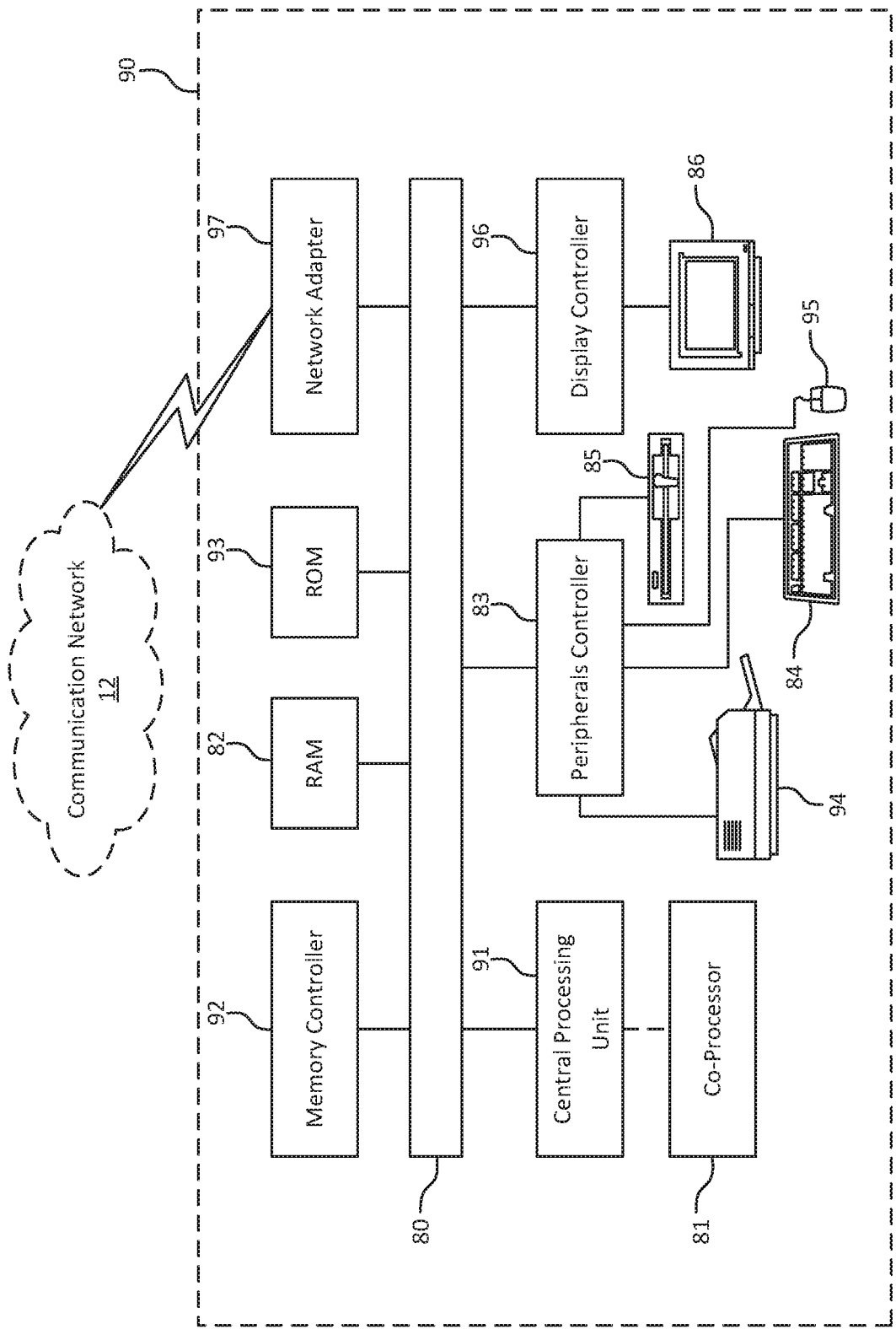
FIG. 27D is a block diagram of an example computing system in which a node of the communication system of FIGS. 27A and 27B may be embodied.

FIG. 27D is a block diagram of an exemplary computing system 90 which may also be used to implement one or more nodes of a network, such as the clients, servers, or proxies illustrated in 1, 2, 4, 5, 7, 10A, 10B, 11, 12A, 12B, 15, 16, 17, 18A, 18B, 19, 20, 22, and 23, which may operate as an M2M server, gateway, device, or other node in an M2M network such as that illustrated in FIGS. 1, 2, 4, 5, 7, 10A, 10B, 11, 12A, 12B, 15, 16, 17, 18A, 18B, 19, 20, 22, and 23. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 27A-27D, to enable the computing system 90 to communicate with other nodes of the network. The communication circuitry, alone or in combination with the CPU 91, may be used to perform the fog service operations described herein, e.g., in relation to FIG. 5, 7, 8, 10A, 10B, 11, 12A, 13-17, 18A, 18B, or 19-26, and Table 2, or in a claim.

We claim:

1. An apparatus comprising one or more processors, memory, and communication circuitry, the apparatus being connected to a communications network via the communication circuitry, the apparatus further comprising computer-executable instructions stored in the memory of the apparatus which, when executed by the one or more processors of the apparatus, cause the apparatus to:
   select a first set of fog nodes;
   maintain a fog capability profile for each fog node in the first set of fog nodes, wherein the fog capability profile for each fog node in the first set of fog nodes comprises an indicia of a maximum capability of the fog node;
   receive a fog service request comprising one or more requested fog capabilities or resources;
   select, based at least upon the fog service request and the fog capability profiles, a second set of fog nodes from the first set of fog nodes;
   apportion, among fog nodes of the second set of fog nodes, capabilities or resources to be reserved by individual fog nodes of the second set of fog nodes;
   send, to each individual fog node in the second set of fog nodes, a request comprising an indication of a portion of capabilities or resources required for the fog service request; and
   select, from the second set of fog nodes, a third set of fog nodes comprising reserved fog nodes to serve the request.

2. The apparatus of claim 1, wherein the instructions further cause the apparatus to send, to one or more fog nodes in the second set of fog nodes, a request to cancel a reservation of a capability or resource.

3. The apparatus of claim 2, wherein the instructions further cause the apparatus to:
   receive a request to use one or more reserved fog capabilities or resources;
   select, based on one or more indications that a capability or resource has been reserved, a third set of fog nodes of the second set of reserved fog nodes to serve the request to use one or more reserved fog capabilities or resources; and
   receive one or more responses from the third set of fog nodes comprising an indication that the request to use one or more reserved fog capabilities has been served successfully.

4. The apparatus of claim 1, wherein the instructions further cause the apparatus to send, to one or more fog nodes in the second set of fog nodes, a request to cancel a reservation of a capability or resource.

5. The apparatus of claim 4, wherein the instructions further cause the apparatus to:
   receive a request to use one or more reserved fog capabilities or resources;
   select, based on one or more indications that a capability or resource has been reserved, a third set of fog nodes of the second set of reserved fog nodes to serve the request to use one or more reserved fog capabilities or resources; and
   receive one or more responses from the third set of fog nodes comprising an indication that the request to use one or more reserved fog capabilities has been served successfully.

6. The apparatus of claim 5, wherein the instructions further cause the apparatus to:
   receive a fog service policy request; and
   configure fog service policies on the apparatus.

7. The apparatus of claim 1, wherein the instructions further cause the apparatus to:
   receive one or more responses from the third set of fog nodes comprising an indication that the request to use one or more reserved fog capabilities has been served successfully.

8. The apparatus of claim 7, wherein the instructions further cause the apparatus to:
   receive a fog service policy request; and
   configure fog service policies on the apparatus.

9. The apparatus of claim 8, wherein the instructions further cause the apparatus to:
   configure fog service policies at the fog nodes of the second set of fog nodes.

10. The apparatus of claim 9, wherein the fog service policies comprise an indication of a period of time in which a reservation of a capability or resource is requested.

11. The apparatus of claim 8, wherein the fog service policies comprise an indication of a period of time in which a reservation of a capability or resource is requested.

12. The apparatus of claim 7, wherein the instructions further cause the apparatus to:
   automatically, based the fog service policies, adjust membership in the second set of fog nodes; and
   send a reservation requirement update to one or more fog nodes of the second set of fog nodes.

13. The apparatus of claim 12, wherein the fog service policies comprise an indication of a period of time in which a reservation of a capability or resource is requested.

14. The apparatus of claim 7, wherein the fog based service policies comprise an indication of a period of time in which a reservation of a capability or resource is requested.

* * * * *